US008749892B2

(12) United States Patent
Shabtay et al.

(10) Patent No.: US 8,749,892 B2
(45) Date of Patent: Jun. 10, 2014

(54) AUTO-FOCUS ACTUATOR FOR FIELD CURVATURE CORRECTION OF ZOOM LENSES

(75) Inventors: Gal Shabtay, Tel-Aviv (IL); Ephraim Goldenberg, Tel-Aviv (IL); Yariv Oz, Tel-Aviv (IL)

(73) Assignee: Digitaloptics Corporation Europe Limited, Galway (IE)

( * ) Notice: Subject to any disclaimer, the term of this patent is extended or adjusted under 35 U.S.C. 154(b) by 152 days.

(21) Appl. No.: 13/163,648

(22) Filed: Jun. 17, 2011

(65) Prior Publication Data
US 2012/0320463 A1 Dec. 20, 2012

(51) Int. Cl.
G02B 3/00 (2006.01)

(52) U.S. Cl.
USPC .......................................................... 359/648

(58) Field of Classification Search
USPC .................................. 359/648, 713, 749–753
See application file for complete search history.

(56) References Cited

U.S. PATENT DOCUMENTS

| | | | |
|---|---|---|---|
| 3,844,640 A * | 10/1974 | Nakagawa | 359/751 |
| 3,975,091 A * | 8/1976 | Takahashi | 359/751 |
| 4,231,636 A | 11/1980 | Abe | |
| 4,560,237 A | 12/1985 | Ohkura et al. | |
| 4,874,231 A | 10/1989 | Aono | |
| 5,260,833 A | 11/1993 | Ito et al. | |
| 5,365,376 A | 11/1994 | Itoh | |
| 5,570,235 A | 10/1996 | Yoneyama | |
| 5,774,279 A | 6/1998 | Kiriki et al. | |
| 5,850,312 A | 12/1998 | Kato et al. | |
| 5,933,284 A | 8/1999 | Narumi | |
| 5,999,329 A | 12/1999 | Ohtake | |
| 6,002,528 A | 12/1999 | Tomita | |
| 6,031,669 A | 2/2000 | Ohtake | |
| 6,124,984 A | 9/2000 | Shibayama et al. | |
| 6,271,973 B1 | 8/2001 | Ohtake et al. | |
| 6,449,433 B2 | 9/2002 | Hagimori et al. | |
| 6,559,888 B1 | 5/2003 | Doron | |
| 6,636,364 B2 | 10/2003 | Sato | |

(Continued)

FOREIGN PATENT DOCUMENTS

JP 2009069671 2/2009

OTHER PUBLICATIONS

Demenikov et al., "Miniaturization of zoom lenses with a single moving element", Apr. 13, 2009 / vol. 17, No. 8 / Optics Express 6118.

(Continued)

*Primary Examiner* — James R Greece
*Assistant Examiner* — Jie Lei
(74) *Attorney, Agent, or Firm* — Amin, Turocy & Watson, LLP

(57) ABSTRACT

A wide field angle camera module that incorporates field curvature correction suitable for an electronic device is described herein. By way of example, the wide field angle camera module comprises micro optical lenses adapted to capture field angles of greater than thirty degrees, and is further adapted to provide field curvature correction for a range of object distances, and for a range of zoom configurations include 1x, 2x and 3x zoom configurations. Furthermore, the field correction can be implemented alone or in conjunction with signal processing that corrects barrel distortion introduced by the micro optical lenses. In particular aspects, the field correction can be automated based on image quality analysis to provide a high quality image for object distances substantially 30 centimeters or larger.

35 Claims, 38 Drawing Sheets

(56) References Cited

U.S. PATENT DOCUMENTS

| | | |
|---|---|---|
| 6,689,998 B1 | 2/2004 | Bremer |
| 6,718,132 B2 | 4/2004 | Nishina |
| 6,839,185 B2 | 1/2005 | Ohashi |
| 6,873,358 B1 | 3/2005 | Shimizu |
| 6,989,937 B2 | 1/2006 | Schauss |
| 7,053,953 B2 | 5/2006 | Belz et al. |
| 7,110,185 B2 | 9/2006 | Saori |
| 7,126,762 B2 | 10/2006 | Yoshitsugu |
| 7,193,786 B2 | 3/2007 | Arimoto et al. |
| 7,206,136 B2 | 4/2007 | Labaziewicz et al. |
| 7,227,698 B2 | 6/2007 | Yamamoto et al. |
| 7,236,306 B2 | 6/2007 | Janson, Jr. et al. |
| 7,236,308 B2 | 6/2007 | Yoshitsugu |
| 7,262,925 B2 | 8/2007 | Huang |
| 7,280,274 B2 | 10/2007 | Hanzawa |
| 7,289,273 B2 | 10/2007 | Mihara |
| 7,312,934 B2 | 12/2007 | Iwasawa |
| 7,317,580 B2 | 1/2008 | Kogo et al. |
| 7,336,428 B2 | 2/2008 | Kiyotoshi |
| 7,369,323 B2 | 5/2008 | Yoshitsugu |
| 7,443,422 B2 | 10/2008 | Usui |
| 7,528,882 B2 | 5/2009 | Saori et al. |
| 7,561,191 B2 | 7/2009 | May et al. |
| 7,567,389 B2 | 7/2009 | Souma |
| 7,576,923 B2 | 8/2009 | Inoko |
| 7,589,909 B2 | 9/2009 | Ikeda |
| 7,609,955 B2 | 10/2009 | Motomura et al. |
| 7,646,420 B2 | 1/2010 | Misawa et al. |
| 7,667,897 B2 | 2/2010 | Seo |
| 7,697,215 B2 | 4/2010 | Yoshitsugu |
| 7,697,831 B1 | 4/2010 | Tsai et al. |
| 2001/0016680 A1 | 8/2001 | Minami et al. |
| 2001/0048474 A1 | 12/2001 | Yamazaki et al. |
| 2002/0050518 A1 | 5/2002 | Roustaei |
| 2003/0117511 A1 | 6/2003 | Belz et al. |
| 2003/0160886 A1 | 8/2003 | Misawa et al. |
| 2004/0062535 A1 | 4/2004 | Hagimori |
| 2004/0109059 A1 | 6/2004 | Kawakita |
| 2004/0184163 A1 | 9/2004 | Nishioka et al. |
| 2004/0207930 A1 | 10/2004 | Nishio |
| 2004/0223234 A1 | 11/2004 | Konno |
| 2004/0240078 A1 | 12/2004 | Sekiyama |
| 2005/0012833 A1 | 1/2005 | Yokota et al. |
| 2005/0270664 A1 | 12/2005 | Pauker et al. |
| 2006/0056046 A1 | 3/2006 | Saori |
| 2006/0056063 A1 | 3/2006 | Saori et al. |
| 2006/0061876 A1 | 3/2006 | Yoshitsugu |
| 2006/0146173 A1 | 7/2006 | Arimoto et al. |
| 2006/0181767 A1 | 8/2006 | Hanzawa |
| 2006/0187310 A1 | 8/2006 | Janson et al. |
| 2006/0187312 A1 | 8/2006 | Labaziewicz et al. |
| 2006/0187338 A1 | 8/2006 | May et al. |
| 2007/0024986 A1 | 2/2007 | Yoshitsugu |
| 2007/0097219 A1 | 5/2007 | Nomura et al. |
| 2007/0285801 A1 | 12/2007 | Yoshitsugu |
| 2008/0158377 A1 | 7/2008 | Chanas et al. |
| 2008/0158691 A1 | 7/2008 | Yoshitsugu |
| 2008/0225278 A1 | 9/2008 | Namba et al. |
| 2009/0136223 A1 | 5/2009 | Motomura et al. |
| 2009/0148144 A1 | 6/2009 | Kim |
| 2009/0168153 A1 | 7/2009 | Hiraiwa et al. |
| 2009/0168197 A1 | 7/2009 | Hung et al. |
| 2009/0231627 A1 | 9/2009 | Matsuhira |
| 2009/0231628 A1 | 9/2009 | Matsuhira |
| 2009/0232402 A1 | 9/2009 | Matsuhira |
| 2009/0268078 A1 | 10/2009 | Miyazaki et al. |
| 2009/0273688 A1 | 11/2009 | Nonaka et al. |
| 2010/0060995 A1 | 3/2010 | Yumiki et al. |
| 2011/0026133 A1 | 2/2011 | Fujisaki |

OTHER PUBLICATIONS

Weerasinghe et al. "Digital zoom camera with image sharpening and suppression", IEEE Transactions on Consumer Electronics, Aug. 2004, vol. 50, Issue 3, pp. 777-786.

Rebiai, et al. "Image distortion from zoom lenses: modeling and digital correction", International Broadcasting Convention, Amsterdam, Jul. 3-7, 1992, pp. 438-441.

ISR and Written Opinion for International Application No. PCT/EP2012/002532 dated Oct. 18, 2012, 13 pages.

* cited by examiner

AUTO-FOCUS ACTUATOR FOR FIELD CURVATURE CORRECTION OF ZOOM LENSES

FIELD OF THE INVENTION

The following relates generally to imaging optics, and more specifically to compact lens architecture in conjunction with an auto-focus actuator to correct field distortions at medium and relatively large field angles.

BACKGROUND

A digital camera or video recorder employs one or more optical lenses to form a real image of an object onto a sensor. This sensor is generally a pixilated electro-optical device that outputs an electrical response to the real image formed onto the sensor. The electrical response can be manipulated to reform the real image on a digital optical display, such as a liquid crystal display (an LCD). As recent technological advancements have enabled fabrication of smaller-sized sensors and optical components, digital cameras and video recorders have been integrated into more and more consumer devices.

The use of digital imaging sensors and micro optics for cameras and video recorders has made the continuing miniaturization of these devices possible. As a result, camera modules have been integrated into small electronic devices, including hand-held devices such as cell phones, smart-phones and personal digital assistants (PDAs), computing devices such as laptops, net-books and desktop computers, display devices such as televisions, monitors and graphics displays, hidden or conspicuous surveillance equipment, and so forth. Improvements in image sensors have provided high resolution image detectors utilizing micro-scale pixilation, and at high signal to noise ratio and increasingly lower cost. As digital sensors and micro optics improve, advancements in optical systems would be desirable to exploit the potential advantages of high-resolution systems.

In many imaging lenses, image magnification is approximately the same for all field points resulting in a low image distortion. In such a system, adjusting focus for different field points and object distances is achieved by changing the distance between the lens bulk and the sensor (all lenses move together). Some image lenses, like fisheye lenses or distortion zoom lenses, where the magnification varies significantly with field give a highly distorted image. In those systems, adjusting the focus for different object distances by changing the distance between the lens bulk and the sensor will result in some fields being focused while other fields will be unfocused.

Consequently, it would be desirable to have an optical system that can adjust focus for different fields and different object distances, in highly distorted imaging lenses. This may include correction for moderate to severe field curvature for wide field angle optics. Further, it would be desirable to have such field curvature correction for fixed zoom or variable zoom optical systems. Additionally, it would be desirable to have field curvature for a micro optics module in a thin and sleek electronic device (e.g., a camera phone) using a moderate to high resolution sensor. It would also be desirable to have optical systems that can provide field correction for both the central and peripheral portions of an image formed by the micro optics module on such a device. Moreover, it would be desirable to have a micro optics module that provides significant field correction for field angles greater than thirty degrees.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In certain embodiments, the subject disclosure provides a wide field angle camera module for an electronic device. The wide field angle camera module can be employed for taking digital photographs, or for digitally recording video, or both. In at least some aspects of the subject disclosure, the wide field angle camera module can capture field angles of greater than thirty degrees. In one particular aspect, the field angle can be as great as substantially thirty-three degrees.

According to one or more aspects of the subject disclosure, a camera module comprising micro optical lenses is provided having a wide field angle and field curvature correction (field correction). This field correction can be employed for small, medium and relatively large field angles including field angles of greater than thirty degrees. Furthermore, the field correction can be implemented alone or in conjunction with signal processing that corrects barrel distortion introduced by the micro optical lenses.

According to particular disclosed aspects, field correction can be provided by repositioning an image sensor and a subset of the lenses along an optical axis, relative to a second subset of the lenses. An auto-actuator can be employed to reposition the image sensor and subset of lenses to provide field correction for various field angle configurations or zoom magnification configurations of the camera module. In at least one particular aspect, the auto-actuator repositions the image sensor and one of the micro optical lenses closest to the image sensor (a rear lens) to provide the field correction. In this aspect(s), a fixed distance, D, is maintained between the image sensor and the rear lens. In an alternative aspect, the auto-actuator can instead reposition the second subset of the lenses with respect to the image sensor and the rear lens. In either case, the rear lens can be selected to have a relatively mild curvature on one or both of its optical surfaces to mitigate optical de-center error.

According to an additional aspect, provided is an image optimization module that provides automated field correction for the camera module. The image optimization module can receive and analyze characteristics of an optical image captured by the camera module, and determine an image quality for the optical image. Based on comparison of the image quality with a target image quality, an auto-actuator can be employed to introduce field correction for the optical image to improve the image quality. Optimization can be repeated until the target image quality is achieved, a maximum number of iterations is reached, or a suitable combination thereof. The image optimization module provides automated optical field correction for the camera module, greatly improving miniaturized camera modules that are traditionally limited to fixed focus, fixed field optical systems having limited or no automated correction.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
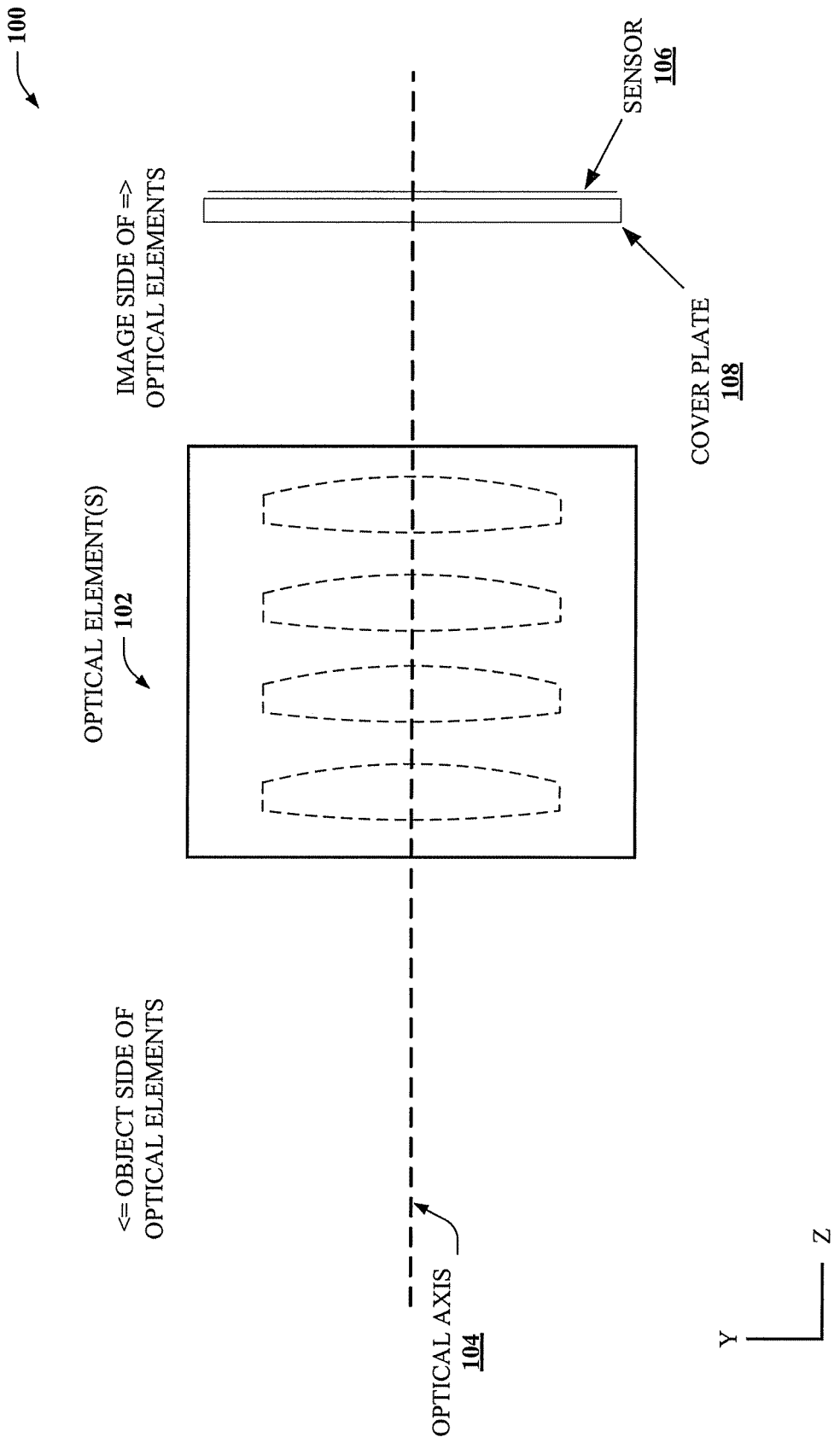
FIG. 1 illustrates a block diagram of an example optical system for providing an optical image of an object according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It will be evident, however, that such aspect(s) can be practiced without these specific details. In other instances, well-known structures and devices are shown in block diagram form in order to facilitate describing one or more aspects.

In addition, it should be apparent that the teaching herein can be embodied in a wide variety of forms and that the specific structures or functions disclosed herein are merely representative. Based on the teachings herein one skilled in the art should appreciate that the disclosed aspects can be implemented independently of other aspects, and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the apparatuses and lens systems disclosed herein are described in the context of providing field correction for a compact optical imaging system. One skilled in the art should appreciate that similar techniques could apply to other optical lens architectures. For example, the lens arrangements used herein may be used in fixed focus, mechanical focus or auto-focus systems whereby the optical arrangement or a subset thereof is automatically or manually displaced relative to the image plane.

In at least one aspect of the subject disclosure, an optical imaging system is provided. The optical imaging system can comprise a first group of lenses and a second group of lenses. The optical imaging system can be focused by repositioning the second group of lenses relative to the first group of lenses along an optical axis of the optical imaging system. In at least one aspect of the subject disclosure, the second group of lenses includes an image sensor for the optical imaging system. In this aspect(s), repositioning the second group of lenses relative to the first group of lenses further comprises maintaining the second group of lenses at a fixed distance with respect to the image sensor, e.g., repositioning the second group of lenses in conjunction with the image sensor. The fixed distance between the second group of lenses and the image sensor, or an amount of repositioning, or a combination thereof, can be selected to achieve field curvature correction for the optical imaging system in conjunction with image focusing. This is in direct contrast with conventional zoom lens systems, which reposition an image sensor relative to the lenses of the optical system, and do not reposition the image sensor in conjunction with one or more lenses of the optical system (and therefore do not maintain a fixed distance between the image sensor and the one or more of the lenses to achieve focusing).

According to various aspects of the subject disclosure, field curvature errors can be a result of optical distortions introduced by various disclosed optical systems, for instance, distortions introduced by intentional deformation of lenses of the optical systems. The deformation can be introduced, as one example, to provide non-linear image magnification as a function of field angle, although the subject disclosure is not limited to this example. Thus, the field curvature correction provided by disclosed optical systems described herein can be implemented to correct the field curvature errors introduced by a distorted zoom lens system.

Referring now to the drawings, FIG. 1 depicts a block diagram of an example optical system 100 according to aspects of the subject disclosure. System 100 comprises an arrangement of optical elements 102 positioned in a like manner relative an optical axis 104. As utilized herein, an optical element refers to a single piece of refractive or reflective material at least partially transparent to electromagnetic radiation at least partially within the visible spectrum (e.g., including wavelengths approximately 400 to 700 nanometers [nm]). Examples of suitable material include ground and polished glass, molded glass or glass formed from a replication molding process, weight to level optics (WLO), injection-molded plastic, etched micro optics formed on an optical substrate, or the like. Additionally, an optical element will have at least one refractive or reflective surface. One example of an optical element utilized herein is an optical lens. An optical lens is an optical element comprising two opposing refractive surfaces, and an edge between the opposing surfaces that defines an outer diameter (for a circular lens) or perimeter of the lens, and an edge thickness of the lens. A typical arrangement of optical lenses includes a series of lenses 102 at least generally transverse to an axis (optical axis 104). It should be appreciated, however, that other possible arrangements can exist consistent with the subject disclosure. A "lens component" is defined herein as (A) a single lens element spaced so far from any adjacent lens element that the spacing cannot be neglected in computing the image forming properties of the respective lens elements, or (B) two or more lens elements that have adjacent lens surfaces either in full overall contact or so close together that any spacing between the adjacent lens surfaces are so small that the spacing(s) can be neglected in computing image forming properties of the two or more lens elements. Thus, some lens elements can also be lens components, and the terms "lens element" and "lens component" are not mutually exclusive terms. In addition, it should be appreciated that the term "optical component" is utilized herein to refer to a superset of items having significant properties related to imaging optical systems, and includes optical elements such as lens elements and lens components, as well as optical stops, but can also include various other items such as a thin film, a bandpass filter, a lowpass or highpass filter, a polarizing filter, a mirror, etc.

Light entering the left side, or object side, of optical elements 102 can interact sequentially with respective elements (102) and exit the right side, or image side, of the elements 102, toward an optical sensor 106. It should be appreciated that not all light interacting with the left side of the optical elements 102 will be transmitted to the sensor 106; some light can be reflected off of respective elements (102), some light can be scattered away from the optical axis 104 and absorbed (e.g., by an optical stop—not depicted), and so forth. However, in general, the optical elements 102 will receive light from an object on one side of the elements (e.g., the left side) and form a real image of the object on an opposite side of the elements (e.g., on the right side). The real image will be formed along the optical axis 104 a certain distance from the optical elements 102, called an image distance (ID). Notably, the ID depends primarily on a corresponding object distance (OD—distance between the object and the optical elements 102 along the optical axis 104) and a refractive power, or optical power, of the combined optical elements 102.

Sensor 106 can be a digital device comprising a multi-dimensional array (e.g., a two dimensional array) of electro-optical sensors, or pixels. Examples of such a device can include a charge-coupled device (CCD) array, or a complementary metal-oxide semiconductor (CMOS) array, or some other suitable array of optical sensors. Each electro-optical sensor, or pixel, of such array is configured to output an electric signal when irradiated with light. Furthermore, an amount of electric current for the electric signal is directly related to energy density of light irradiating the pixel. Accordingly, by collecting output current levels from each pixel of the array, sensor 106 can digitally reproduce a two dimensional radiant energy pattern of light irradiating the sensor 106. Additionally, where the pixel surface or sensor plane 108 of sensor 106 is placed at the above-mentioned ID, the two dimensional radiant energy pattern that is produced is that of a real optical image generated by optical elements 102. Accordingly, sensor 106 can be utilized to digitally reproduce that image.

Resolution of a digital image generated by sensor 106 depends on a number of pixels within the sensor plane array 108, which in turn is dependent on pixel area and total array area. Thus, for example, for relatively square pixels approximately 1.4 microns per side (1.96 square microns), a 0.4 cm square sensor array can comprise as many as 8.1 megapixels (Mp). Said differently, such a sensor would have resolution of about 8 Mp. It should be appreciated, however, that the subject disclosure is not limited to these example dimensions.

Because the pixel array of sensor 106 generates an electronic reproduction of a real image, data generated by sensor 106 in the form of electric signals can be saved to memory, projected to a display for viewing (e.g., digital display screen), edited in software, and so on. Thus, at least one application of optical system 100 is in conjunction with a digital camera or video camera comprising a digital display. Furthermore, optical system 100 and other optical systems included in the subject disclosure can be implemented in conjunction with a camera module of an electronic device (e.g., see FIG. 5, infra). Such an electronic device can include a wide array of consumer, commercial or industrial devices. Examples include consumer electronics, including a cell phone, smart phone, laptop computer, net-book, PDA, computer monitor, television, flat-screen television, and so forth, surveillance or monitoring equipment, including commercial equipment (e.g., ATM cameras, bank teller window cameras, convenience store cameras, warehouse cameras and so on), personal surveillance equipment (e.g., pen camera, eyeglass camera, button camera, etc.), or industrial surveillance equipment (e.g., airfield cameras, freight yard cameras, rail yard camera, and so on). For instance in consumer electronics, because optical elements 102 can comprise optical components having physical dimensions on the order of a few millimeters or less, and because at least some of optical elements 102 can have a fixed position, system 100 and other disclosed systems are well suited for various types of mini or micro camera modules. It is to be appreciated, however, that the disclosed systems are not limited to this particular application; rather, other applications known to those of skill in the art or made known by way of the context provided herein, are included within the scope of the subject disclosure.

Figure 2:
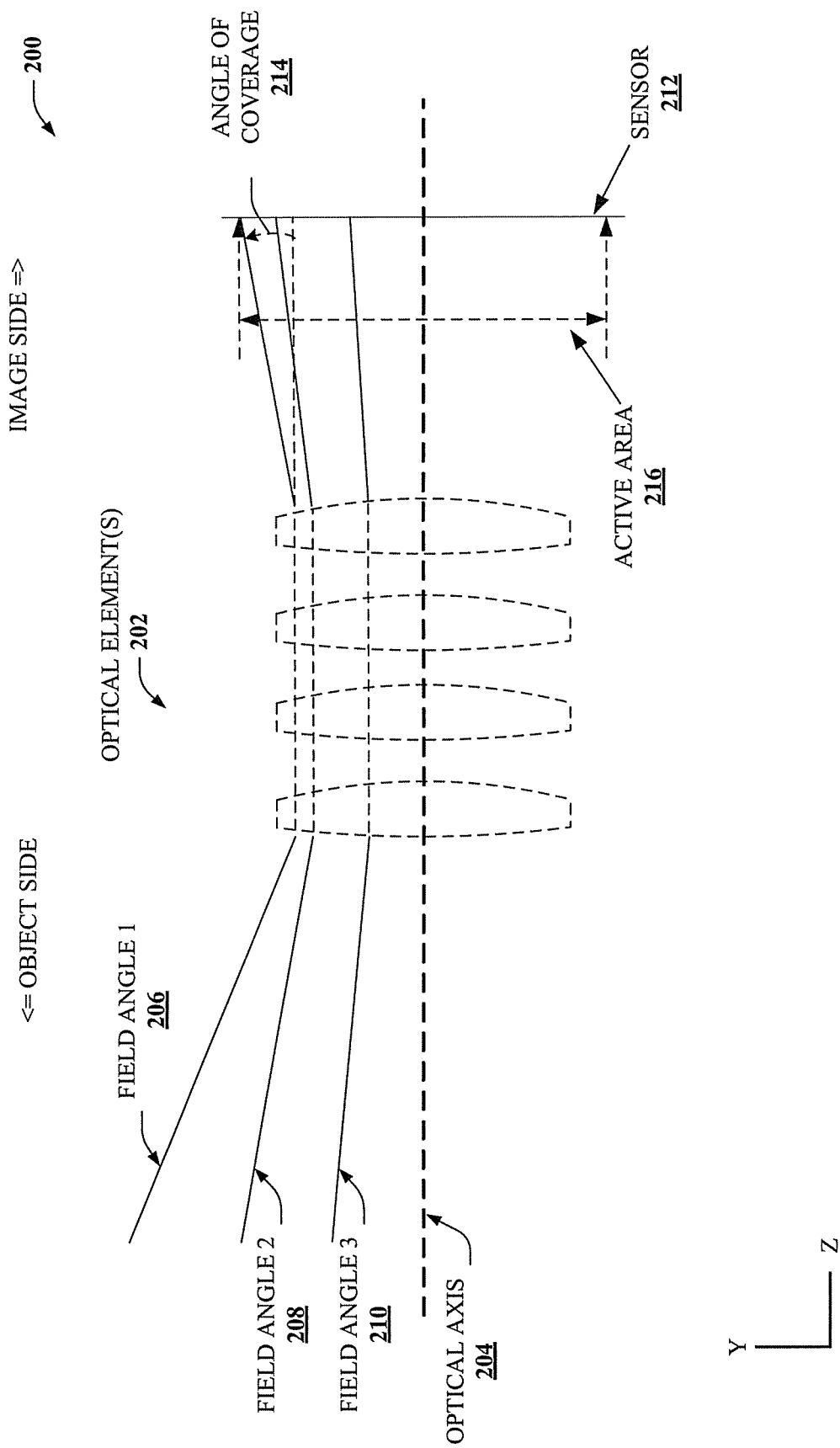
FIG. 2 depicts a block diagram of a sample optical diagram depicting different field angles relative an optical axis according to further aspects.

FIG. 2 illustrates a block diagram of an example optical system 200 depicting a range of field angles accepted by optical system 200. As utilized herein, the term field angle refers to the angular extent of incoming light rays that is imaged by a set of optical elements 202 onto an image plane (depicted as coincident with a sensor 212 for optical system 200, although the image plane can shift along optical axis 204 and may not always be exactly coincident with sensor 212 in practice). Field angles are expressed in degrees and measured relative to an optical axis 204 on an object side of optical elements 202. The term field angle can be interchanged with the terms field of view, or angle of view as well.

Light within a field angle accepted by optical elements 202 is projected onto sensor 212 into an angle of coverage 214. The angle of coverage 214 refers to an angle of projection by optical elements 202 that fills an active area 216 of sensor 212 on an image side of optical elements 202. Further, the angle of coverage 214 is related to the field angle at least in part on a focal power and magnification of optical elements 202. Thus, for instance, if magnification of optical elements 202 changes, the relationship between field angle and angle of coverage can change.

Optical system 200 depicts three different field angles, field angle 1 206, field angle 2 208, and field angle 3 210. These field angles 206, 208, 210 can correspond with different zoom configurations of optical system 200. In general, a zoom configuration for a camera module can include optical zoom or digital zoom, or a suitable combination thereof. As an alternative, the zoom configuration can include a hybrid of optical and digital zoom, generated by optical distortion that optically expands or magnifies one portion of an image (e.g., a central portion) while optically compressing or minimizing another portion(s) of the image (e.g., an outer portion or perimeter portion). Digital restoration is then employed to correct this intentional optical distortion of the image. However, by reversing a subset of the digital restoration, the portion of the image can be optically magnified once again.

Optical zoom involves a particular arrangement of optical elements 202 relative to each other or relative to sensor 212 that maps or projects a particular field angle (206, 208, 210) into the angle of coverage 214 (in angular terms) or onto an active area 216 of sensor 212 (in spatial terms). A default configuration of optical elements 202 is typically associated with a 1× magnification. This 1× magnification can, for instance, project field angle 1 206 into the angle of coverage 214, filling the active area 216 of sensor 212. A different configuration of optical elements 202 (e.g., displacing sensor 212 relative to optical elements 202, or vice versa) can create a 2× magnification, projecting field angle 2 208 into the angle of coverage 214 and filling the active area 216 of sensor 212 (thereby projecting a smaller object or portion thereof defined by field angle 2 208 in object space onto the active area of sensor 212, in effect optically magnifying the smaller object or portion thereof). A third configuration of optical elements 202 can create a 3× magnification (and so on), projecting field angle 3 210 into the angle of coverage 214 and filling the active area 216 of sensor 212, optically magnifying an object defined by field angle 3 210. The above example relationships between magnification and field angle hold true for the case where field angle 1 206≈2*(field angle 2 208)=3*(field angle 3 210).

Digital zoom is generally accomplished without changing optical configurations of optical elements 202 (e.g., position of one or more such elements along optical axis 204). As an illustrative example, consider a static configuration of optical elements 202 that corresponds to 1× optical magnification that projects field angle 1 206 into the angle of coverage 214 and filling the active area 216 of sensor 212. In this example, a portion of an image can be digitally magnified by expanding a subset of the active area 216 onto which that portion of the image is received (e.g., where the subset of the active area 216 is expanded to fill a display screen of a camera device, for instance).

The hybrid digital-optical zoom described above provides optical magnification for a portion of an image that can be digitally restored to an un-magnified state by post-image processing. Where optical elements 202 and sensor 212 are fixed in position along optical axis 204, this optical magnification is fixed in magnitude, and can be 1.5× magnification, 2× magnification, 3× magnification, or some other suitable degree of optical magnification, based on the power of optical elements 202 projecting the optically magnified portion of the image onto sensor 212. Where optical elements 202 or sensor 212 is not fixed, this optical magnification for the portion of the image can vary (e.g., by adjusting position of optical elements 202 relative sensor 212, or vice versa), similar to standard optical magnification discussed above. The advantage of digital magnification is that it enables image magnification with fixed or substantially fixed optical elements 202, while sacrificing resolution at the image sensor 212. On the other hand, optical magnification enables image magnification without sacrificing resolution at the image sensor 212, while adding mechanical complexity in order to reposition one or more of optical elements 202 to accomplish the optical magnification. The hybrid digital-optical zoom can accomplish optical magnification for at least a portion of an image without sacrificing image resolution and without adding mechanical complexity; however, an actuator can be included to adjust the degree of optical zoom involved in the hybrid digital-optical zoom as well.

In some aspects of the subject disclosure, hybrid digital-optical magnification is employed to achieve a target field angle and zoom magnification for an optical system. In other aspects, optical magnification is employed to achieve the target field angle and zoom configuration. In still other aspects of the subject disclosure, digital magnification can be employed to achieve the target field angle and zoom configuration. In at least one alternative aspect, a combination of hybrid digital-optical zoom and optical magnification can be employed to achieve the target field angle and zoom configuration, or a combination of optical zoom and digital zoom can be employed, to mitigate loss of sensor resolution or mitigate increased mechanical complexity for an optical system, or both.

Figure 3:
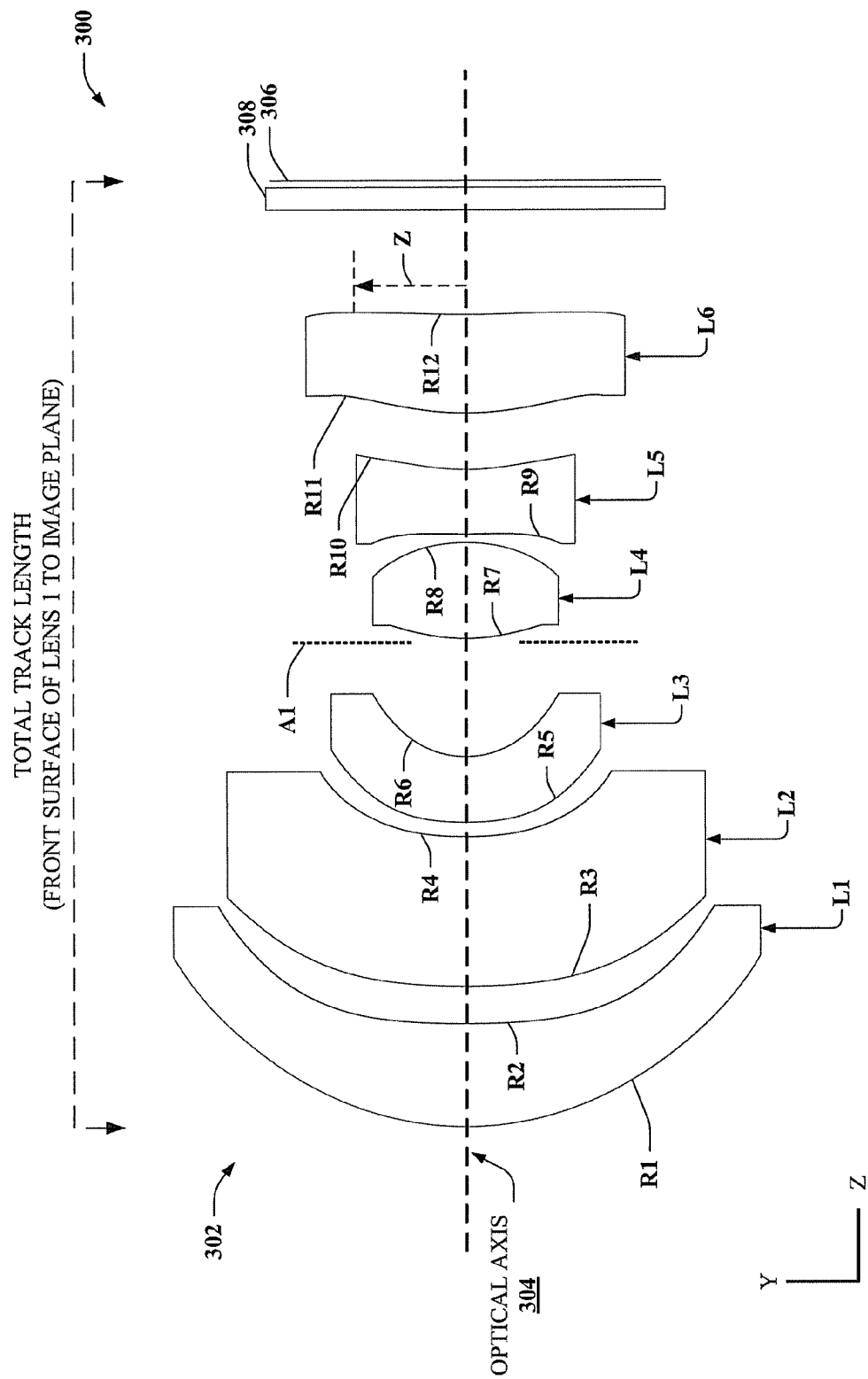
FIG. 3 illustrates a diagram of an example arrangement of optical elements providing an optical image for relatively wide field angles.

FIG. 3 illustrates a block diagram of an example optical system 300 according to particular aspects of the subject disclosure. Optical system 300 comprises a set of optical components 302 suitable for relatively small-scale optical imaging applications. Such applications can include a camera module for photography or video recording on a handheld electronic device, inconspicuous web camera for a notebook computer or flat panel computer display, hidden or conspicuous surveillance equipment, and so on. More specifically, set of optical components 302 can provide a relatively wide field of view for micro-optical imaging, including field angles larger than thirty degrees, and in at least one aspect field angles of substantially thirty-three degrees. In addition, set of optical components 302 can be adapted to provide manual or automated field curvature correction, optionally in conjunction with auto-focus correction, as is described in more detail herein (e.g., see FIG. 7, infra).

Optical system 300 comprises an optical axis 304 on which set of optical components 302 are axially centered, an image sensor 306, and optionally a sensor cover glass 308 positioned between image sensor 306 and set of optical components 302. As depicted, set of optical components 302 comprises six lenses, lens L1, lens L2, lens L3, lens L4, lens L5 and lens L6 (referred to collectively as lenses L1-L6) listed from the object side of set of optical system 300 to the image side of optical system 300, and at least one aperture stop A1, positioned between lens L3 and lens L4 as depicted by FIG. 3. In addition, lens L1 comprises two optical surfaces R1 and R2, where R1 is a convex surface and R2 is a concave surface. Lens L1 is centered on optical axis 304 and can typically have a relatively large positive refractive power according to various aspects of the subject disclosure. As utilized herein, the terms large or small refractive power, as well as other relative terms (e.g., large optical power, small optical power, and so on) are intended to be relative to other lenses of a particular optical system. Thus, for instance, referring to lens L1 as having large positive refractive power implies that lens L1 has greater than average refractive power as compared with other positive power lenses of optical system 300. Conversely, a lens having small positive refractive power for optical system 300 will have less than the average positive refractive power. Lenses with negative refractive power correspond to similar terminology from the perspective of negative refractive power. Lens L2 comprises an object-side surface R3 that is convex, and an image side surface R4 that is concave. Lens L2 can have small positive refractive power in some aspects of the subject disclosure. In other aspects, however, lens L2 can instead have small negative refractive power. Likewise, lens L3 comprises a first surface R5 that is convex and a second surface R6 that is concave. In contrast, lens L4 comprises two convex surfaces, R7 and R8, and lens L5 comprises two concave surfaces, R9 and R10. Lens L6 comprises an object-side surface R11 that is convex, and an image-side surface R12 that has one of the following shapes: flat, slightly concave, or slightly concave near optical axis 304 with an inflection point a distance Z from optical axis 304, beyond which surface R12 is convex.

Generally speaking, set of optical components 302 can be generated to form a suitable image of object (not depicted) at image sensor 306, at a given object distance (e.g., 0.3 meters, 0.5 meters, 0.7 meters, 1 meter, 2 meters, or some other suitable object distance) and for a desired field angle, depth of field, f-number, or the like. Additionally, the set of optical components 302 can be selected so that a total track length (TTL) of set of optical components 302 is less than a desired length. According to other aspects of the subject disclosure, the set of optical components 302 can be selected so that a diameter of an image projected onto image sensor 306 substantially fills an active area of image sensor 306. In at least one aspect, the set of lenses can be selected so that a ratio of TTL to image size is a desired ratio. In one example, the TTL to image size ratio can be substantially 2.42 (e.g., based on the cover glass parameters listed in Table 3 and Table 4, infra). FIG. 3 illustrates an example TTL and image height that gives rise to such an image circle.

Selection of set of optical components 302 can include selection of different numbers of lenses (e.g., four lenses, five lenses, seven lenses, etc.) as depicted in FIG. 3, different types of materials based on respective indices of refraction (see below), Abbe numbers, or other optical or physical properties, different focal lengths, different effective aperture, and so on, to provide the desired image features discussed above.

It should also be appreciated that the set of optical components 302 can be selected according to other features, such as maximum aperture or f-number of the combined optical components 302, a desired image resolution (e.g., in lines per mm, lines per μm, etc.), desired chromatic focal shift, desired relative illumination, desired modulation transfer function (MTF) for a given object distance, desired through focus MTF (TF-MTF) response, desired field curvature and distortion, or desired lateral color, or a combination of the foregoing properties or of other suitable properties.

It should be appreciated that surfaces R1 through R12 of lenses L1 through L6 (as well as other optical surfaces described throughout the subject disclosure) can be of varying shapes. In one aspect, one or more of the surfaces can be spherical surfaces. In other aspects, one or more of the surfaces can be conic surfaces. In yet other aspects, one or more of the surfaces can be aspheric surfaces, according to a suitable aspheric equation, such as the even aspheric equation:

$$z = \left[\frac{C^2 Y}{\{1 + (1 - (1+K)C^2 Y^2)^{1/2}\}}\right] + \sum_i (A_i * Y^i), \quad (1)$$

where z is the sag height (in mm) of a line drawn from a point on the aspheric lens surface at a radial distance, Y from the optical axis to the tangential plane of the aspheric surface vertex, C is the curvature of the aspheric lens surface on the optical axis, Y is the radial distance (in mm) from the optical axis, K is the conic constant, and $A_i$ is the $i^{th}$ aspheric coefficient, with the summation over even number i. However, these aspects are not to be construed as limiting the scope of the subject disclosure. Rather, various surfaces can be odd aspheric, or of an aspheric equation comprising even and odd coefficients.

Further to the above, it should be appreciated that lenses L1 through L6 of optical system 300 (and optical lenses of various other optical systems provided throughout the subject disclosure) can be made of various suitable types of transparent material, and formed according to various suitable processes for generating an optical quality surface. In one aspect, the lenses L1 through L6 can be ground and polished glass, where the glass is selected to have an index of refraction resulting in a desired effective focal length for the combined lenses L1 through L6. In another aspect, the lenses can be an optical-quality injected molded plastic (or plastic of optical quality formed by another suitable method), wherein the plastic has an index of refraction suitable to provide the desired effective focal length. In at least one other aspect, the lenses L1 through L6 can be etched from a transparent glass, crystalline or other suitable structure (e.g., silicon dioxide—$SiO_2$ wafer) with a lithographic etching process similar to that used to etch semiconductor chips (e.g., solid state memory chip, data processing chip).

In at least one specific aspect of the subject disclosure, lenses L1-L6 are provided by the prescription data of table 1 and table 2, below. In this aspect, optical system 300 can comprise two groups of lenses, G1 and G2, where G1 can comprise lenses L1, L2, L3, L4 and L5, whereas group of lenses G2 can comprise lens L6 (e.g., see FIG. 7, infra, for a more detailed description of similar embodiments). Table 1 provides suitable ranges for index of refraction data for lenses L1-L6, and for cover glass 308, at specified wavelengths. Table 2 lists thermal coefficient of expansion data for lenses L1-L6. The data listed in Tables 1 and 2 corresponds to a model temperature of 23.0000 degrees Celsius, and a model pressure of 1.0000 atmospheres. The absolute air index employed for the data is 1.000270 at wavelength of 0.546000 micrometers, where wavelengths are modeled in air at the above temperate and pressure. (Note that optical sensor cover plate is modeled as a theoretical material having the indicated indices of refraction at the indicated wavelengths).

TABLE 1

Index of Refraction Data for Optical System 300

| | Wavelengths | | | | |
|---|---|---|---|---|---|
| Lens | 0.42 | 0.486 | 0.546 | 0.588 | 0.656 |
| 1 | 1.52-1.58 | 1.51-1.57 | 1.51-1.57 | 1.50-1.56 | 1.50-1.56 |
| 2 | 1.65-1.71 | 1.62-1.68 | 1.61-1.67 | 1.60-1.66 | 1.59-1.65 |
| 3 | 1.52-1.58 | 1.51-1.57 | 1.51-1.57 | 1.50-1.56 | 1.50-1.56 |
| 4 | 1.52-1.58 | 1.51-1.57 | 1.51-1.57 | 1.50-1.56 | 1.50-1.56 |
| 5 | 1.65-1.71 | 1.62-1.68 | 1.61-1.67 | 1.60-1.66 | 1.59-1.65 |
| 6 | 1.52-1.58 | 1.51-1.57 | 1.51-1.57 | 1.50-1.56 | 1.50-1.56 |
| Cover Glass | 1.51-1.57 | 1.50-1.56 | 1.50-1.56 | 1.49-1.55 | 1.49-1.55 |

TABLE 2

Thermal Coefficient Data of Expansion for Optical System 300

| Lens | Thermal Coefficient of Expansion (*10e−6) |
|---|---|
| 1 | 60.000000-62.000000 |
| 2 | 69.000000-71.000000 |
| 3 | 60.000000-62.000000 |
| 4 | 60.000000-62.000000 |
| 5 | 69.000000-71.000000 |
| 6 | 60.000000-62.000000 |

Figure 4:
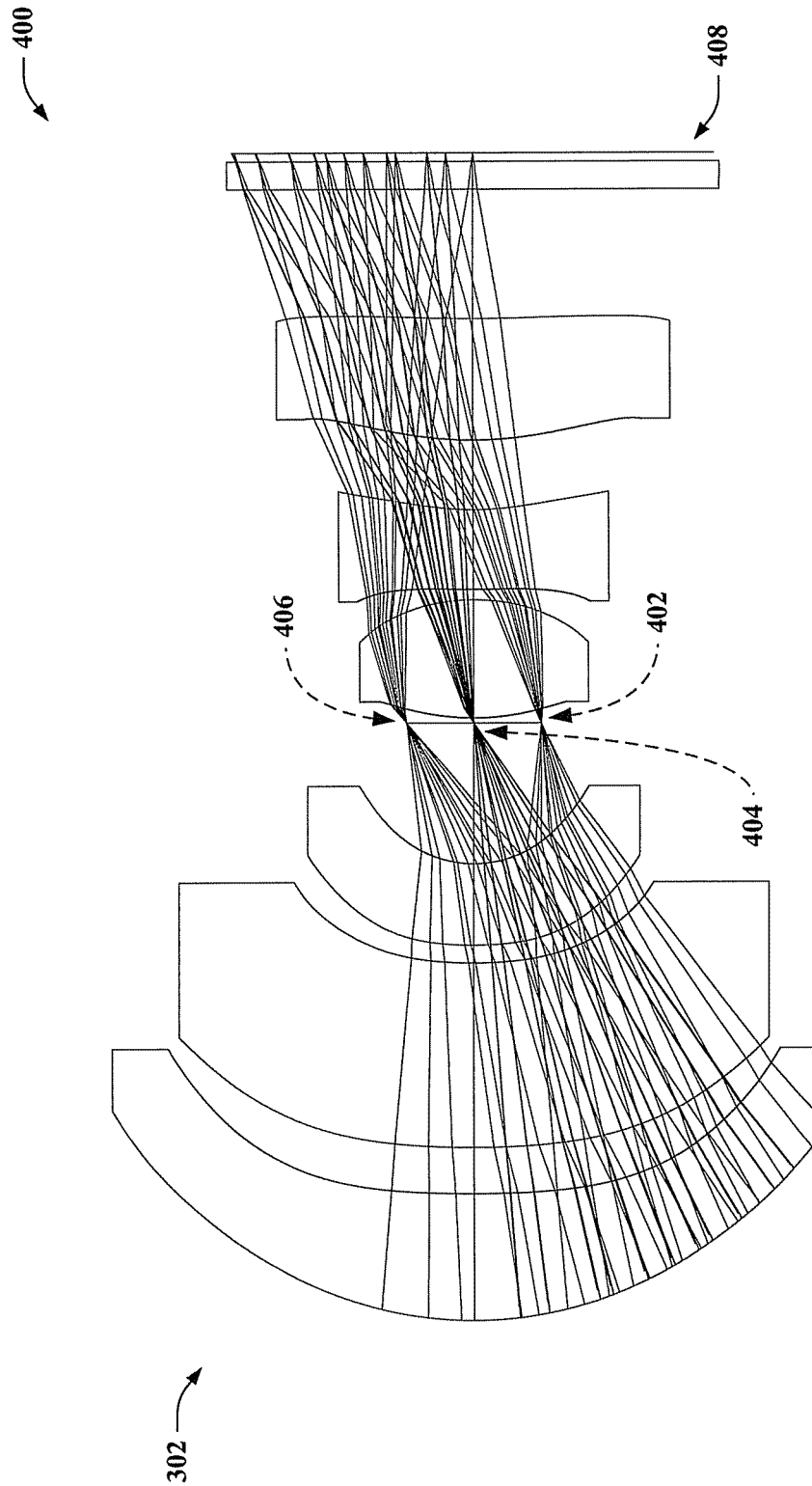
FIG. 4 depicts a diagram of a sample ray diagram for the arrangement of optical elements of FIG. 3 (referred to as the optical elements).

FIG. 4 illustrates an example ray diagram 400 involving the set of optical components 302 depicted in FIG. 3, supra. Particularly, ray diagram 400 comprises three separate sets of rays 402, 404, 406 comprising rays that fill an upper half of an active area of a sensor 408. A first set of rays 402 intersect at a lower boundary of an aperture window of optical components 302 (aperture A1 depicted in FIG. 3). A second set of rays 404 intersects the aperture window at an optical axis associated with optical components 302 (optical axis 304 of FIG. 3). Finally, a third set of rays 406 intersects an upper boundary of the aperture window of optical components 302. The interaction of sets of rays 402, 404, 406 with optical components 302 provides an illustration of how light at an incident field angle is mapped to an angle of coverage by optical components 302 (or, in this case, how roughly one half the field angle corresponds with half the angle of coverage).

Figure 5:
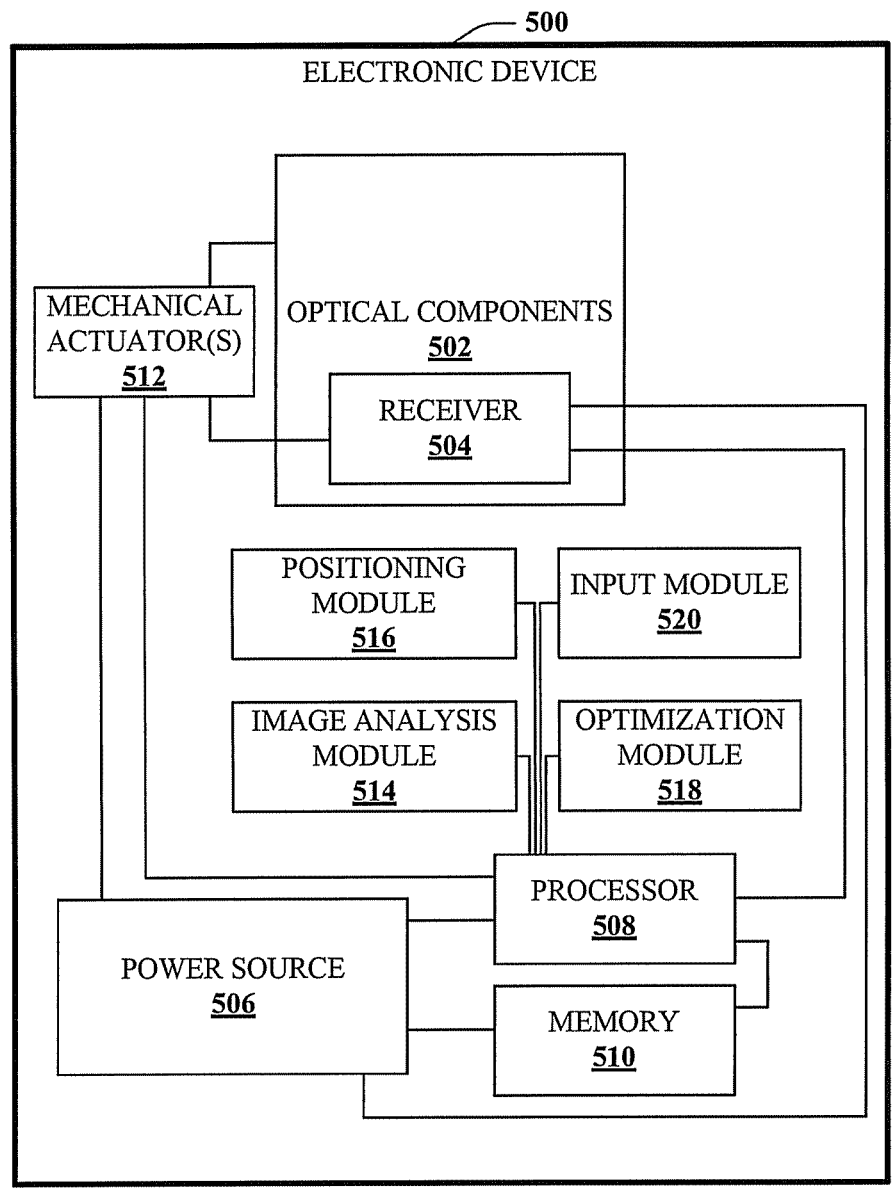
FIG. 5 illustrates a block diagram of a sample electronic device comprising a camera module having optimized field curvature correction.

FIG. 5 illustrates a block diagram of an example electronic device 500 incorporating a camera module that provides field curvature correction for a relatively wide field angle according to particular aspects of the subject disclosure. Field curvature correction can be provided by a mechanical actuator that repositions a subset of optical components of the camera module. In some aspects, actuator movement can be caused by manual adjustment initiated by a user of electronic device 500. In other aspects, the actuator movement can be automated by a motorized precision translation stage or a like device included within electronic device 500. According to specific aspects, field curvature correction can be independent of an optical zoom mechanism employed by the camera module (if any). In alternative aspects, field curvature correction can be implemented in conjunction with the optical zoom. In the former case, for instance, the actuator can adjust position of a subset of the optical components that has a minimal effect on overall focal length or optical power of the optical components. In the latter case, the actuator can adjust position of a subset of the optical components that has a significant effect on the overall focal length or optical power of the optical components. As an illustrative example, the actuator can adjust position of the sensor and one or more lower power lenses relative to one or more high power lenses (that remain fixed). It should be appreciated that other examples are permitted within the scope of the subject disclosure, and the disclosure should not be construed as being limited based on particular examples disclosed herein.

Electronic device 500 can comprise a set of optical components 502. Optical components 502 can comprise one or more optical lenses, lens components, aperture stops, or other suitable devices employed in imaging optics (e.g., anti-reflective films, color filters, polarization elements, and so on). In at least one aspect of the subject disclosure, optical components 502 comprise optical components that are substantially the same as optical components 302 of FIG. 3, supra. However, it should be appreciated that the subject disclosure is not limited to this aspect.

At least one component of optical components 502 is an image sensor 504. Image sensor 504 can comprise any suitable optical image sensor described herein or known in the art. Additionally, electronic device 500 can comprise a power source 506 (e.g., a battery, a DC input, an AC input, or the like) that provides electrical power to electronic device 500 and various components thereof. Sensor 504 can derive power from power source 506 for receiving light projected by optical components 502 and converting the received light into a digital image of the received light. Additionally, electronic device 500 can comprise a processor 508 and memory 510 powered by power source 506, and employed to control one or more components of electronic device 500 and store instructions pertinent to operating such components, respectively. In at least one aspect, memory 510 stores instructions pertinent to optimization of an image received at sensor 504, and controlling position of a subset of optical components 502 (including or excluding sensor 504) to achieve image optimization, as is described in more detail below.

Electronic device 500 can additionally comprise one or more mechanical actuators 512 to control position of one or more of optical components 502, including sensor 504. Optionally, mechanical actuator(s) 512 can be powered by power source 506. According to this option, mechanical actuator(s) 512 can be connected to power source 506 by a flex-lead, or other suitable electrical connection that allows mobility for movable electro-mechanical parts.

In one instance, a plurality of mechanical actuators 512 can be employed to independently position separate subsets of optical components 502. In another instance, a single mechanical actuator 512 can be employed to position a single subset of optical components 502. According particular aspects of the subject disclosure, mechanical actuator(s) 512 is employed to jointly position sensor 504 and at least one lens of optical components 502 (e.g., see FIGS. 6 and 7, infra). By repositioning sensor 504, mechanical actuator(s) 512 can achieve different zoom magnifications for optical components 502. Additionally, by repositioning the at least one lens of optical components 512 in conjunction with sensor 504, some degree of field curvature correction can be achieved for optical components 502. In at least one specific aspect, repositioning sensor 504 and the at least one lens can comprise a coarse positioning for zoom magnification (e.g., a relatively large predetermined movement along an optical axis of optical components 502 that corresponds with a target zoom magnification), in addition to a fine positioning for field curvature correction (e.g., a relatively small refinement of the large predetermined movement along the optical axis).

According to one or more other aspects of the subject disclosure, electronic device 500 can comprise automated field curvature correction to provide image quality optimization. Processor 508 can execute an image analysis module 514 that obtains a set of data from sensor 504 defining an existing image. Image analysis module 514 can employ one or more metrics of image quality to determine a relative image quality of the existing image. As one example of image quality metric, image analysis module 514 can derive a polychromatic diffraction through focus modulation transfer function (a polychromatic diffraction TFMTF) for the existing image, and compare a modulus of the optical transfer function (an MTF) of the existing image with a target MTF value. If the MTF of the existing image meets or exceeds the target MTF value, image analysis module 514 can output a pass result, indicating that no correction need be made. Otherwise, image analysis module 514 can output a fail result, indicating to processor 508 that correction of optical components 502 should be made. Optionally, output on the fail result can include data derived from comparison of the MTFs or from other suitable analysis of the image quality metric (e.g., difference of the MTFs, a focus shift associated with a target MTF, or other suitable data).

Based on output from the image analysis module 514, processor 508 can employ a positioning module 516 to cause mechanical actuator 512 to reposition the subset of optical components 502 to provide image correction. In at least one aspect, positioning module 516 can employ iterative repositioning and image analysis provided by an optimization module 518, which employs one or more algorithmic optimization techniques to achieve a target image quality at sensor 504. For instance, optimization module 518 can optimize image quality based on multiple data sets related to image quality over time, or over multiple iterations of analyzed data. In another aspect, positioning module 516 can employ manual repositioning provided by an input module 520. The manual repositioning can be based on a machine-user interface, such as a button, dial, or other suitable electronic or mechanical device adapted to receive input from a user of electronic device 500. This input can then be utilized by positioning module 516 to cause mechanical actuator 512 to reposition the subset of optical components 502 a predetermined amount per unit of received input (e.g., number of button presses, angle that a mechanical dial is rotated, and so on), and in a selected direction (e.g., based on direction the mechanical dial is rotated, which of two or more directional repositioning buttons are pressed, or the like). In at least one aspect, positioning module 516 can integrate manual input provided by input module 520 with automated input provided by optimization module 518 to determine a magnitude and direction of repositioning the subset of optical components 502 along the optical axis.

In order to optimize image data, machine learning and optimization module 516 can utilize a set of models (e.g., image representation model, image reproduction models, image correlation models, image quality models based on one or more image quality metrics, statistical models based on the foregoing, etc.) in connection with determining image quality relative a target image quality. The models can be based on a plurality of information (e.g., existing image data, stored image data of previous optimization iterations, target image data, etc.). Optimization routines associated with optimization module 518 can harness a model(s) that is trained from previously collected data, a model(s) that is based on a prior model(s) that is updated with new data, via model mixture or data mixing methodology, or a model(s) that is trained with seed data, and thereafter tuned in real-time by training with actual field data based on parameters modified as a result of error correction instances.

In addition, optimization module 518 can employ machine learning and reasoning techniques in connection with making determinations or inferences regarding optimization decisions, such as correlating existing image quality with target image quality, iterative positioning results on image quality, user positioning input—either alone or in conjunction with one or more previous iterations of user input or automated image analysis, or the like. For example, optimization module 518 can employ a probabilistic-based or statistical-based approach in connection with identifying and/or updating an image quality. Inferences can be based in part upon explicit training of classifier(s) (not shown), or implicit training based on a data feedback loop (not depicted), and the like.

Optimization module 518 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers (e.g., methods referred to as "neural network" methodologies, fuzzy logic methodologies, and other approaches that perform data fusion, etc.) in accordance with implementing various aspects described herein. Methodologies employed by optimization module 518 can also include mechanisms for the capture of logical relationships such as theorem provers or heuristic rule-based expert systems. Inferences derived from such learned or manually constructed models can be employed in other optimization techniques, such as linear and non-linear programming, that seek to maximize probabilities of error related to minimizing deviation of existing image quality and target image quality. For example, maximizing an overall accuracy of correlations between iterations of image quality that correspond with iterations of optical repositioning of the subset of optical components 502 can be achieved through such optimization techniques.

Figure 6:
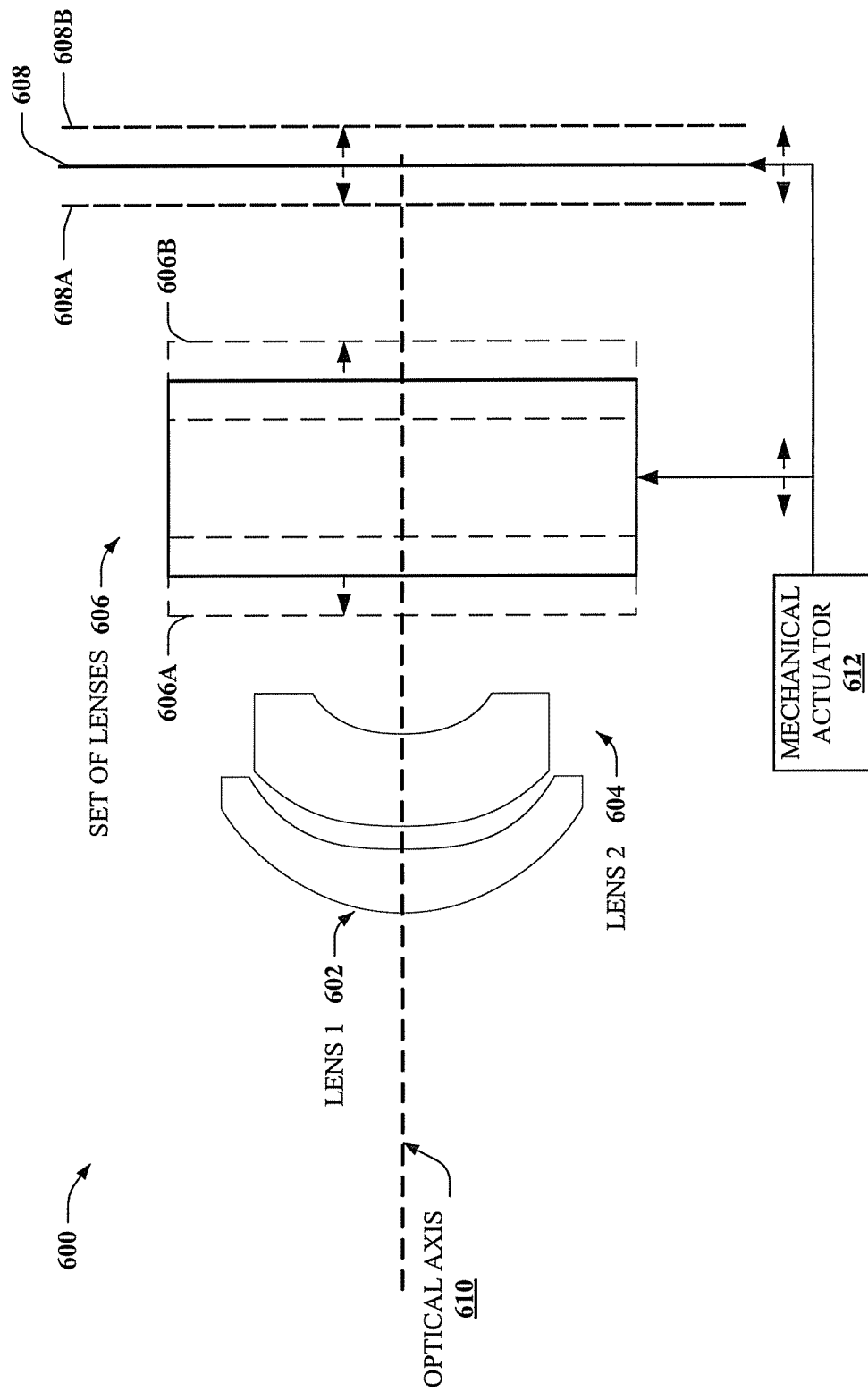
FIG. 6 depicts a lens diagram of a sample optical system comprising a mechanical actuator configured to automate field curvature correction.

FIG. 6 illustrates a block diagram of an example optical system 600 that provides field curvature correction for optical imaging applications. Optical system 600 can comprise, in order from an object side of optical system 600, lens 1 602 and lens 2 604 that are fixed in position along an optical axis 610, and a set of lenses 606 comprising one or more individual lens components, one or more of which have an adjustable position along optical axis 610. In addition, optical system 600 can comprise an image sensor 608 that can also have an adjustable position along optical axis 610. Further, lens 1 602 and lens 2 604 combine to provide the dominant optical power of optical system 600, such that changes in position of set of lenses 606 cause only minor variations in the overall focal length or optical power of optical system 600.

According to one aspect of the subject disclosure, a mechanical actuator 612 is provided that can control position of image sensor 608 and the one or more of set of lenses 606 which have the adjustable position along optical axis 610. In one aspect, mechanical actuator 612 can position image sensor 608 together with the one or more of set of lenses 606, keeping a fixed distance, D, there between. In an alternative aspect, mechanical actuator 612 can position image sensor 608 separately from the one or more of set of lenses 606 (where the distance there between can optionally be fixed or can optionally vary). In either case, it is to be appreciated that mechanical actuator 612 can position image sensor 608 or the one or more of set of lenses 606 in either direction along optical axis 610. Thus, when positioned toward the right side of optical axis 610, image sensor 608 can be at position 608B, or set of lenses 606 can be at position 606B, or both. Likewise, when positioned toward the left side of optical axis 610, image sensor 608 can be at position 608A, or set of lenses 606 can be at position 606A, or both.

Although a single right and left position adjustment for set of lenses 606 and image sensor 608 is depicted by FIG. 6, it is to be appreciated that optical system 600 is not so limited. Rather, mechanical actuator 612 can position set of lenses 606 and image sensor 608 at shorter or longer intervals than depicted. Also, it is to be appreciated that positions 608A, 608B, 606A and 606B are not drawn to scale, and are not intended to limited the scope or range over which mechanical actuator can adjust position of image sensor 608 and set of lenses 606. Rather, suitable ranges can be governed by various factors, including but not limited to a desired maximum optical track length, physical size or mechanical mobility constraints of a camera module that includes optical system 600, or the like.

Figure 7:
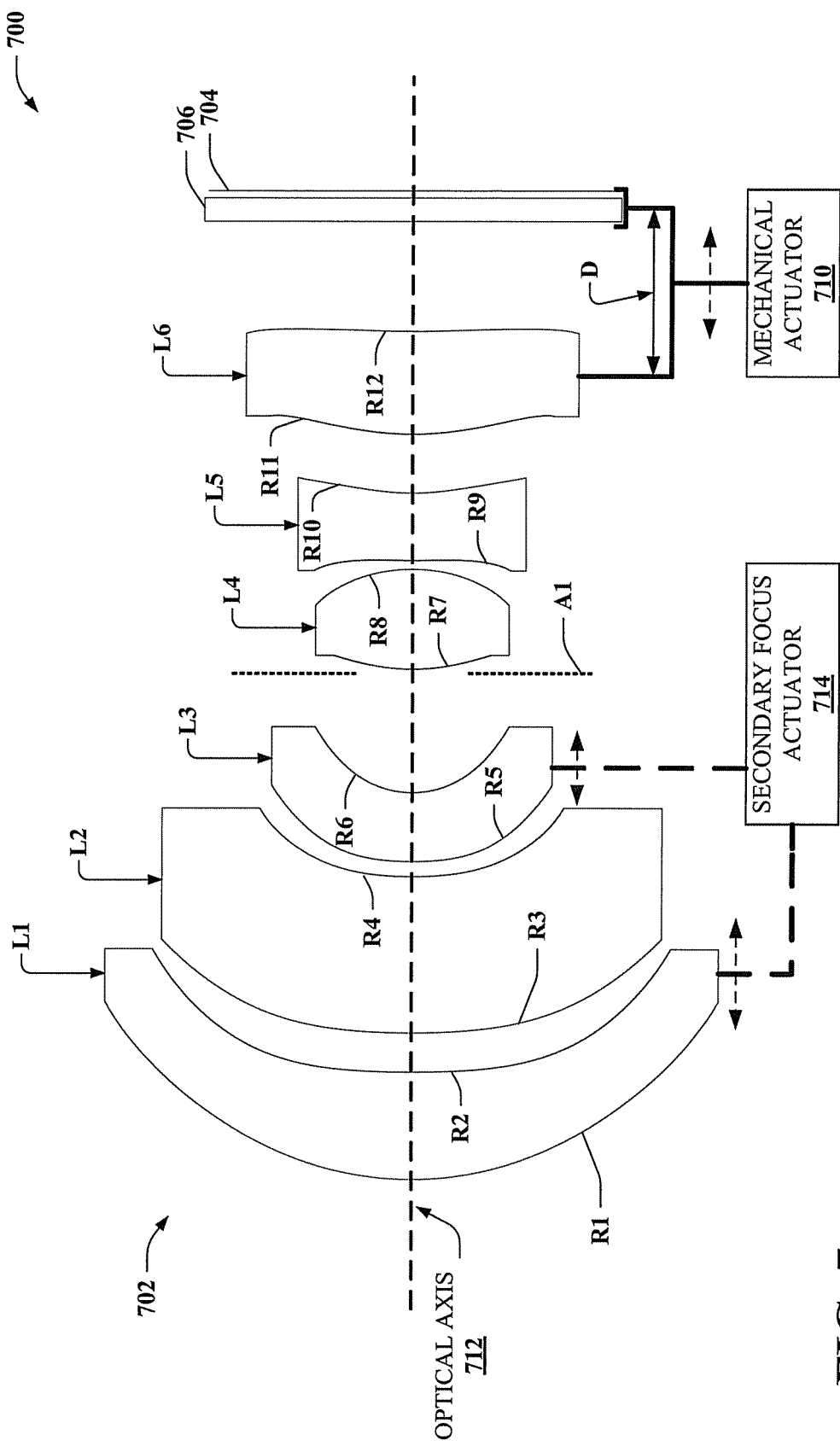
FIG. 7 illustrates the optical elements of FIG. 3 in conjunction with a mechanical actuator for field curvature correction.

FIG. 7 illustrates a block diagram of an example optical system 700 according to still other aspects of the subject disclosure. In one particular embodiment, optical system 700 can be a specific implementation of optical system 600 of FIG. 6, supra. However, the subject disclosure is not so limited. In other particular embodiments, optical system 700 comprises a set of optical components 702 that can be substantially similar to set of optical components 302 of FIG. 3, supra, however, optical system 700 is not limited to this particular embodiment(s).

In additional, or alternative, embodiments, optical system 700 can be described by the optical prescription given by Tables 3-5, below. Table 3 lists general lens data for optical system 700. Table 4 lists surface number in order from the object side to image side of optical system 700, radius of curvature (R, in mm) of each surface near the optical axis. Thickness value represents on-axis surface spacing along optical axis 712 of respective optical surfaces in order from object side to image side of optical system 700. Table 4 also includes lens diameter and material information for respective lenses. Specifically, a first material is identified as Mat1, whereas a separate material is identified as Mat2, wherein Mat2 and Mat1 are distinct materials. It should be appreciated that Mat1 and Mat2 can comprise suitable optical plastics, suitable optical glasses, or the like, or a suitable combination thereof. For instance, in one example, lenses L1-L6 can be made of a first plastic; lenses L1, L3, L4 and L6 being made of a first plastic (e.g., Mat1) and lenses L2 and L5 being made of a second plastic (e.g., Mat2). In any case, Mat 1 and Mat 2 are selected to provide proper compensation for optical system 700, the selections providing suitable refractive index and Abbe number for optical system 700. In at least one aspect, the F-number of optical system 700 can be substantially 2.85, and a total track length of optical system can be substantially 12.6 mm. Table 5 lists coefficient values A_i of the conventional aspheric equation, including values for i=2, 4, 6, 8, 10, 12, 14, 16. In at least one aspect of the subject disclosure, the condition TTL/f<2.2 is substantially satisfied, where f is a focal length of optical system 700 (e.g., a combined focal length of lenses L1-L6). This condition can, for instance, provide suitable field curvature correction while reducing the TTL of optical system 700. As depicted, set of optical components 702 comprises, from object side to image side, a first lens L1, a second lens L2, a third lens L3, an aperture stop A1, a fourth lens L4, a fifth lens L5 and a sixth lens L6. Optical system 700 additionally comprises an image sensor 704, and optionally a cover plate (e.g., glass cover plate, plastic cover plate, etc.) between image sensor 704 and lens L6. In at least one aspect, similar to that described above at FIG. 3, set of lenses 702 can include a first group of lenses G1, and a second group of lenses G2. As one example, G1 can include Lenses L1-L5, whereas G2 can include lens L6. Further, according to this aspect, the following conditions can be satisfied or substantially satisfied: $f\_1/f<1.85$, $f\_1/f\_G1<1.35$, where $f\_1$ is the focal length of lens L1, and $f\_G1$ is the combined focal length of the lenses of lens group G1. In at least one alternative or additional aspect, the following condition can be satisfied or substantially satisfied: $f\_G1/f<1.37$. These conditions can provide correction for field curvature and unintentional distortions for optical system 700. Moreover, these conditions can enable maintaining favorable correction of various aberrations in addition to correcting astigmatism and chromatic aberrations concurrently.

In addition or alternatively to the foregoing, the condition $f\_1/f<1.85$ can correspond to a relatively strong optical power for lens L1, which can enable a relatively small TTL. Further to the above, optical system 700 can satisfy or substantially satisfy the condition $(b\_f)/f<0.3065$, where $b\_f$ is the back focal length defined as the distance from surface R12 to image surface 704 for the case of an object at infinity being in focus at image surface 704. These conditions enable insertion of a component such as a filter, between set of lenses 702 and image surface 704 without compromising the compact structure of optical system 700. According to a further aspect, an Abbe number can be between 50 and 60 for lenses L1, L3, L4 and L6. Moreover, an Abbe number for lenses L2 and L5 can be between 20 and 30. According to a further aspect, the following Abbe number conditions can be satisfied or substantially satisfied: Abbe number of L1-Abbe number of L2>about 30, Abbe number of L4-Abbe number of L5>about 30. Satisfying these conditions of the difference in Abbe numbers of lens group G1 can enable control of lateral color aberration to provide sufficient correction of chromatic aberration.

TABLE 3

General Optical Parameters for Optical System 700

| Parameter Description | Value |
| --- | --- |
| Effective Focal Length (in air at system temperature and | 5.74443 |
| Effective Focal Length (in image space) | 5.74443 |
| Total Track Length (TTL) | 12.6137 |
| Working F/# | 2.857105 |
| Image Space NA | 0.1752143 |
| Angular Magnification | 1.183246 |

TABLE 4

Optical Surface Data for Optical System 700

| Surface | Type | Radius | Thickness | Material | Diameter | Conic | Comment |
| --- | --- | --- | --- | --- | --- | --- | --- |
| OBJ | Standard | Infinity | 2000 | | 2610.071 | 0 | |
| 1 (R1) | Even Asph | 4.229669 | 1.3725 | Mat 1 | 7.833765 | −3.224 | L1 |
| 2 (R2) | Even Asph | 14.59007 | 0.5 | Mat 1 | 6.626065 | 16.228 | L1 |
| 3 (R3) | Even Asph | 10.54038 | 1.993 | Mat 2 | 6.383808 | 0.718 | L2 |

TABLE 4-continued

Optical Surface Data for Optical System 700

| Surface | Type | Radius | Thickness | Material | Diameter | Conic | Comment |
|---|---|---|---|---|---|---|---|
| 4 (R4) | Even Asph | 5.042679 | 0.192 | Mat 2 | 3.899216 | 3.955 | L2 |
| 5 (R5) | Even Asph | 4.274644 | 0.879 | Mat 1 | 3.59769 | 4 | L3 |
| 6 (R6) | Even Asph | 1.281467 | 1.518 | Mat 1 | 2.492378 | −0.2925042 | L3 |
| 7 | Stop | Infinity | 0.056 | | 1.466361 | 0 | |
| 8 | Break | | 0 | | | | Element Tilt |
| 9 (R7) | Even Asph | 2.725833 | 1.275 | Mat 1 | 2.020077 | −6.054 | L4 |
| 10 (R8) | Even Asph | −2.341422 | −1.275 | Mat 1 | 2.482354 | −7.2565 | L4 |
| 11 | Break | | 1.275 | | | | Element Tilt |
| 12 | Standard | Infinity | 0.1136 | | 2.523938 | 0 | Dummy |
| 13 (R9) | Even Asph | 11.88147 | 0.8596 | Mat 2 | 2.527172 | 0 | L5 |
| 14 (R10) | Even Asph | 3.08467 | 0.7521 | Mat 2 | 2.926635 | −4.7746 | L5 |
| 15 (R11) | Even Asph | 4.044714 | 1.3116 | Mat 1 | 3.659141 | 0 | L6 |
| 16 (R12) | Even Asph | 13.34203 | 1.399296 | Mat 1 | 4.258305 | 0 | L6 |
| 17 | Standard | Infinity | 0.3 | 1.523100, 55.00000 | 5.179847 | 0 | Cover Glass |
| 18 | Standard | Infinity | 0.092 | | 5.321483 | 0 | |
| IMA | Standard | Infinity | | | 5.212071 | 0 | |

TABLE 5

Detailed Lens Surface Data for Optical System 700

| Surface | Parameter Description | Value |
|---|---|---|
| R1 | Even Asphere | |
| | Coefficient on r 2 | 0 |
| | Coefficient on r 4 | 0.0050752508 |
| | Coefficient on r 6 | −8.0418448e−005 |
| | Coefficient on r 8 | −1.2574968e−005 |
| | Coefficient on r 10 | 8.5253994e−007 |
| | Coefficient on r 12 | 0 |
| | Coefficient on r 14 | 0 |
| | Coefficient on r 16 | 0 |
| R2 | Even Asphere | |
| | Coefficient on r 2 | 0 |
| | Coefficient on r 4 | 0.010630402 |
| | Coefficient on r 6 | −0.00020632094 |
| | Coefficient on r 8 | 0 |
| | Coefficient on r 10 | 0 |
| | Coefficient on r 12 | 0 |
| | Coefficient on r 14 | 0 |
| | Coefficient on r 16 | 0 |
| R3 | Even Asphere | |
| | Coefficient on r 2 | 0 |
| | Coefficient on r 4 | 0.0094889848 |
| | Coefficient on r 6 | −0.00028044356 |
| | Coefficient on r 8 | 0 |
| | Coefficient on r 10 | 0 |
| | Coefficient on r 12 | 0 |
| | Coefficient on r 14 | 0 |
| | Coefficient on r 16 | 0 |
| R4 | Even Asphere | |
| | Coefficient on r 2 | 0 |
| | Coefficient on r 4 | 0.03797117 |
| | Coefficient on r 6 | −0.0023052391 |
| | Coefficient on r 8 | −0.002244545 |
| | Coefficient on r 10 | 0.00052930486 |
| | Coefficient on r 12 | 0 |
| | Coefficient on r 14 | 0 |
| | Coefficient on r 16 | 0 |
| R5 | Even Asphere | |
| | Coefficient on r 2 | 0 |
| | Coefficient on r 4 | 0.084158958 |
| | Coefficient on r 6 | −0.018633593 |
| | Coefficient on r 8 | 0.0024041838 |
| | Coefficient on r 10 | −0.00030262043 |
| | Coefficient on r 12 | 0 |
| | Coefficient on r 14 | 0 |
| | Coefficient on r 16 | 0 |
| R6 | Even Asphere | |
| | Coefficient on r 2 | 0 |
| | Coefficient on r 4 | 0.085425878 |
| | Coefficient on r 6 | −0.10641887 |
| | Coefficient on r 8 | 0.13472769 |
| | Coefficient on r 10 | −0.090132084 |
| | Coefficient on r 12 | 0.020830944 |
| | Coefficient on r 14 | 0 |
| | Coefficient on r 16 | 0 |
| Coordinated Break | Element Tilt | |
| | Decenter X | 0 |
| | Decenter Y | 0 |
| | Tilt About X | 0 |
| | Tilt About Y | 0 |
| | Tilt About Z | 0 |
| | Order | Decenter then Tilt |
| R7 | Even Asphere | |
| | Coefficient on r 2 | 0 |
| | Coefficient on r 4 | 0.022791497 |
| | Coefficient on r 6 | 0.030474529 |
| | Coefficient on r 8 | −0.11155221 |
| | Coefficient on r 10 | 0.11449845 |
| | Coefficient on r 12 | −0.043645437 |
| | Coefficient on r 14 | 0 |
| | Coefficient on r 16 | 0 |
| R8 | Even Asphere | |
| | Coefficient on r 2 | 0 |
| | Coefficient on r 4 | −0.13957456 |
| | Coefficient on r 6 | 0.085673252 |
| | Coefficient on r 8 | −0.043646741 |
| | Coefficient on r 10 | 0.0086062545 |
| | Coefficient on r 12 | −0.0018918563 |
| | Coefficient on r 14 | 0 |
| | Coefficient on r 16 | 0 |
| Coordinated Break | Element Tilt | |
| | Decenter X | 0 |
| | Decenter Y | 0 |
| | Tilt About X | 0 |
| | Tilt About Y | 0 |
| | Tilt About Z | 0 |
| | Order | Tilt then Decenter |
| R9 | Even Asphere | |
| | Coefficient on r 2 | 0 |
| | Coefficient on r 4 | −0.11381214 |
| | Coefficient on r 6 | 0.051395573 |
| | Coefficient on r 8 | −0.02081412 |
| | Coefficient on r 10 | 0.0035513961 |
| | Coefficient on r 12 | −0.0012023498 |
| | Coefficient on r 14 | 0 |
| | Coefficient on r 16 | 0 |
| R10 | Even Asphere | |
| | Coefficient on r 2 | 0 |
| | Coefficient on r 4 | −0.042580288 |

TABLE 5-continued

Detailed Lens Surface Data for Optical System 700

| Surface | Parameter Description | Value |
|---|---|---|
|  | Coefficient on r 6 | 0.0092521982 |
|  | Coefficient on r 8 | 0.00097565235 |
|  | Coefficient on r 10 | −0.00030549923 |
|  | Coefficient on r 12 | 0 |
|  | Coefficient on r 14 | 0 |
|  | Coefficient on r 16 | 0 |
| R11 | Even Asphere |  |
|  | Coefficient on r 2 | 0 |
|  | Coefficient on r 4 | −0.0097915655 |
|  | Coefficient on r 6 | −0.0037323424 |
|  | Coefficient on r 8 | 0.0014637092 |
|  | Coefficient on r 10 | −0.00033814236 |
|  | Coefficient on r 12 | 0 |
|  | Coefficient on r 14 | 0 |
|  | Coefficient on r 16 | 0 |
| R12 | Even Asphere |  |
|  | Coefficient on r 2 | 0 |
|  | Coefficient on r 4 | −0.020192576 |
|  | Coefficient on r 6 | 0.0057403648 |
|  | Coefficient on r 8 | −0.00075467662 |
|  | Coefficient on r 10 | 0 |
|  | Coefficient on r 12 | 0 |
|  | Coefficient on r 14 | 0 |
|  | Coefficient on r 16 | 0 |

According to one aspect of the subject disclosure, set of optical components 702 can be configured such that the dominant optical power of the set of optical components 702 is provided by lenses L1, L2 and L3, or a subset thereof. Additionally, lens L6 can be configured to have a mild shape, or small optical power, to mitigate de-center error associated with lens L6, and to mitigate change in overall focal length of set of optical components 702 resulting from movement of lens L6 with respect to lenses L1-L5.

As depicted, optical system 700 can additionally comprise a mechanical actuator 710. In one embodiment, mechanical actuator 710 is configured to reduce field curvature error of optical system 700 (e.g., where optical system 700 is a distorted zoom lens system, having distortion introduced by intentional deformation of one or more of lenses L1-L6, or other suitable means for distortion). Reduction of field curvature error can be for small, medium or large field angles, or for nominal (e.g., 1×), medium (e.g., 2×) or large (e.g., 3×) zoom configurations. Field curvature reduction can be accomplished by controlling relative position of image sensor 704 and lens L6, while maintaining a fixed distance D therebetween, based at least in part on a distance between an object being imaged by optical system 700 and the front of lens L1 (also referred to as the OD of the object). By changing the position of image sensor 704 to one of a set of predetermined locations along optical axis 712, mechanical actuator 710 can activate a zoom configuration (e.g., 1×, 2×, 3×, and so on) associated with respective predetermined locations of the set. Additionally, by changing position of lens L6 in conjunction with the position of image sensor 704 both with respect to the front lens L1, the focal length of the set of lenses 702 is changed by mechanical actuator 710. This can provide field curvature correction to an image focused onto image sensor 704 by optical system 700. It should be appreciated that position of mechanical actuator 710 can be implemented automatically based on a given OD, can be optimized to minimize image error or maximize image quality (e.g., see FIG. 5, supra), or can be repositioned manually by a user of an electronic device, for instance, in response to image focus errors viewed on a display screen of the electronic device. In at least one aspect of the subject disclosure, a combination of the foregoing mechanisms can be implemented to control position of mechanical actuator 710.

In addition to the foregoing, alternate embodiments of optical system 700 are considered part of the subject disclosure. For instance, although FIG. 7 depicts mechanical actuator 710 coupled to lens L6 and image sensor 704, the subject disclosure is not limited to this depicted embodiment. Instead, mechanical actuator 710 can be coupled with lenses L1-L5 (or a subset thereof) and can control position of these lenses relative to a fixed position of lens L6 and image sensor 704. In either case, a fixed distance D can be maintained between lens L6 and image sensor 704 in various aspects of the subject disclosure.

In at least one particular aspect of the subject disclosure, optical system 700 can comprise a secondary focus actuator 714. Secondary focus actuator can be employed to provide automated focusing capabilities for optical system 700, in addition to the correction of optical aberrations provided by mechanical actuator 710. In one instance, secondary focus actuator 714 can be coupled with lens L1, and adjust a position of L1 with respect to optical axis 712 to achieve the auto-focus. In another instance, secondary focus actuator 714 can be coupled with lens L3, and adjust a position of L3 with respect to optical axis 712 to achieve the auto-focus. In yet another instance, secondary focus actuator 714 can be coupled with both lens L1 and lens L3, where a position of lens L1 and L3 can be adjusted along optical axis 712, with a fixed distance maintained between the lenses L1 and L3. Note that other lenses of optical system 700 (e.g., L2, optionally L1 or L3, L4, L5, L6) not physically coupled to secondary focus actuator 714 are not affected by adjustments of the secondary focus actuator 714. Further, secondary focus actuator 714 can operate independent of mechanical actuator 710. However, in at least one aspect of the subject disclosure, a processor(s) (e.g., processor 508, supra) and control module(s) (e.g., positioning module 516, image analysis module 514, optimization module 518, input module 520) governing optical position adjustments caused by secondary mechanical actuator 714 and mechanical actuator 710 can analyze independent and combined effects on image quality as a result of these position adjustments, and optimize the respective position adjustments to achieve a desired image quality (e.g., see FIG. 5, supra).

Figure 8:
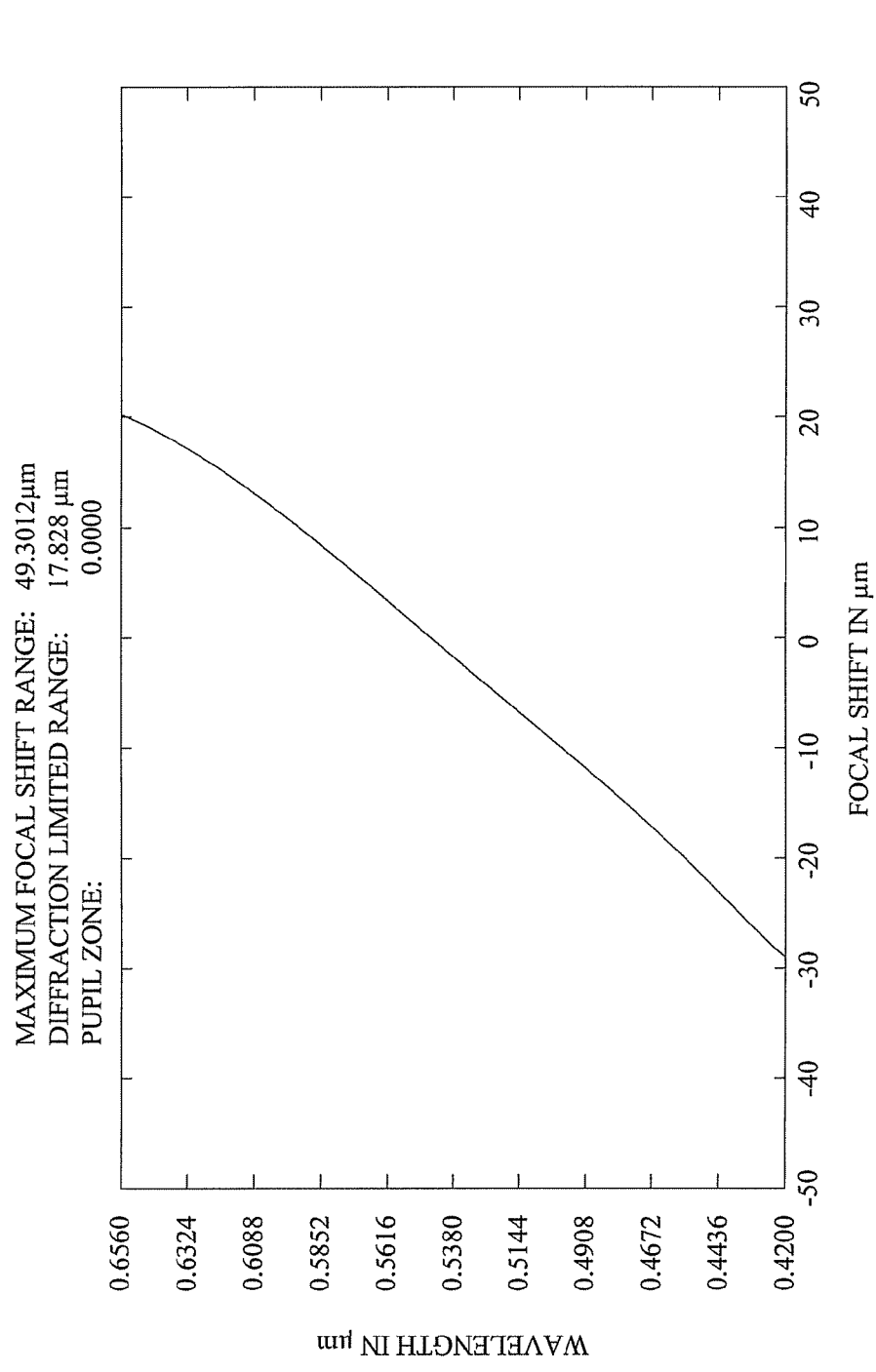
FIG. 8 depicts an example chromatic focal shift diagram for the optical elements.

FIG. 8 depicts an example diagram of chromatic focal shift for an optical system according to aspects of the subject disclosure. In at least one aspect, the chromatic focal shift corresponds with a set of optical elements substantially similar to set of optical components 302 of FIG. 3, supra, or set of optical components 702 of FIG. 7, supra. As is depicted, the chromatic focal shift is plotted as a function of wavelength in micrometers along the vertical axis and as a function of focal shift in micrometers along the horizontal axis. The focal shift ranges from just less than negative 30 micrometers at 0.4200 micrometer wavelengths, to a positive 20 micrometer focal shift for wavelengths at 0.6560 micrometers. The variation in focal shift as a function of wavelength is substantially linear over much of the depicted wavelengths (e.g., from 0.4672 to approximately 0.6088 micrometer wavelengths), but overall is a non-linear relationship. The maximum focal shift over the depicted range of wavelengths is 49.3012 micrometers, versus a diffraction limited range of focal shifts of 17.828 micrometers.

Figure 9:
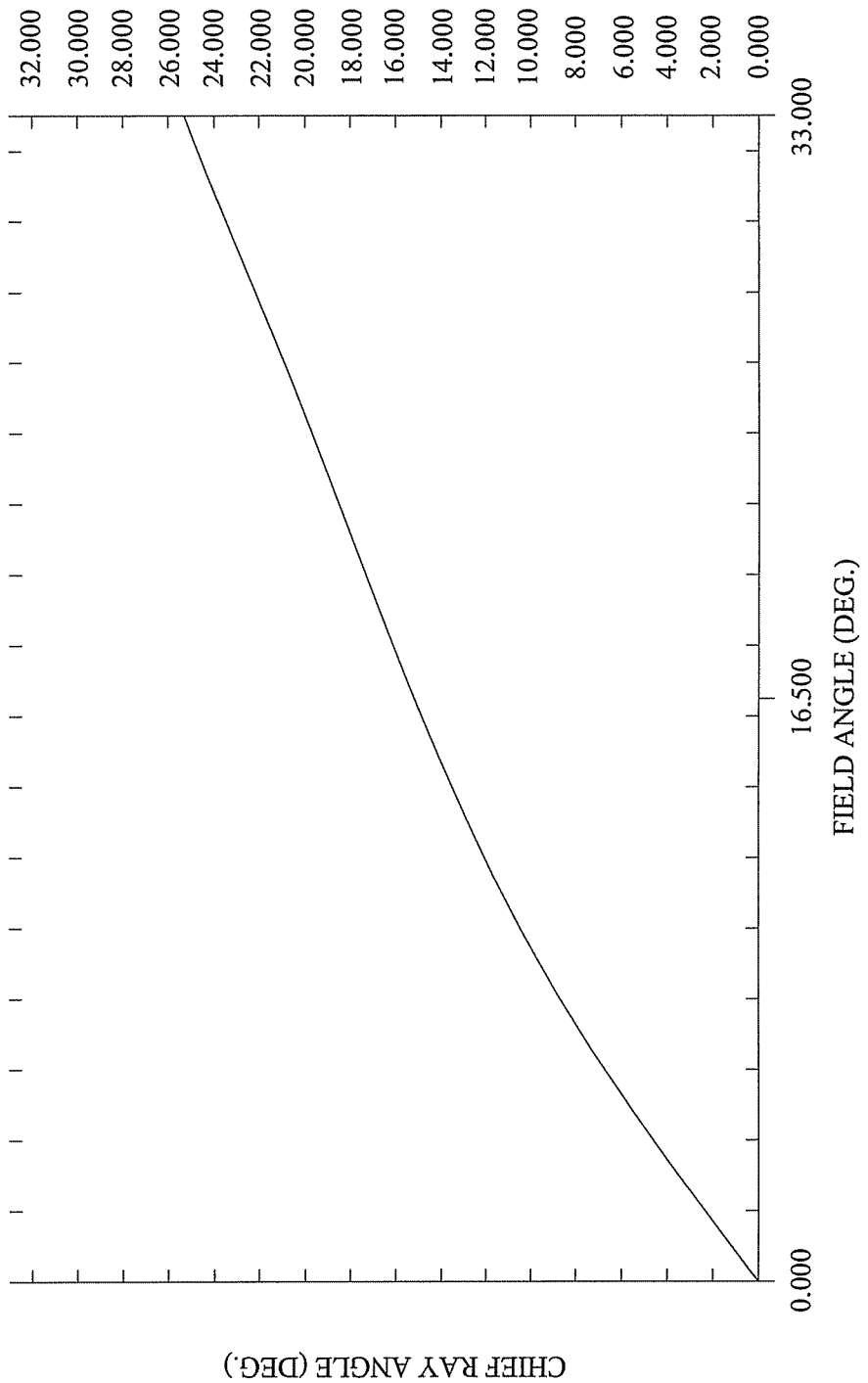
FIG. 9 depicts an example diagram of chief ray angle v. viewing angle for the optical elements.
Figure 10:
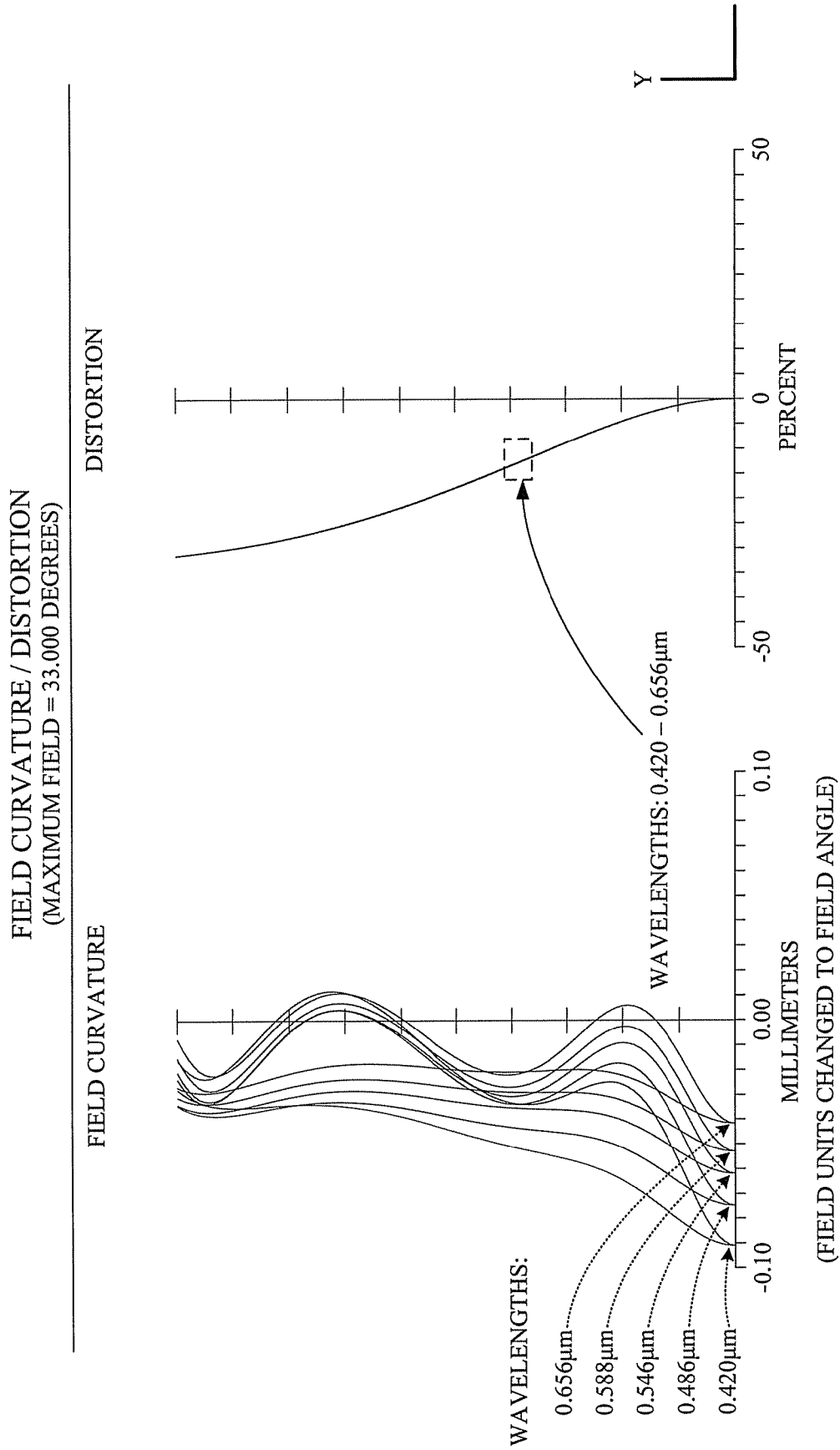
FIG. 10 illustrates example field curvature and distortion diagrams for the optical elements for wavelengths between 0.420 and 0.656 nanometers.

FIG. 9 illustrates a sample graph for an optical system according to additional aspects of the subject disclosure. The optical system can be substantially similar to set of optical components 302 or set of optical components 702, supra. The graph of FIG. 10 depicts chief ray angle in degrees on the vertical axis, versus field angle (also referred to as viewing angle)—also in degrees—along the horizontal axis. Accordingly, the line depicted by the graph indicates a ratio of these respective angles for a range of chief ray angles and field angles of the optical system. In one aspect of the subject disclosure, field angles of twelve degrees, sixteen and one half degrees and thirty-three degrees can correspond substantially to 3×, 2× and 1× magnification of the optical system, respectively.

FIG. 10 depicts example diagrams of field curvature and distortion for an optical system according to still other disclosed aspects. The optical system can be substantially similar to set of optical components 302 or set of optical components 702, supra, in at least some embodiments. The maximum field angle for the field curvature and distortion graphs is thirty-three degrees. Additionally, data is compiled for wavelengths of 0.420, 0.486, 0.546, 0.588 and 0.656 micrometers for both diagrams. As is depicted, the field curvature ranges between approximately positive 0.01 and approximately negative 0.09 millimeters, with most significant field curvature between 0.00 and negative 0.05 millimeters. Distortion is small between respective wavelengths, as indicated by the tight bundle of wavelength lines on the distortion diagram. However, distortion is fairly significant, ranging from 0 to as great as approximately negative thirty-five percent.

Figure 11:
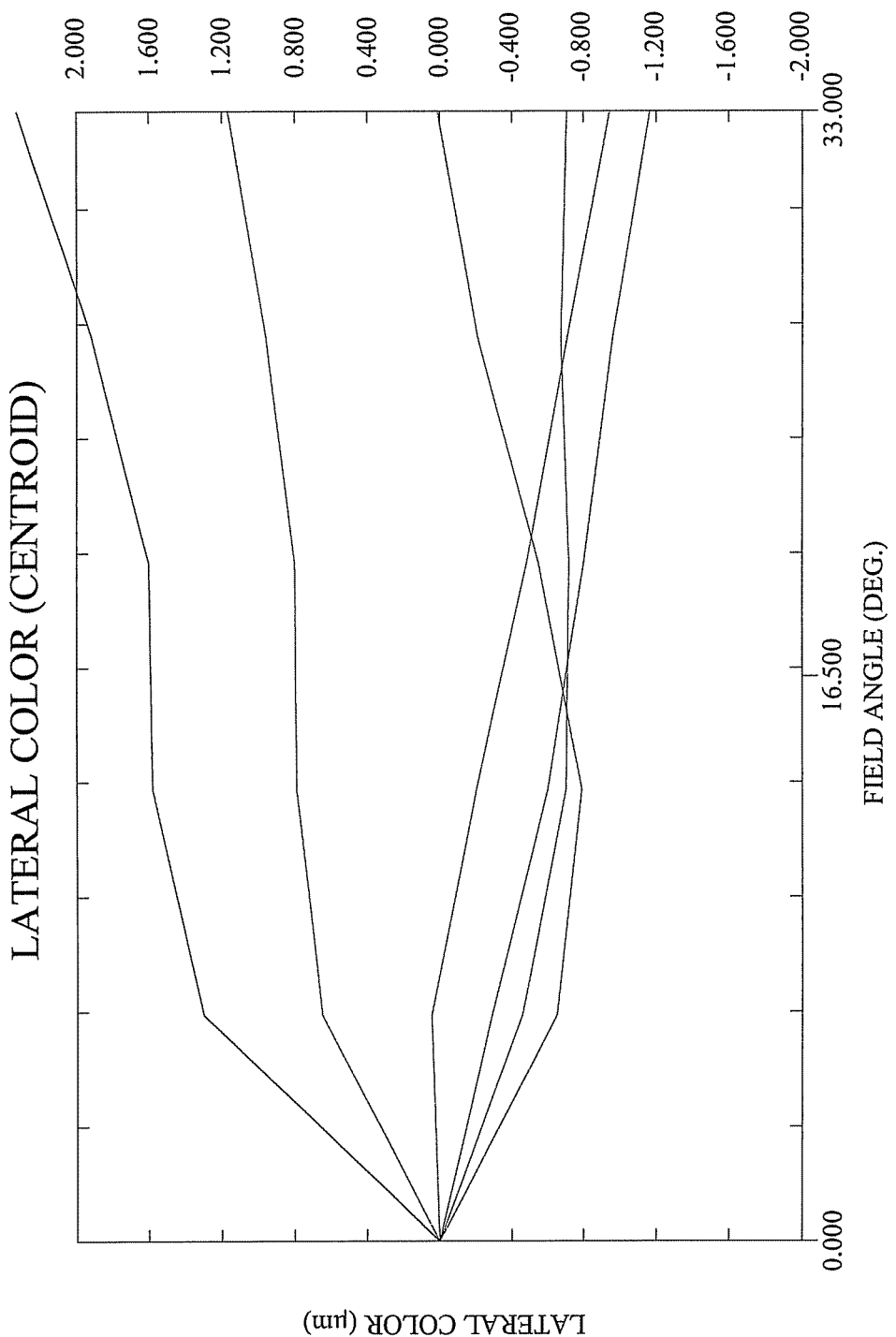
FIG. 11 depicts an example lateral color diagram for the optical elements as a function of field angle.

FIG. 11 illustrates an example diagram of lateral color for an optical system in accordance with yet other aspects disclosed herein. The optical system can be substantially similar to set of optical components 302 or set of optical components 702, supra. The lateral color diagram covers a range of field angles from zero up to thirty-three degrees. Additionally, the lateral color diagram comprises separate lines for a range of wavelengths, including wavelengths of 0.420, 0.486, 0.546, 0.588 and 0.656 micrometers. More specifically, the lateral color metric on the vertical axis is over a range of negative two to positive two micrometers.

Figure 36:
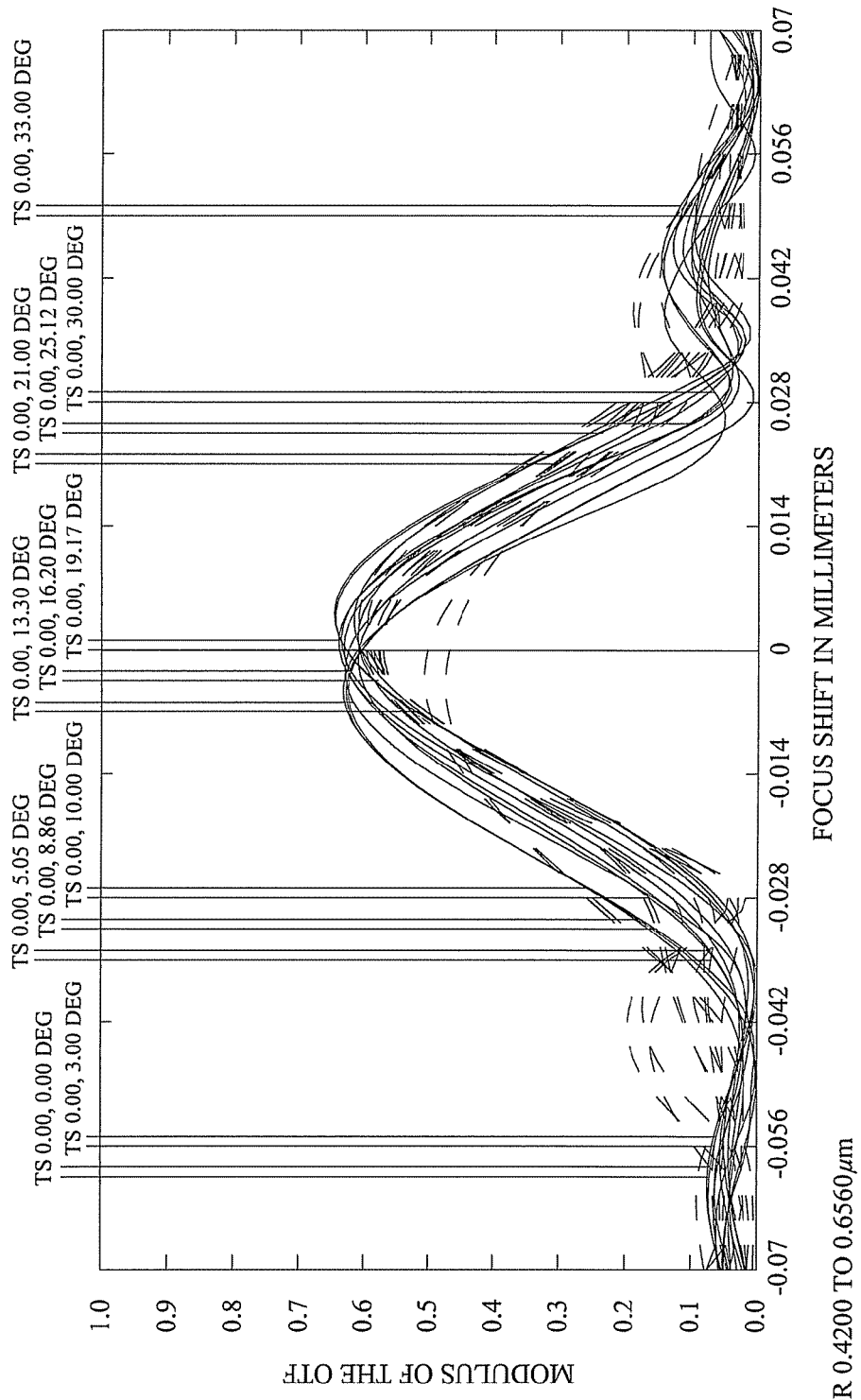
FIGS. 36 and 37 illustrate sample diagrams of uncorrected TFMTFs for an OD of 2.0 meters and 1× zoom and 2× zoom, respectively.
Figure 37:
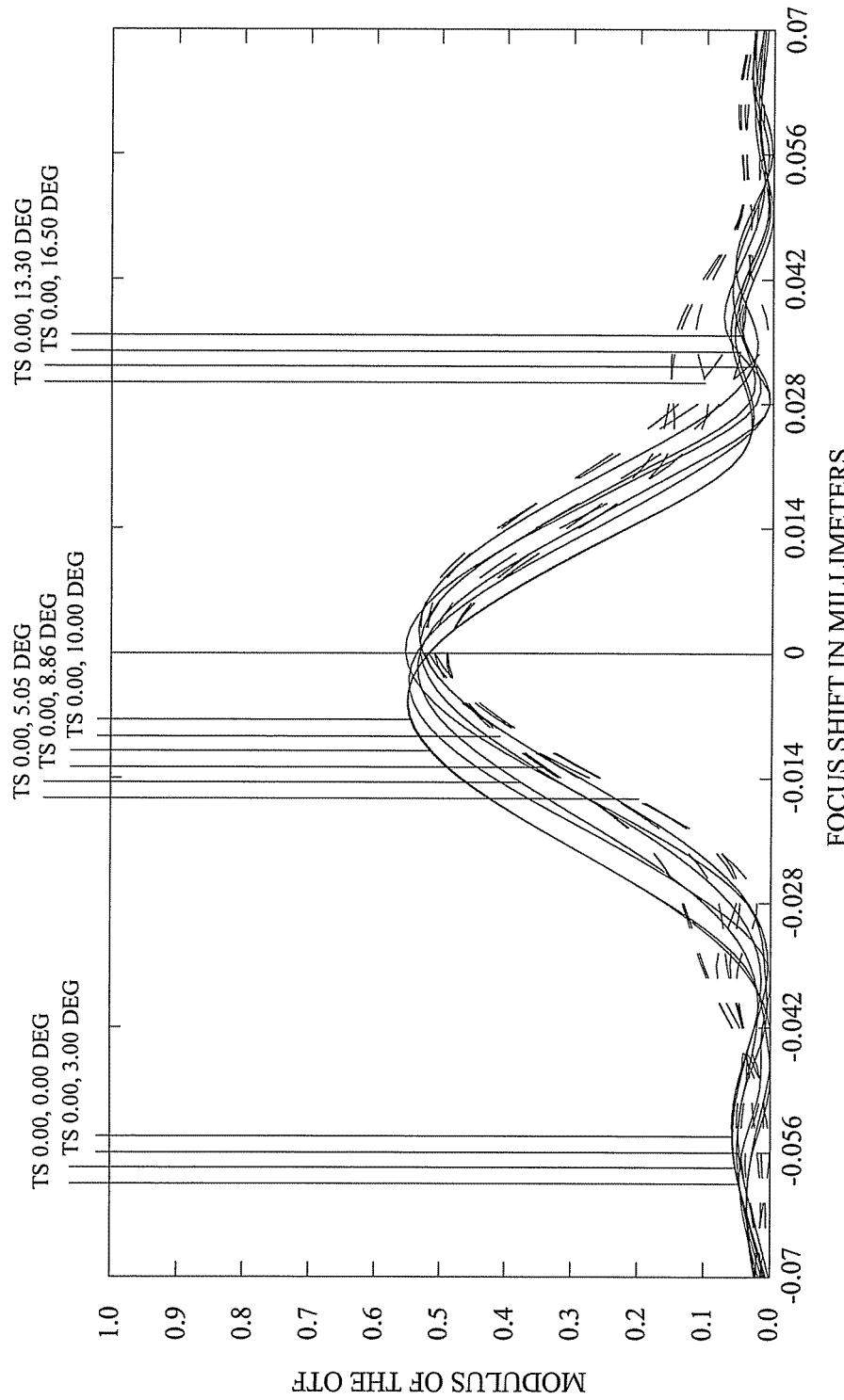

FIGS. 12 through 35 depict polychromatic diffraction TFMTF diagrams for optical system 700 at various object distances, ranging from 0.3 meters to 1.0 meters, and for various zoom magnifications, ranging from 1× zoom to 3× zoom. In addition, several polychromatic diffraction TFMTF diagrams for optical system 700 with field curvature correction are provided to contrast with non-corrected optical system configurations. The field curvature correction comprises a displacement of lens L6 and image sensor 704 along optical axis 712 relative to a non-corrected, default position of lens L6 and image sensor 704 along optical axis 712. Each of FIGS. 12 through 35 will be discussed separately below. Furthermore, FIGS. 36 and 37 depict non-corrected polychromatic TFMTF diagrams for an object distance of 2.0 meters, which have minimal field curvature error to contrast with smaller object distances.

Figure 12:
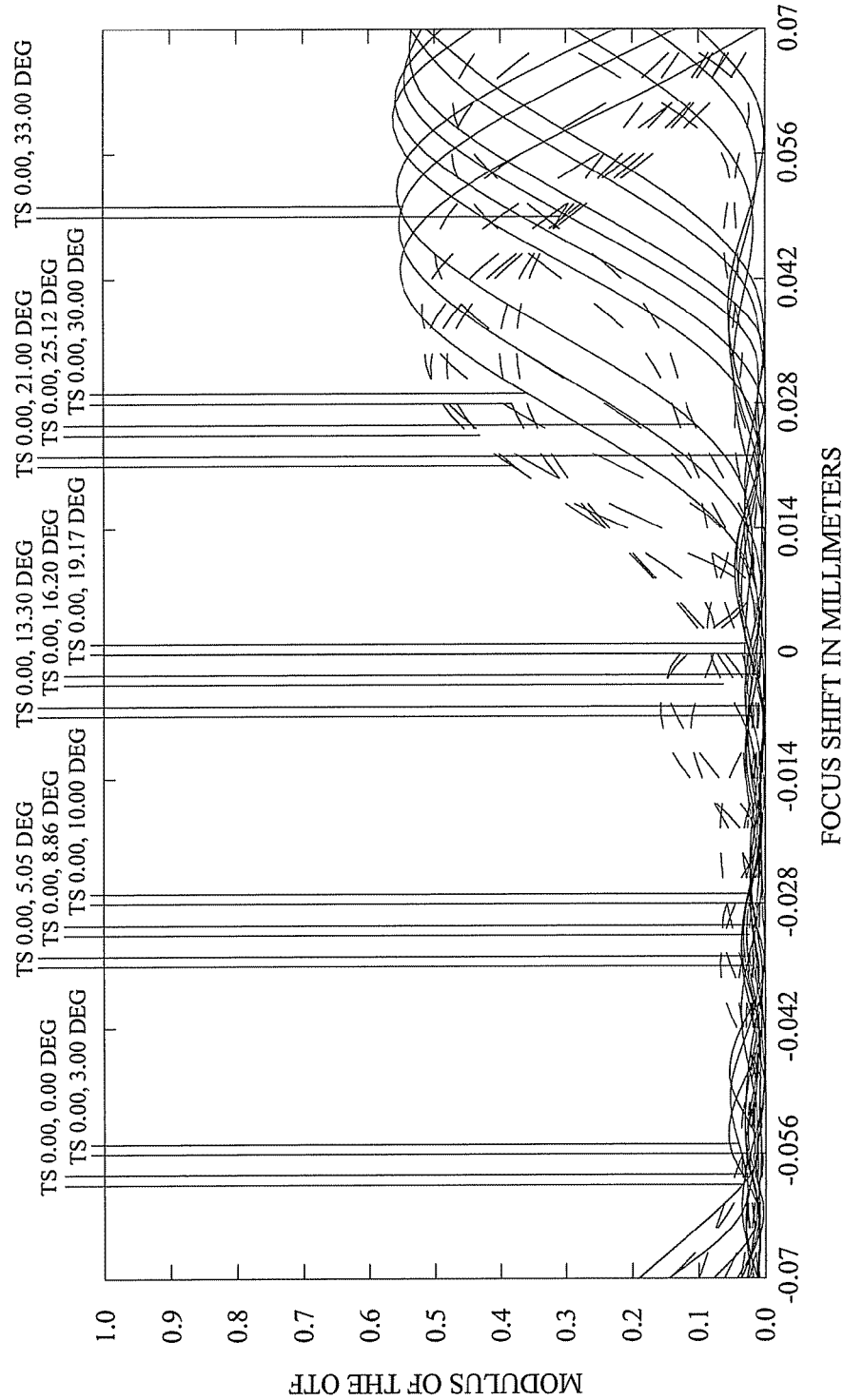
FIGS. 12 and 13 depict example diagrams of through focus modulation transfer functions (TFMTFs) for the optical elements that correspond with an object distance (an OD) of 0.3 meters and 1× zoom (33 degree field angle) without field correction and with field correction, respectively.
Figure 13:
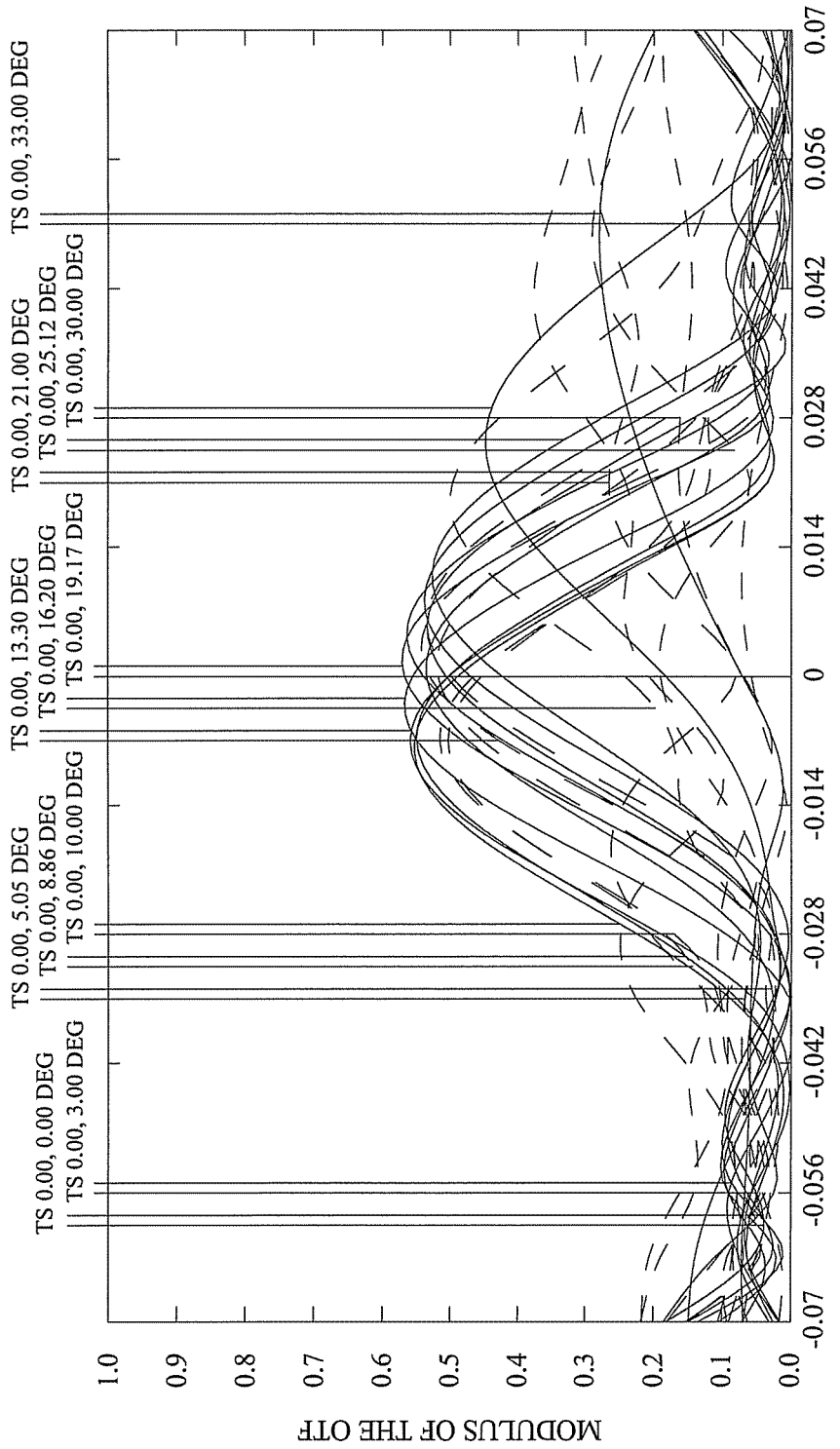

FIGS. 12 and 13 illustrate example TFMTF diagrams for optical system 700, for an object distance of 0.3 meters, 1× zoom magnification and thirty-three degree field angle. FIG. 12 is not corrected for field curvature, and exhibits significant field curvature error. At a focus shift of zero millimeters (horizontal axis), the MTF curves (solid lines) exhibit values MTF values on the vertical axis that are substantially less than a typical target MTF of 0.3 that is sufficient for many imaging applications. To improve MTF for optical system 700 (e.g., where optical system 700 is a distorted zoom lens system) with object distance of 0.3 meters and zoom magnification of 1×, a correction of 0.92 millimeters is applied to lens L6 and image sensor 704 (with a fixed distance D maintained between lens L6 and image sensor 704). The corrected MTF is depicted by FIG. 13. As is evident by the TFMTF diagram of FIG. 13, the MTF curves (solid lines) are significantly greater than the target MTF of 0.3 at zero focus shift (horizontal axis). It should be appreciated that the correction of 0.92 micrometers can be predetermined for optical system 700 based on 0.3 meter object distance, can be optimized by an optimization module (e.g., see FIG. 5, supra) or can result at least in part from user input, as described herein.

Figure 14:
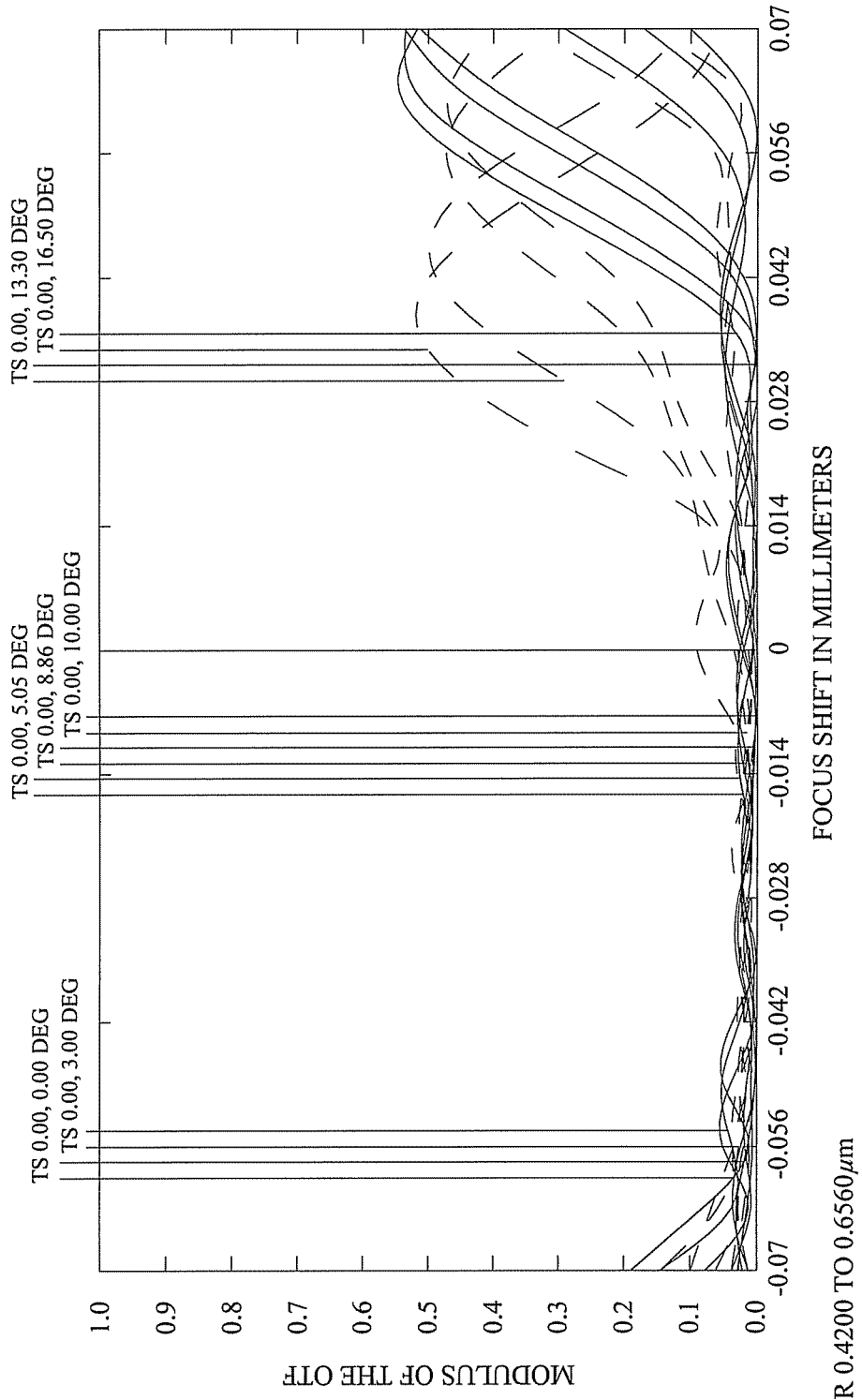
FIGS. 14 and 15 depict example diagrams of uncorrected and corrected TFMTFs, respectively, for an OD of 0.3 meters and 2× zoom (16.5 degree field angle).
Figure 15:
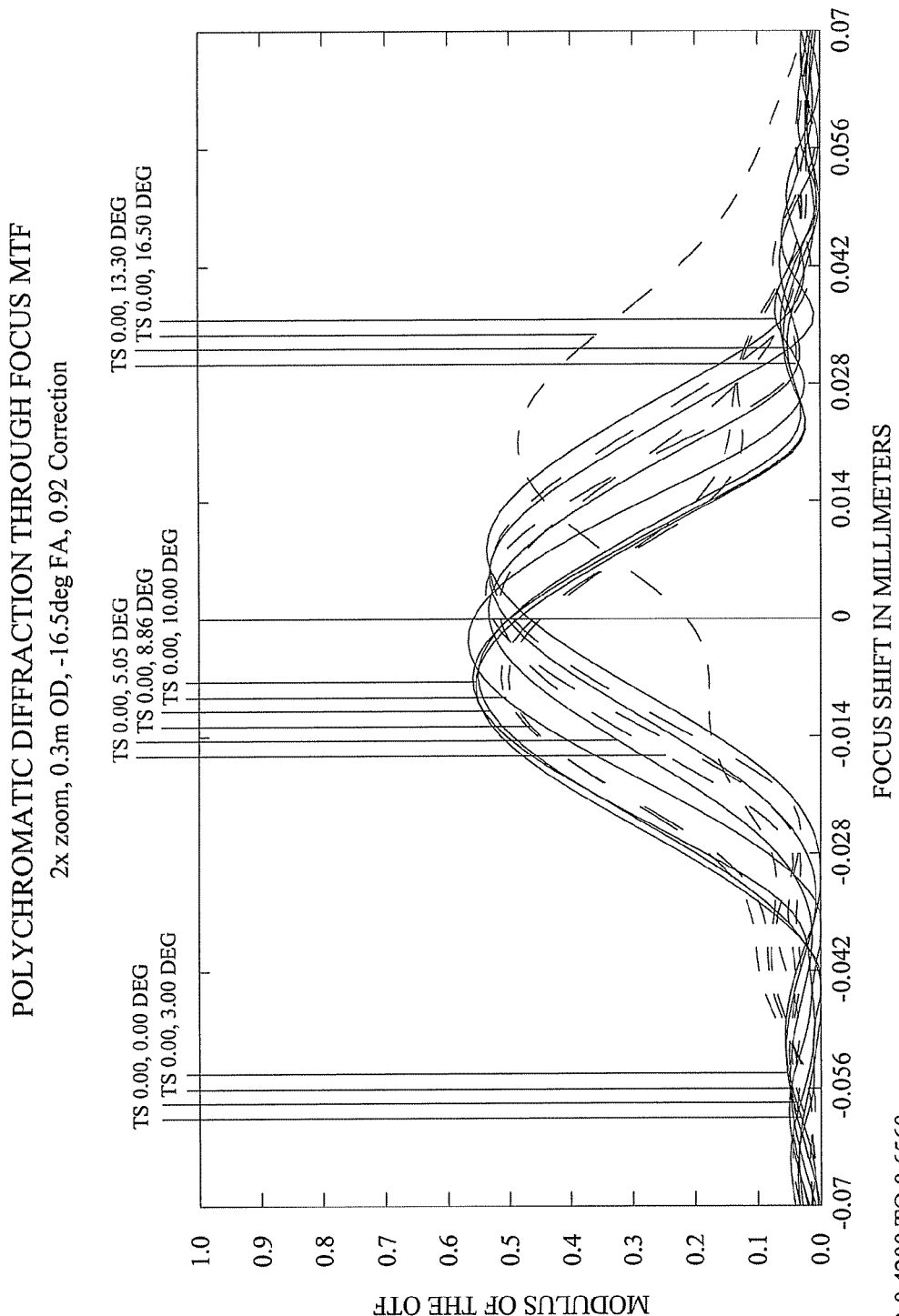

FIGS. 14 and 15 illustrate example TFMTF diagrams for optical system 700, for an object distance of 0.3 meters, 2× zoom magnification and sixteen and one half degree field angle. Specifically, FIG. 14 is uncorrected for field curvature error, whereas FIG. 15 is corrected for field curvature by 0.92 micrometer adjustment of lens L6 and image sensor 704. As depicted at FIG. 14, the MTF value at zero focus shift is substantially lower than the target MTF of 0.3, and is substantially similar to the MTF value at zero focus for 1× zoom magnification depicted at FIG. 12, supra. Likewise, field curvature correction of 0.92 micrometers provides significant field curvature correction, as depicted by FIG. 15. Specifically, the MTF depicted by the TFMTF diagram of FIG. 15 is substantially greater than the target MTF of 0.3, indicating a suitably focused image at image sensor 704.

Figure 16:
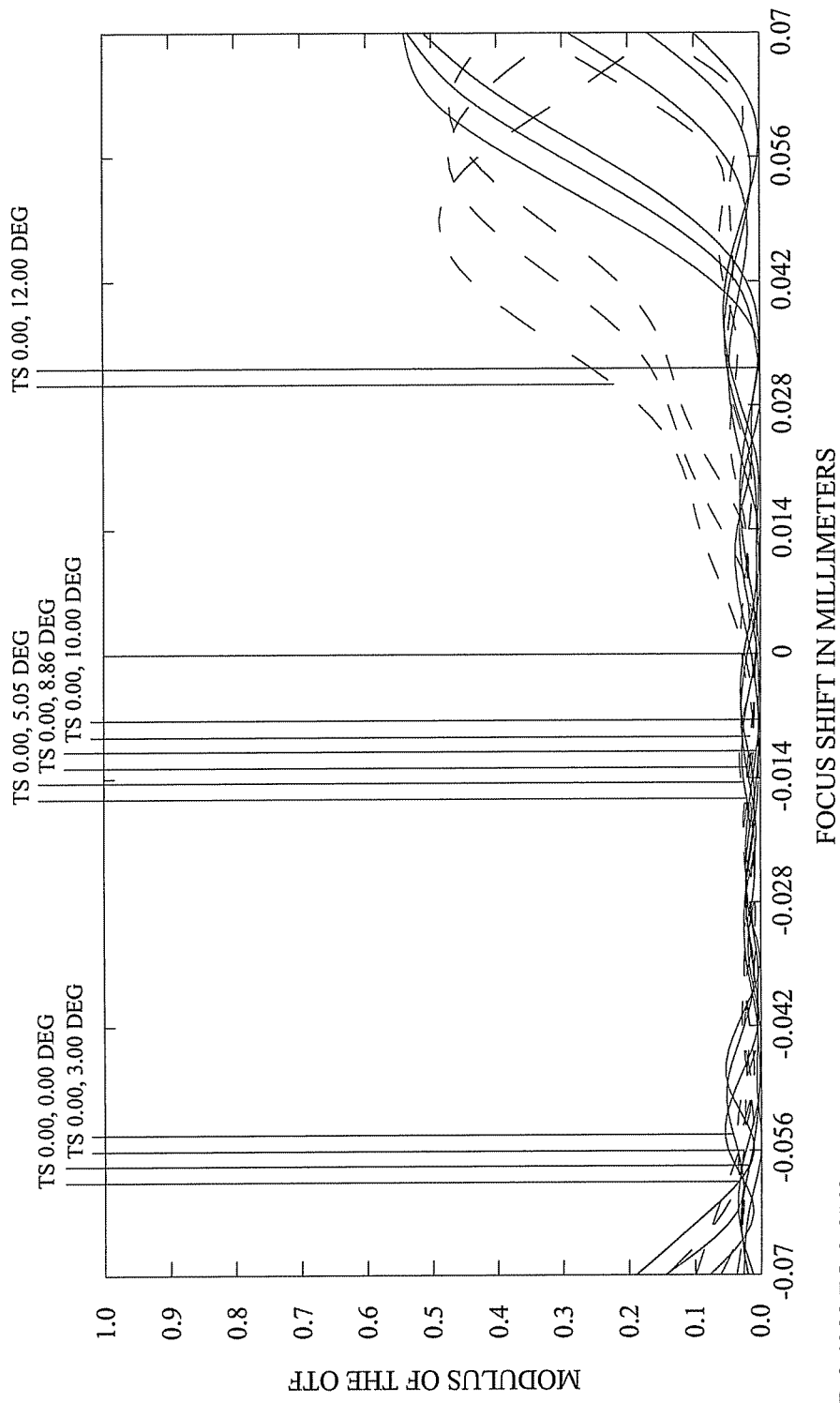
FIGS. 16 and 17 depict example diagrams of uncorrected and corrected TFMTFs, respectively, for an OD of 0.3 meters and 3× zoom (12 degree field angle).
Figure 17:
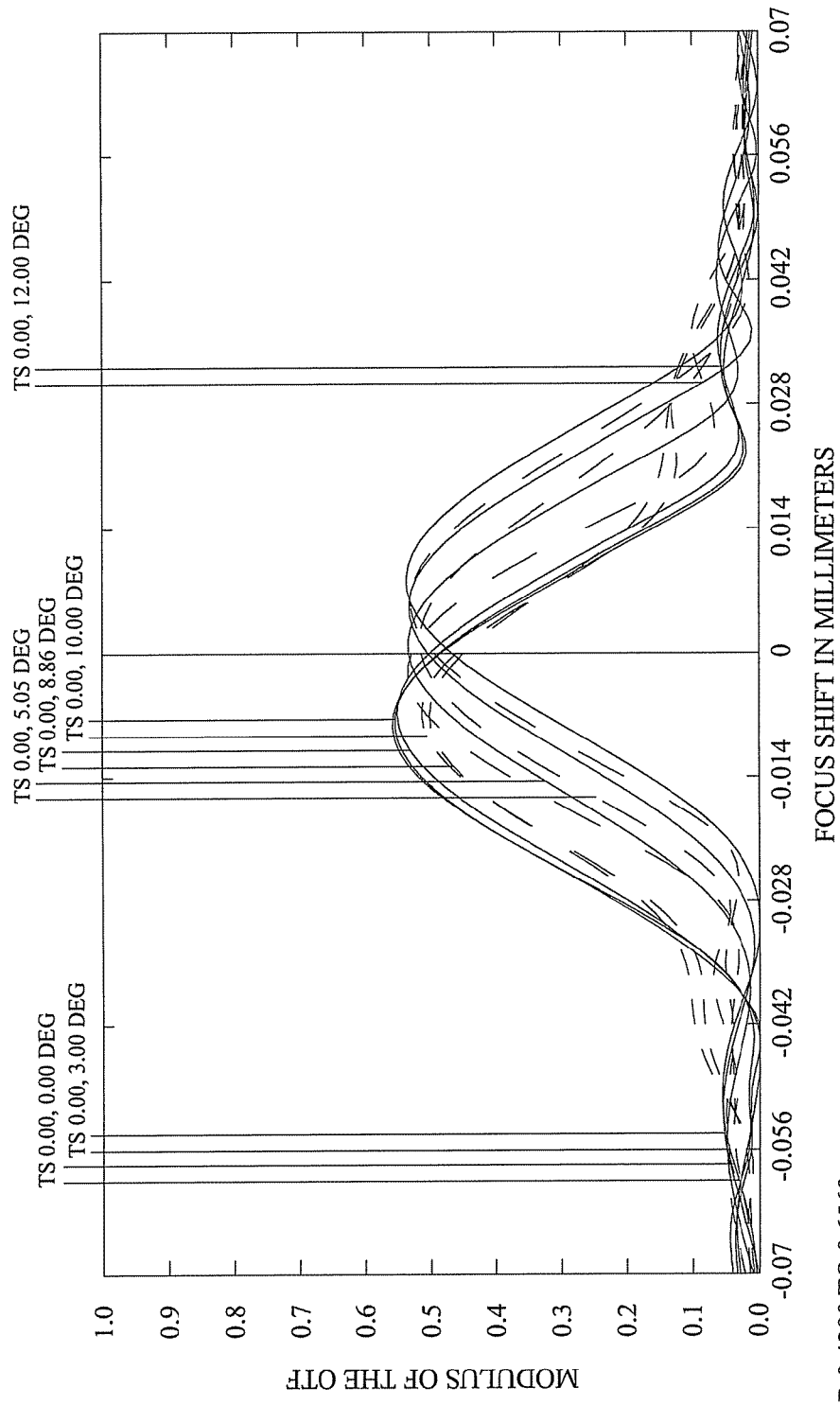

FIGS. 16 and 17 illustrate example TFMTF diagrams for optical system 700, for an object distance of 0.3 meters, 3× zoom magnification and substantially twelve degree field angle. FIG. 16 illustrates a TFMTF that corresponds to an optical system that is uncorrected for field curvature error at 0.3 meter object distance. Similar to TFMTF diagrams for 1× and 2× zoom magnification depicted at FIGS. 12 and 14, respectively, the TFMTF at 3× zoom magnification has an MTF value at zero focus shift that is substantially lower than the target MTF of 0.3. FIG. 17 depicts a TFMTF diagram for optical system 700 with 0.92 correction applied to lens L6 and image sensor 704. Similar to FIGS. 13 and 15, the 0.92 correction substantially improves the MTF value of optical system 700 at zero focus shift. Accordingly, adjusting position of lens L6 and image sensor 704 by 0.92 micrometers is sufficient to provide field curvature correction for an object distance of 0.3 meters, independent of the zoom magnification employed by optical system 700 (at least within the range of 1× to 3× magnification).

Figure 18:
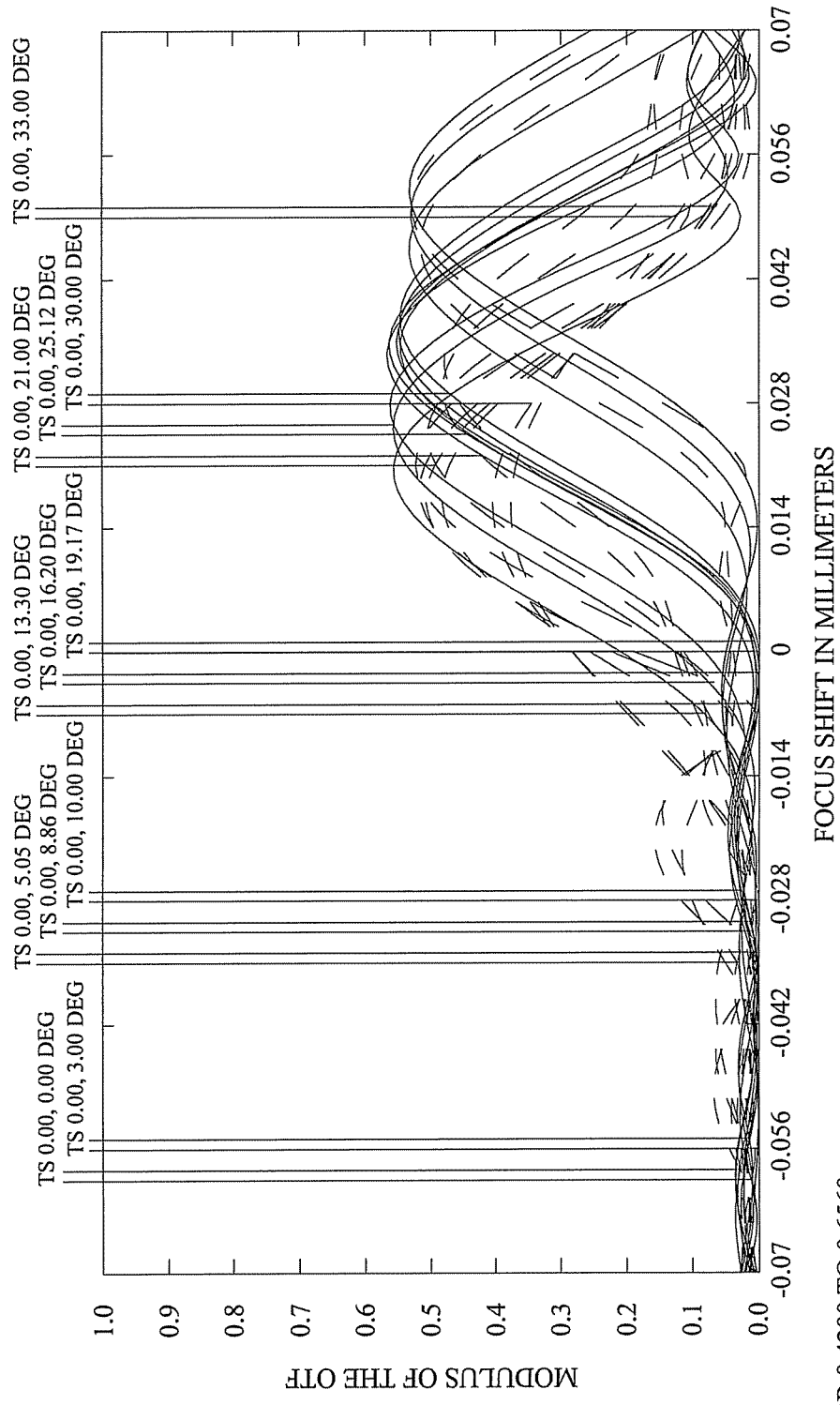
FIGS. 18 and 19 depict sample diagrams of uncorrected and corrected TFMTFs, respectively, for an OD of 0.5 meters and 1× zoom.
Figure 19:
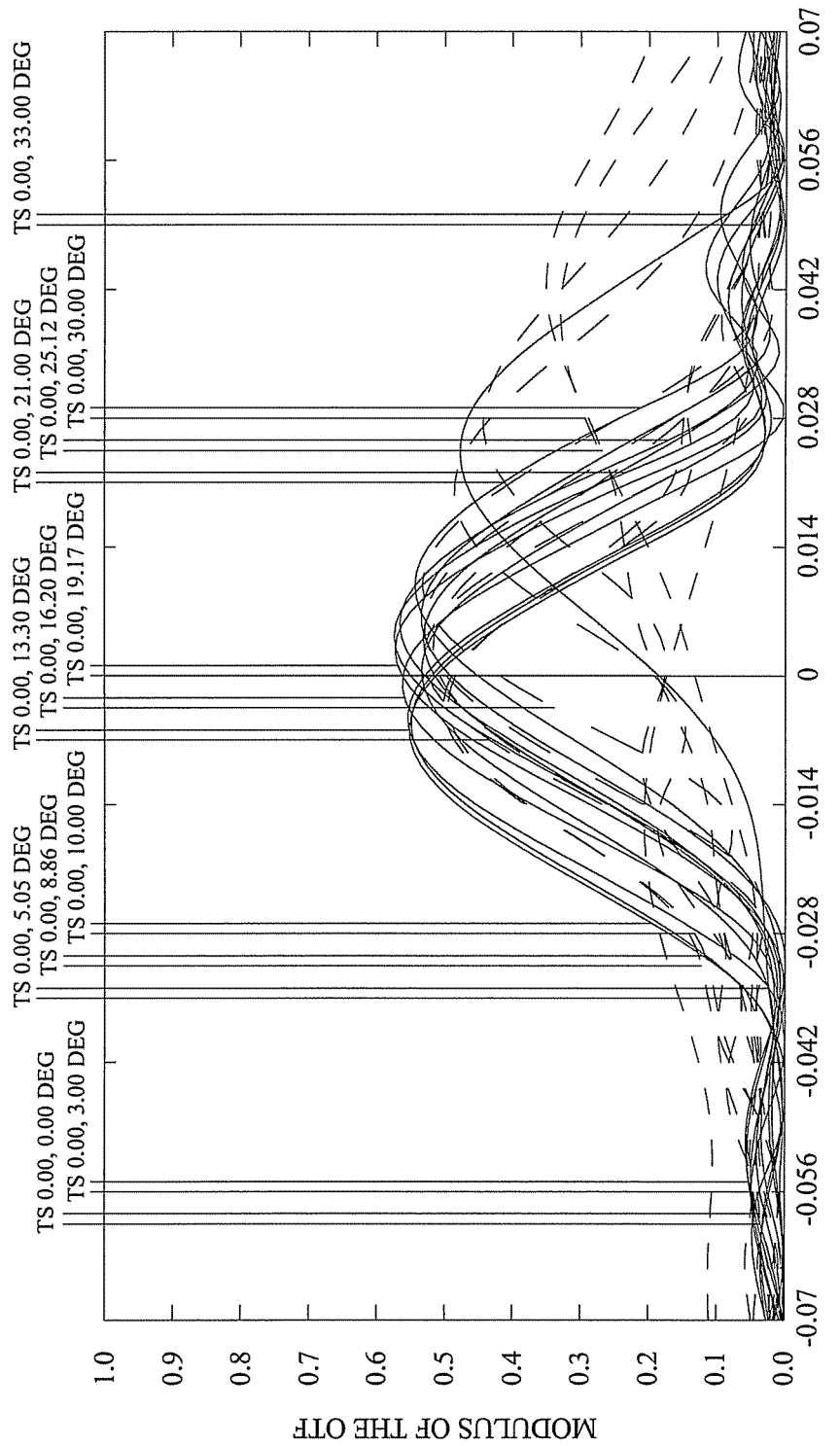

FIGS. 18 and 19 depict example TFMTF diagrams for optical system 700, for an object distance of 0.5 meters, 1× zoom magnification and thirty-three degree field angle. Particularly, FIG. 18 depicts a TFMTF for optical system 700 that is uncorrected for field curvature error. Field curvature of optical system 700 is less for object distance of 0.5 meters as compared with object distance of 0.3 meters. This can readily be determined by comparing the respective MTF values at zero focus shift of FIGS. 18 and 12, respectively. However, the MTF value at zero focus shift is still substantially lower than the target MTF of 0.3 when uncorrected for field curvature error. FIG. 19 illustrates a TFMTF diagram for optical system 700 with a field curvature correction of 0.8391 micrometers applied to lens L6 and image sensor 704. As depicted by the solid lines of the corrected TFMTF diagram of FIG. 19, the MTF at zero focus shift is greater than 0.5, and substantially greater than the target MTF of 0.3.

Figure 20:
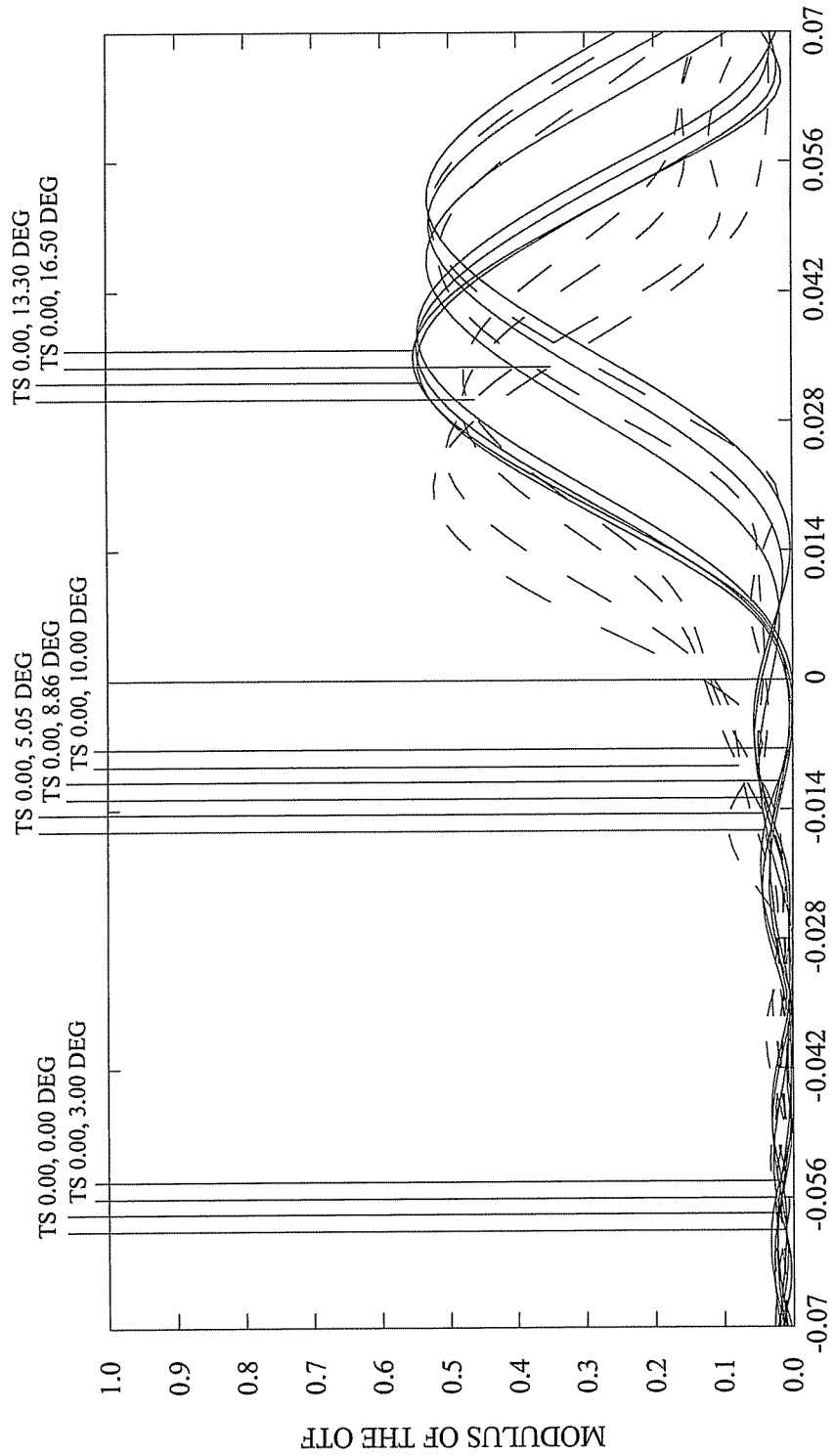
FIGS. 20 and 21 illustrate example diagrams of uncorrected and corrected TFMTFs, respectively, for an OD of 0.5 meters and 2× zoom.
Figure 21:
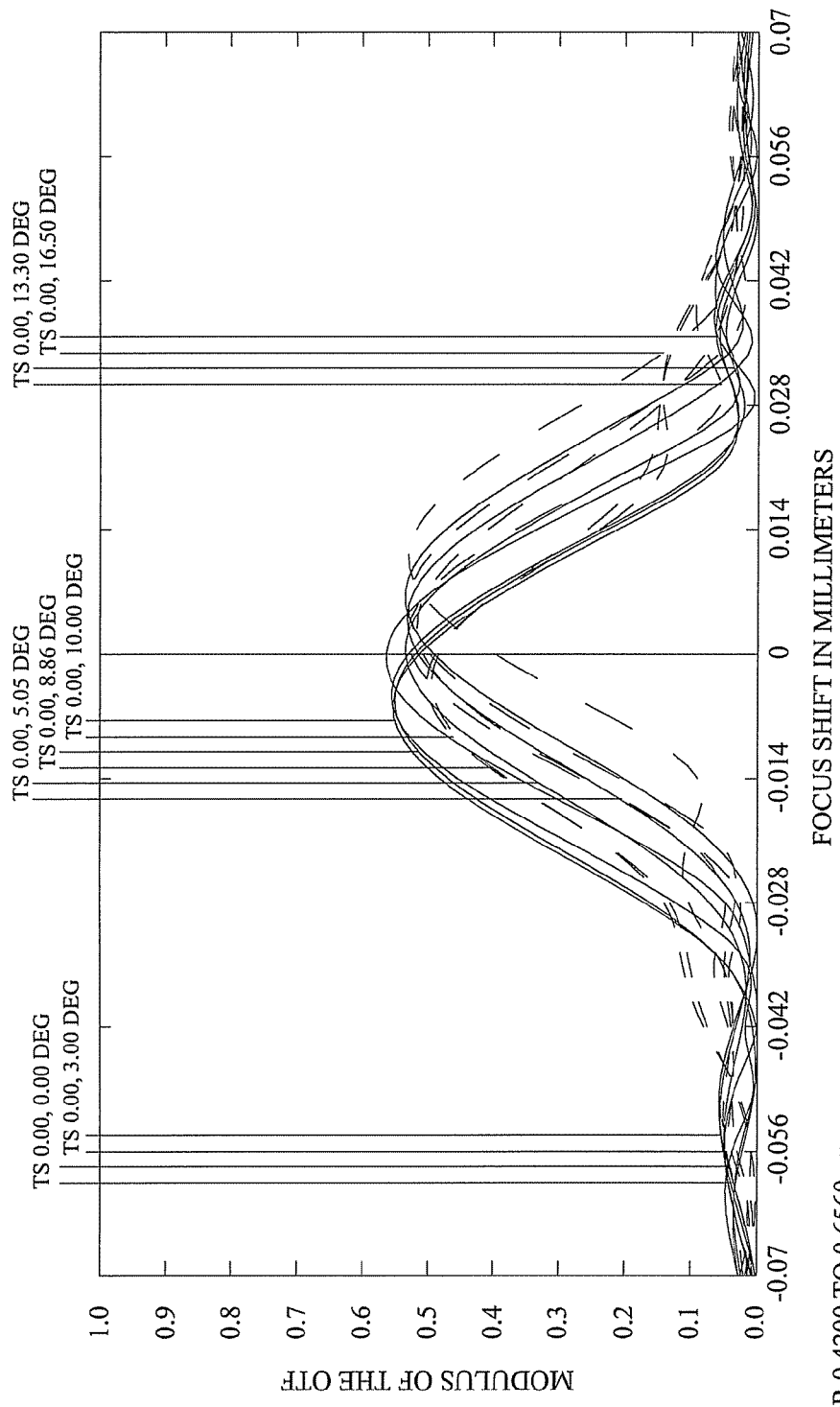

FIGS. 20 and 21 illustrate example TFMTF diagrams for optical system 700 for an object distance of 0.5 meters, 2× zoom magnification and sixteen and one half degree field angle. FIG. 20 is the uncorrected TFMTF diagram, which again exhibits significant field curvature error (e.g., the MTF at zero focus shift is significantly lower than the target MTF of 0.3). Field curvature correction of 0.8391 micrometers is applied to lens L6 and image sensor 704, and the corrected TFMTF of optical system 700 at 0.5 object distance is depicted at FIG. 21. As is readily evident, the corrected TFMTF diagram exhibits an MTF of greater than 0.5 at zero focus shift.

Figure 22:
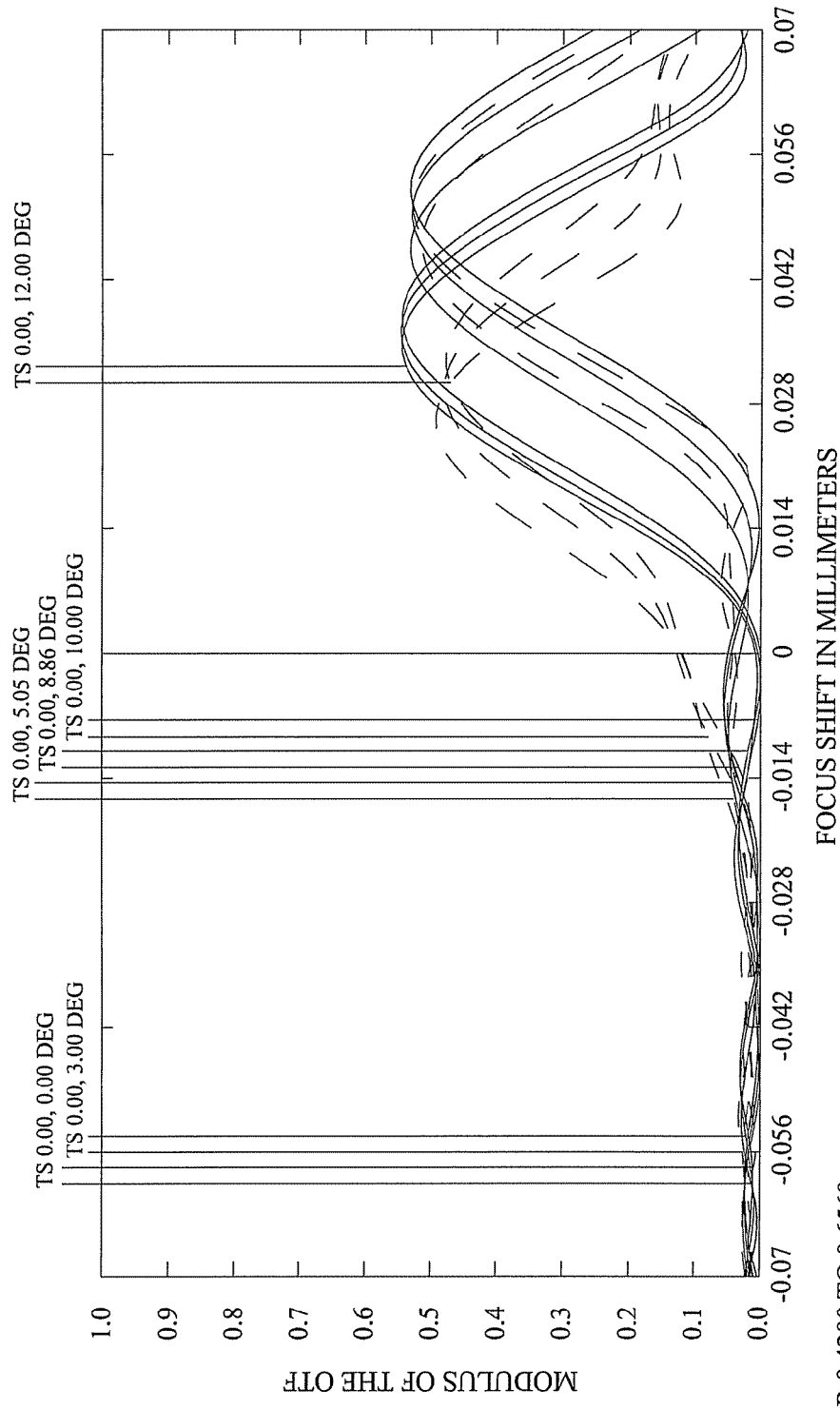
FIGS. 22 and 23 illustrate sample diagrams of uncorrected and corrected TFMTFs, respectively, for an OD of 0.5 meters and 3× zoom.
Figure 23:
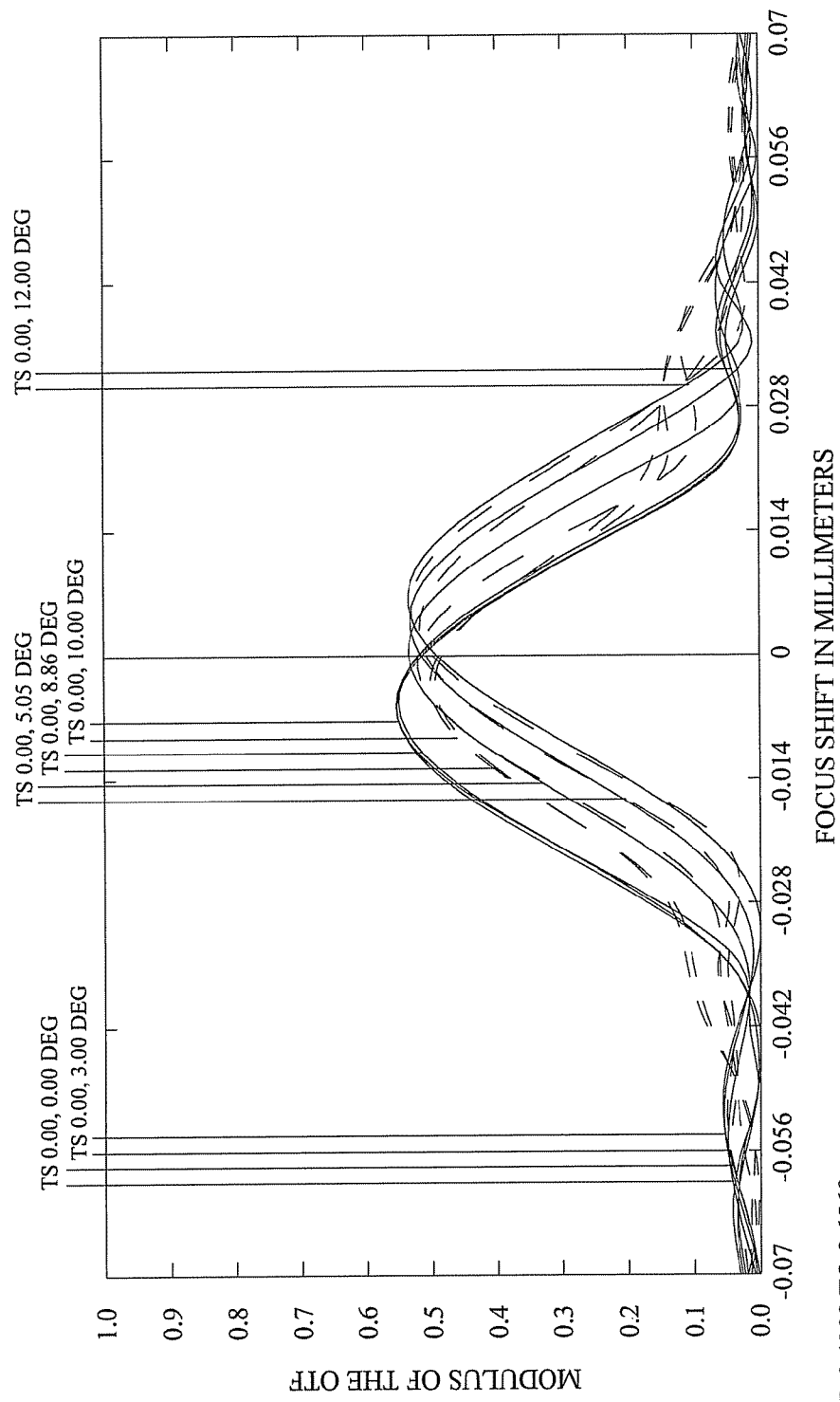

FIGS. 22 and 23 illustrate sample TFMTF diagrams for optical system 700 for an object distance of 0.5 meters, 3× zoom magnification and substantially twelve degree field angle. The field curvature error is significant for the uncorrected TFMTF diagram depicted by FIG. 22. Similar to the 1× and 2× zoom magnification diagrams of FIGS. 18 and 20, respectively, the MTF at zero focus shift is substantially lower than the target MTF of 0.3. Once again, field curvature correction of 0.8391 is applied to lens L6 and image sensor 704 of optical system 700, and the resulting corrected TFMTF is depicted at FIG. 23. The field curvature correction of 0.8391 provides significant correction for 3× zoom magnification and twelve degree field angle to bring the MTF above the target MTF of 0.3. Similar to object distance of 0.3 meters, a common field curvature correction is sufficient to correct optical system 700 at 0.5 meter object distance for 1×, 2× and 3× zoom magnifications and thirty-three, sixteen and one half and substantially twelve degree field angles, respectively.

Figure 24:
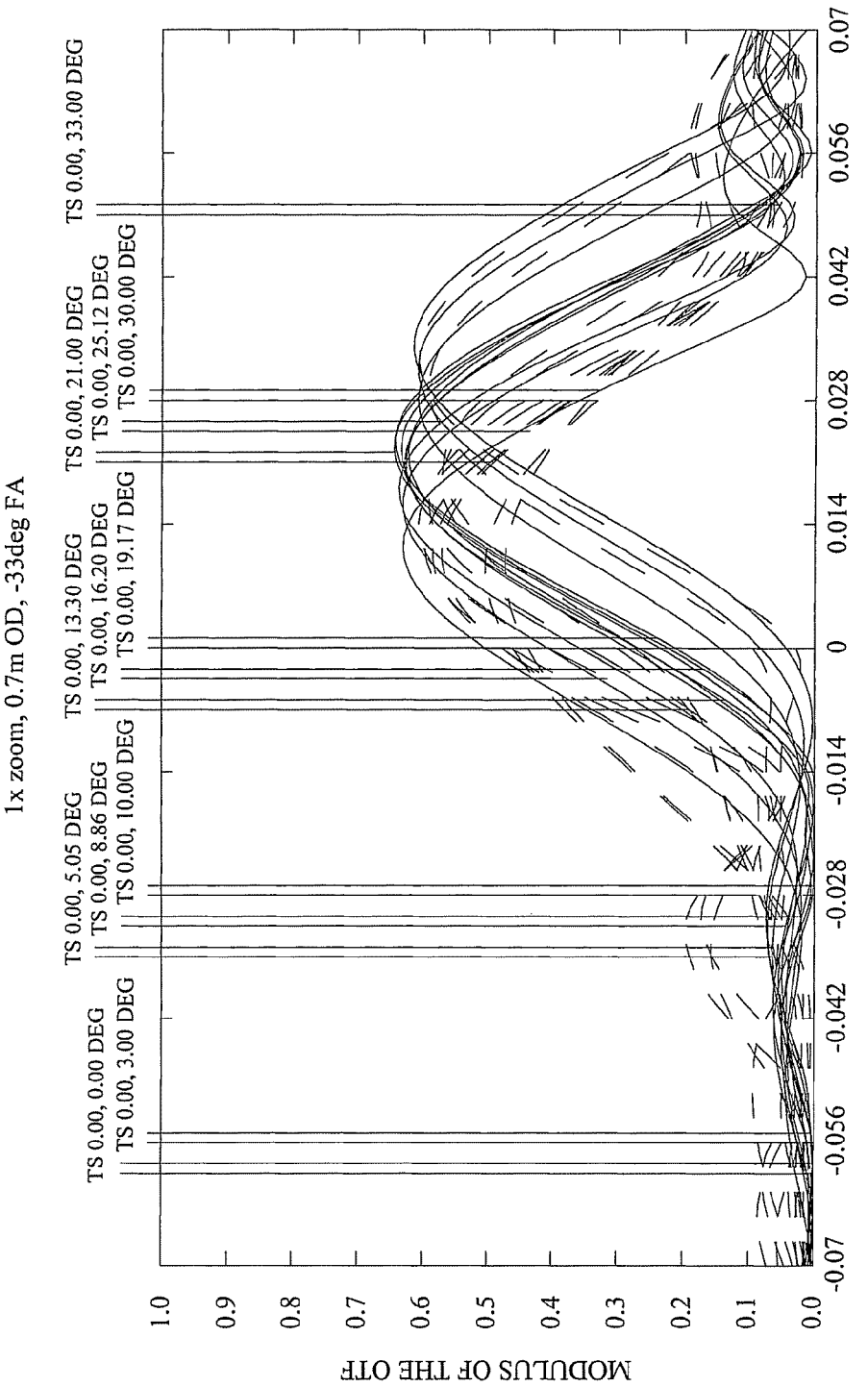
FIGS. 24 and 25 depict example diagrams of uncorrected and corrected TFMTFs, respectively, for an OD of 0.7 meters and 1× zoom.
Figure 25:
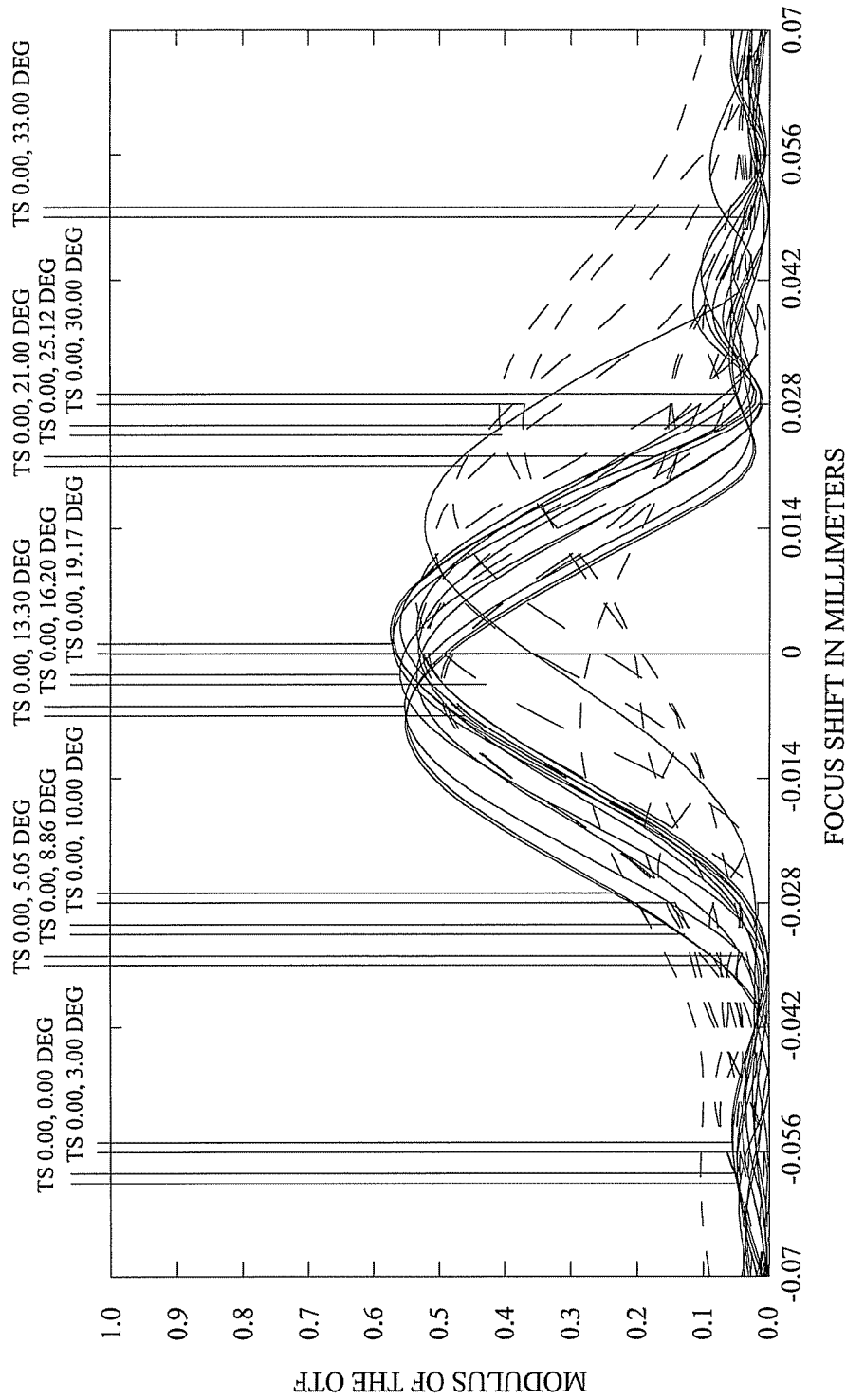

FIGS. 24 and 25 illustrate sample TFMTF diagrams for optical system 700 for an object distance of 0.7 meters, 1× zoom magnification and substantially thirty-three degree field angle. Specifically, FIG. 24 depicts a TFMTF that is uncorrected for field curvature error, and FIG. 25 depicts a TFMTF that is corrected for field curvature. As is depicted by FIG. 24, the MTF value at zero focus shift is better than for 0.5 meters and 0.3 meters (compare FIGS. 18 and 12, respectively), but is still significantly lower than the corrected TFMTF diagrams even for smaller object distances. Particularly, the uncorrected TFMTF has an MTF value at zero focus shift approximately 0.25 or less for most field angles (solid lines). The corrected TFMTF of FIG. 25 corresponds with a 0.81 micrometer correction applied to lens L6 and image sensor 704 of optical system 700. As is readily apparent, the corrected MTF at zero focus shift is well above 0.5, similar to the corrected MTF values for 0.3 and 0.5 object distances discussed above (e.g., compare FIGS. 13 and 19, respectively).

Figure 26:
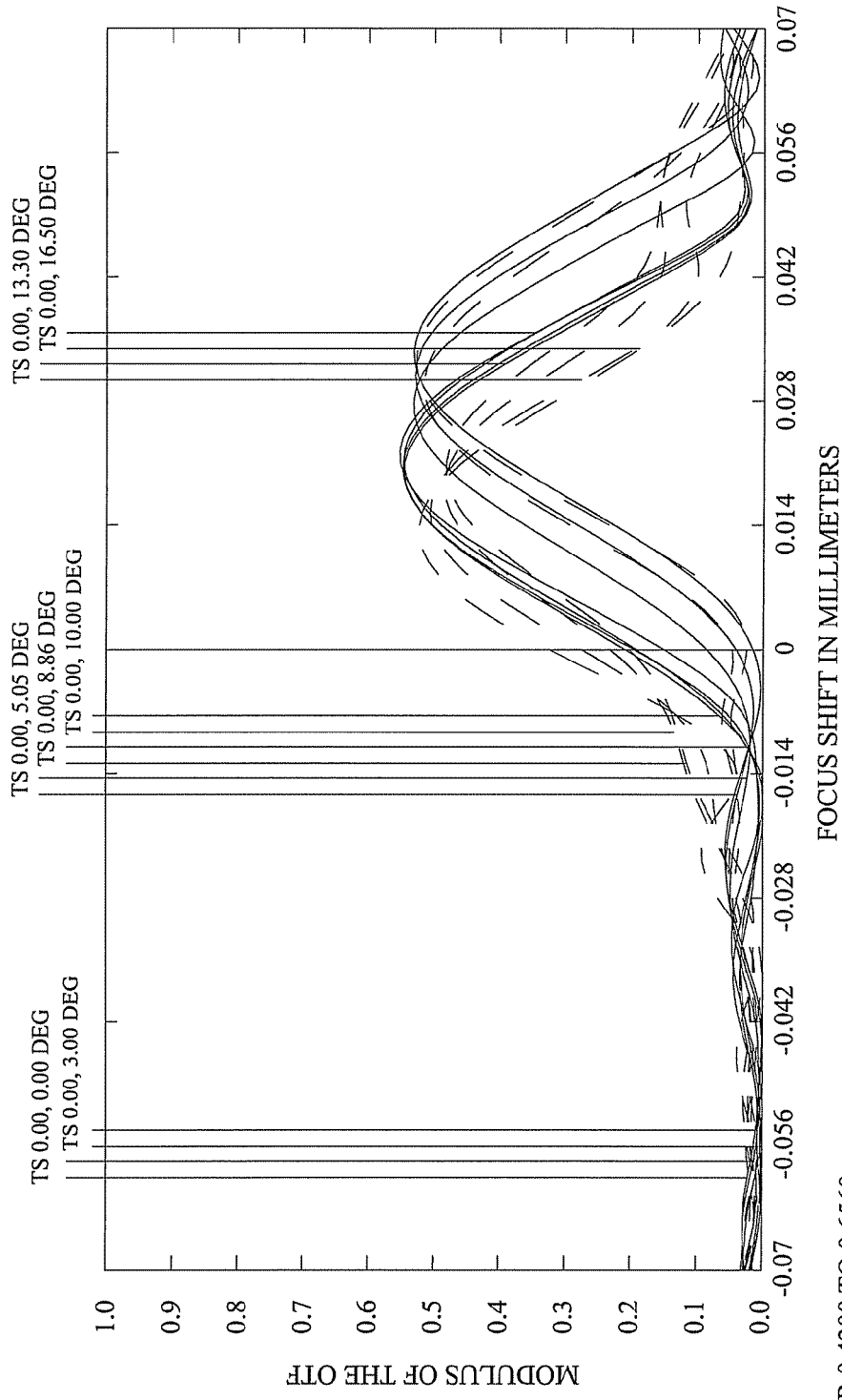
FIGS. 26 and 27 illustrate sample diagrams of uncorrected and corrected TFMTFs, respectively, for an OD of 0.7 meters and 2× zoom.
Figure 27:
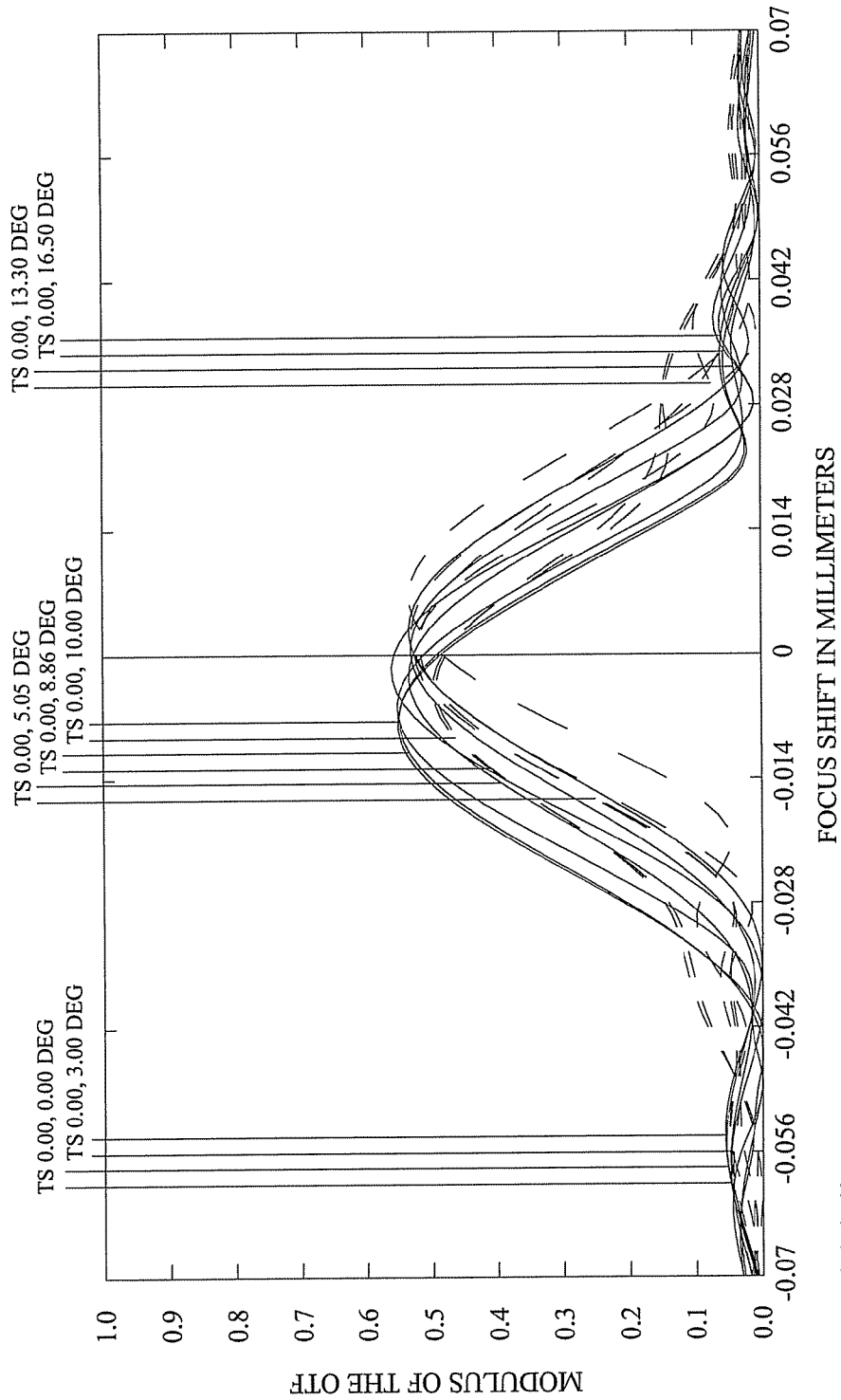

FIGS. 26 and 27 depict sample TFMTF diagrams for optical system 700 for an object distance of 0.7 meters, 2× zoom magnification and sixteen and one half degree field angle. FIG. 26 comprises a TFMTF diagram that is uncorrected for field curvature error. The MTF at zero focus shift is below 0.25 for most field angles up to sixteen and one half degrees. Likewise, the corrected TFMTF diagram of FIG. 27 corresponds with a 0.81 correction applied to lens L6 and image sensor 704 of optical system 700. The corrected MTF at zero focus is greater than 0.5, similar to the corrected MTF for optical system 700 at 1× magnification depicted at FIG. 25.

Figure 28:
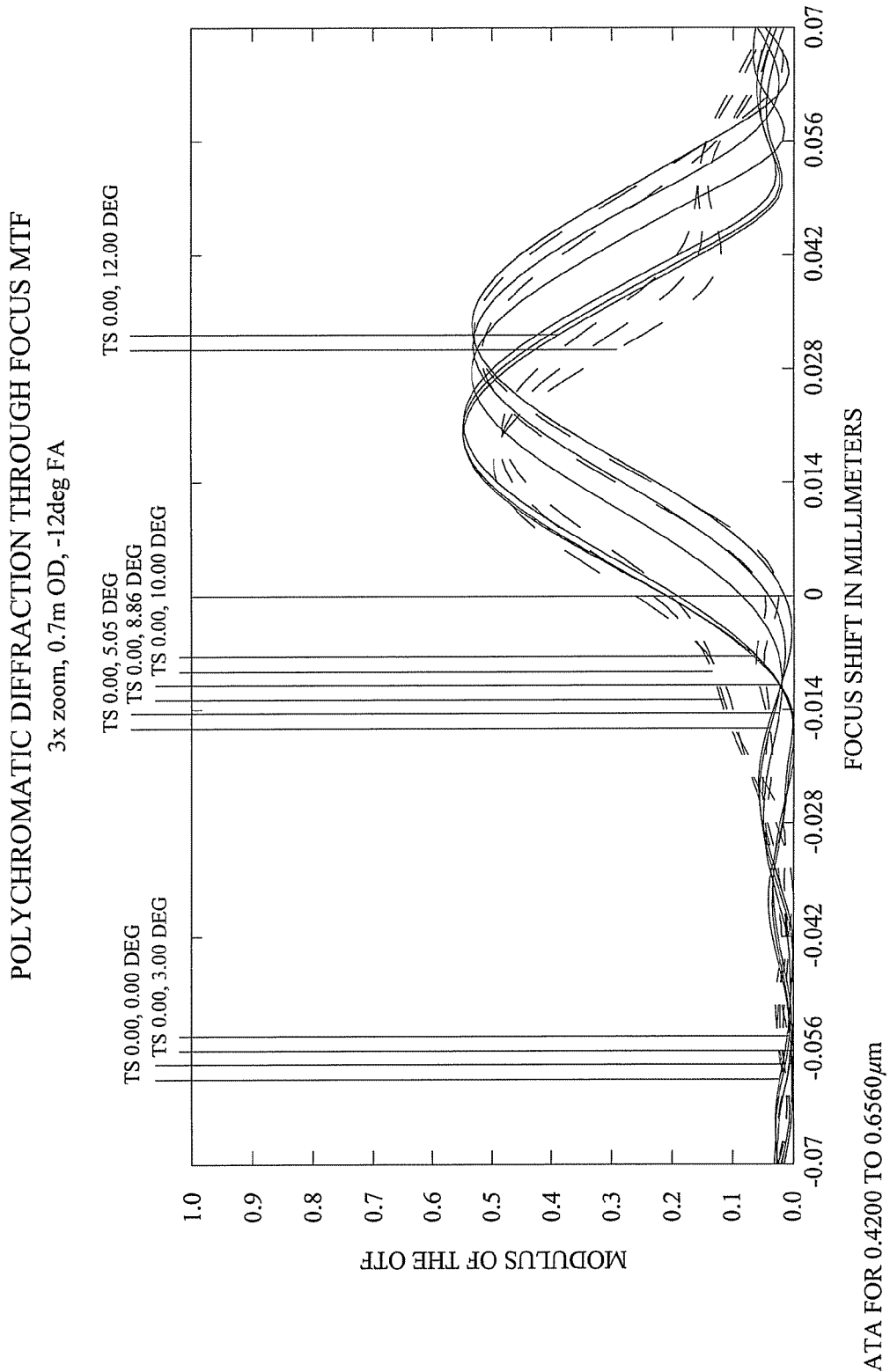
FIGS. 28 and 29 depict example diagrams of uncorrected and corrected TFMTFs, respectively, for an OD of 0.7 meters and 3× zoom.
Figure 29:
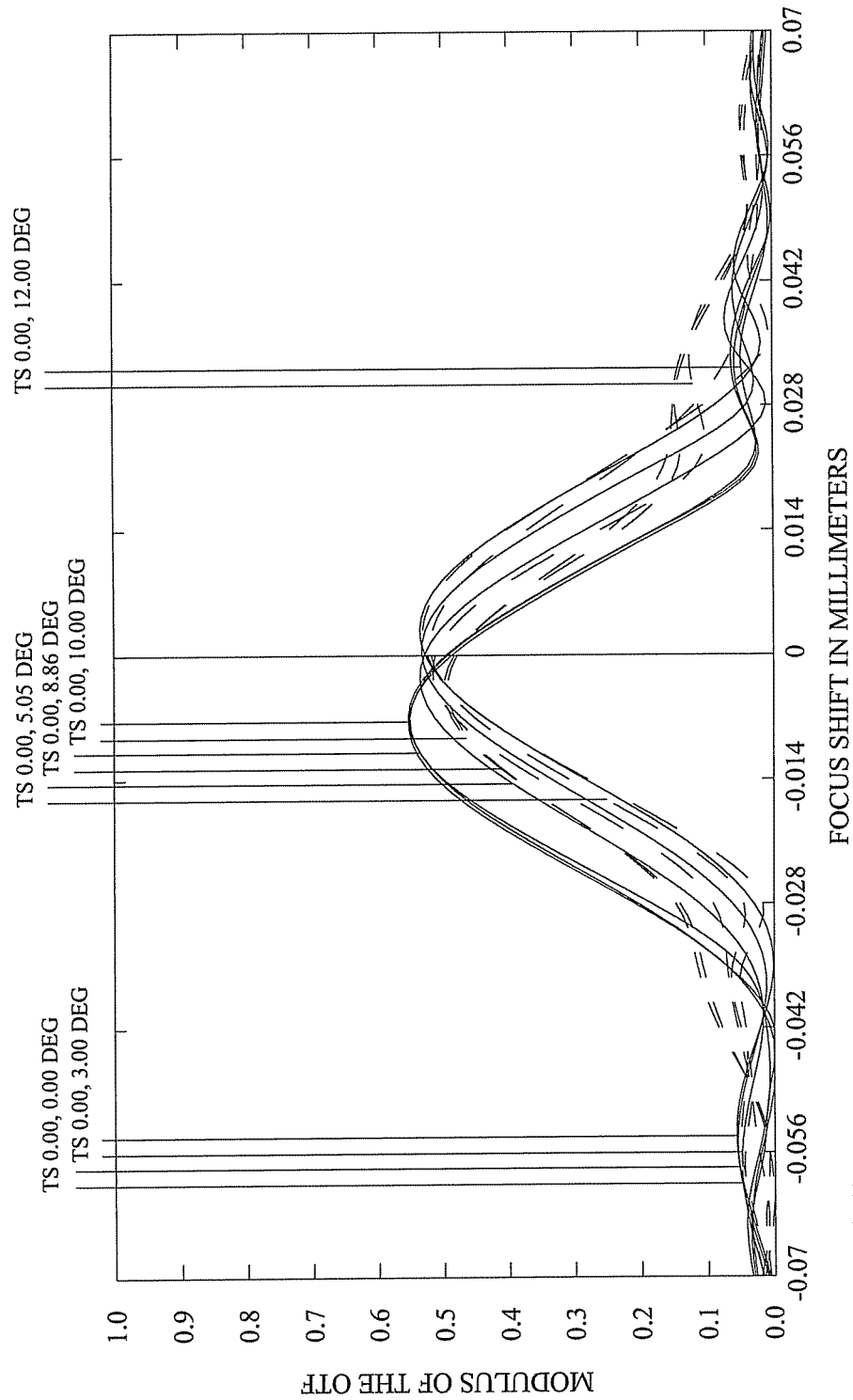

FIGS. 28 and 29 illustrate sample TFMTF diagrams for optical system 700 for an object distance of 0.7 meters, 3× zoom magnification and substantially twelve degree field angle. FIG. 28 comprises a TFMTF diagram that is uncorrected for field curvature, whereas FIG. 29 comprises a TFMTF diagram that is corrected for field curvature. Similar to the 1× and 2× zoom magnification examples described above, the uncorrected MTF at zero focus shift is below 0.25 (FIG. 28), whereas the corrected MTF at zero focus shift is substantially above 0.5 (FIG. 29). Similar to object distances of 0.3 meters and 0.5 meters discussed above, a common correction factor applied to lens L6 and image sensor 704 is sufficient to correct the MTF at zero focus shift for various zoom magnifications at an object distance of 0.7 meters.

Figure 30:
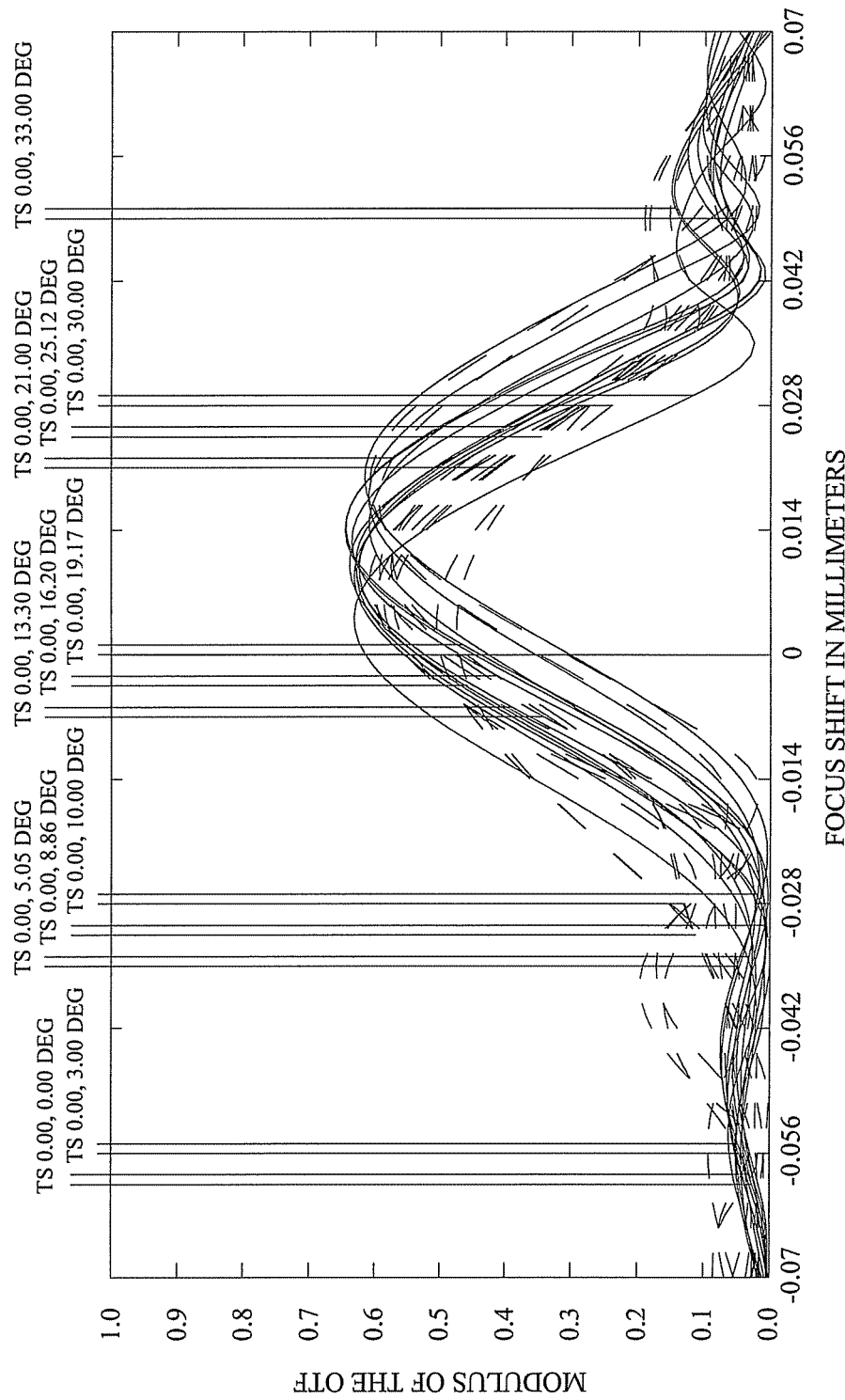
FIGS. 30 and 31 depict sample diagrams of uncorrected and corrected TFMTFs, respectively, for an OD of 1.0 meters and 1× zoom.
Figure 31:
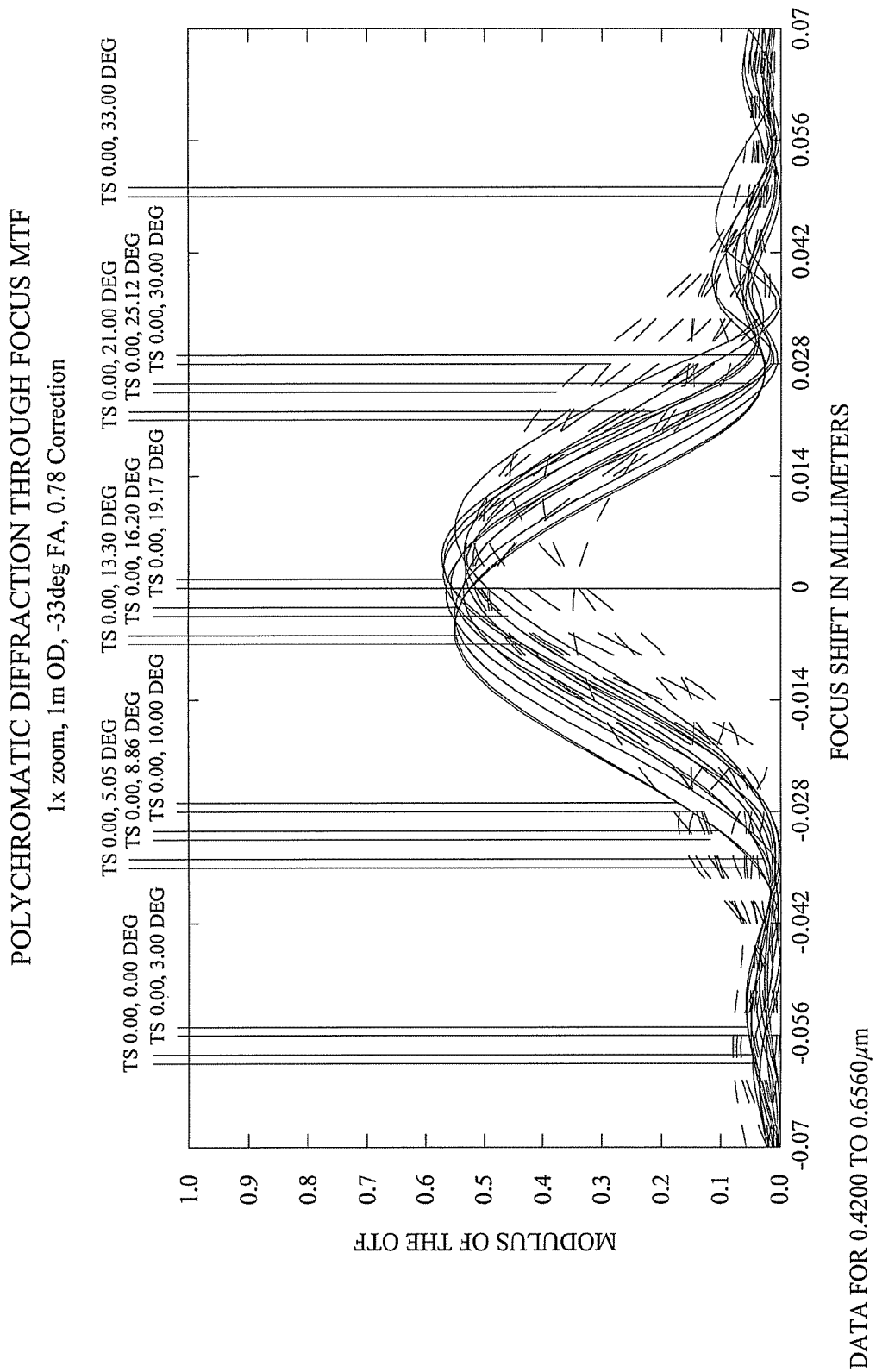

FIGS. 30 and 31 depict example TFMTF diagrams for optical system 700 for an object distance of 1.0 meters, 1× zoom magnification and substantially thirty-three degree field angle. FIG. 30 illustrates an uncorrected TFMTF for optical system 700, whereas FIG. 31 illustrates a corrected TFMTF for optical system 700. At object distance of 1.0 meters, the uncorrected TFMTF is substantially better than for object distances of 0.3, 0.5 and 0.7 meters (compare FIGS. 12, 18 and 24, respectively). Specifically, the uncorrected MTF at zero focus shift is above 0.4 for most field angles. However, when compared to the corrected MTF of FIG. 31, a substantial improvement is still obtained as the peak of the MTF curve is centered about zero focus shift, providing an optimal TFMTF. The field curvature correction applied to optical system 700 for 1.0 meter object distance is 0.78 micrometers (applied to lens L6 and image sensor 704 of optical system 700).

Figure 32:
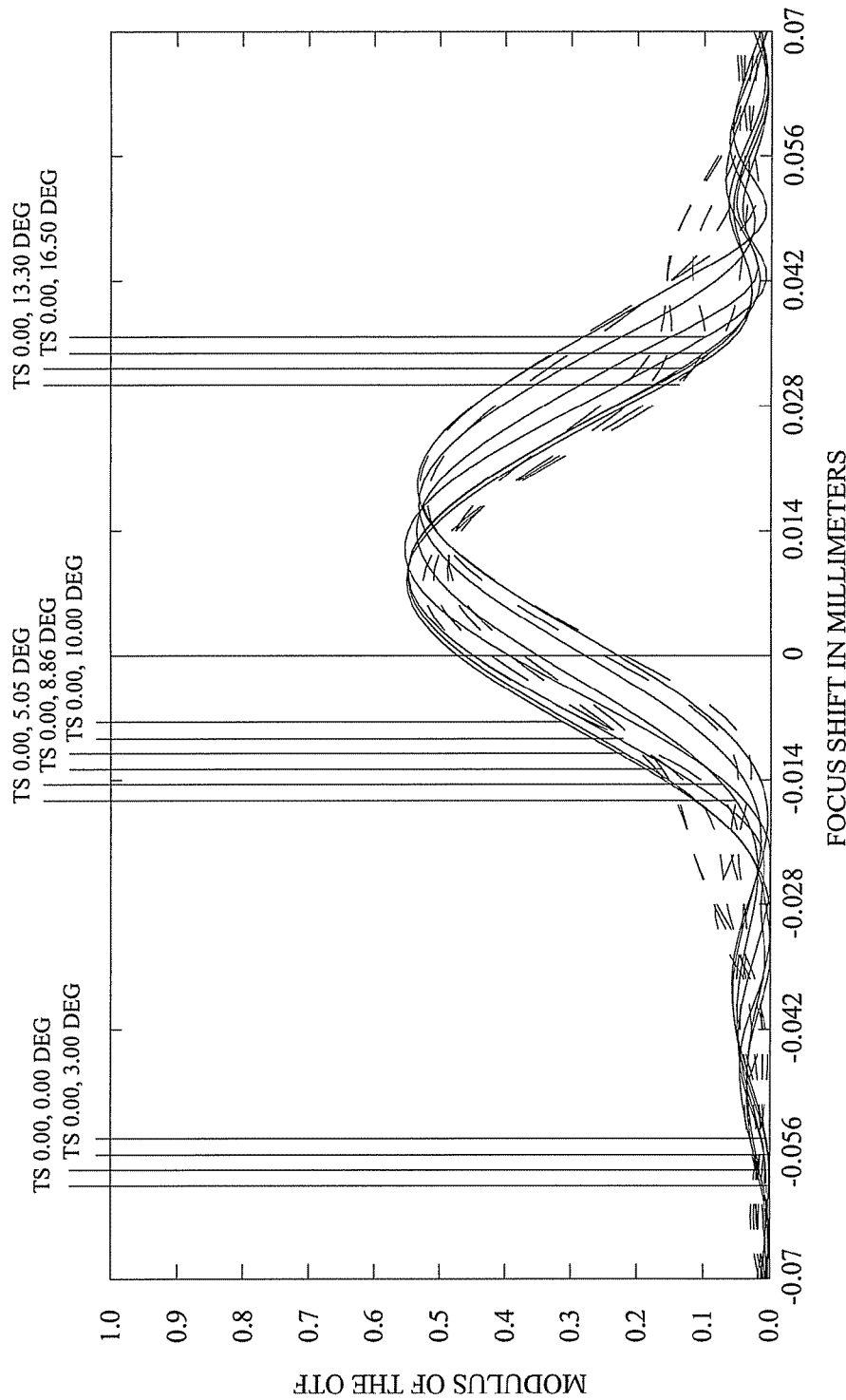
FIGS. 32 and 33 illustrate sample diagrams of uncorrected and corrected TFMTFs, respectively, for an OD of 1.0 meters and 2× zoom.
Figure 33:
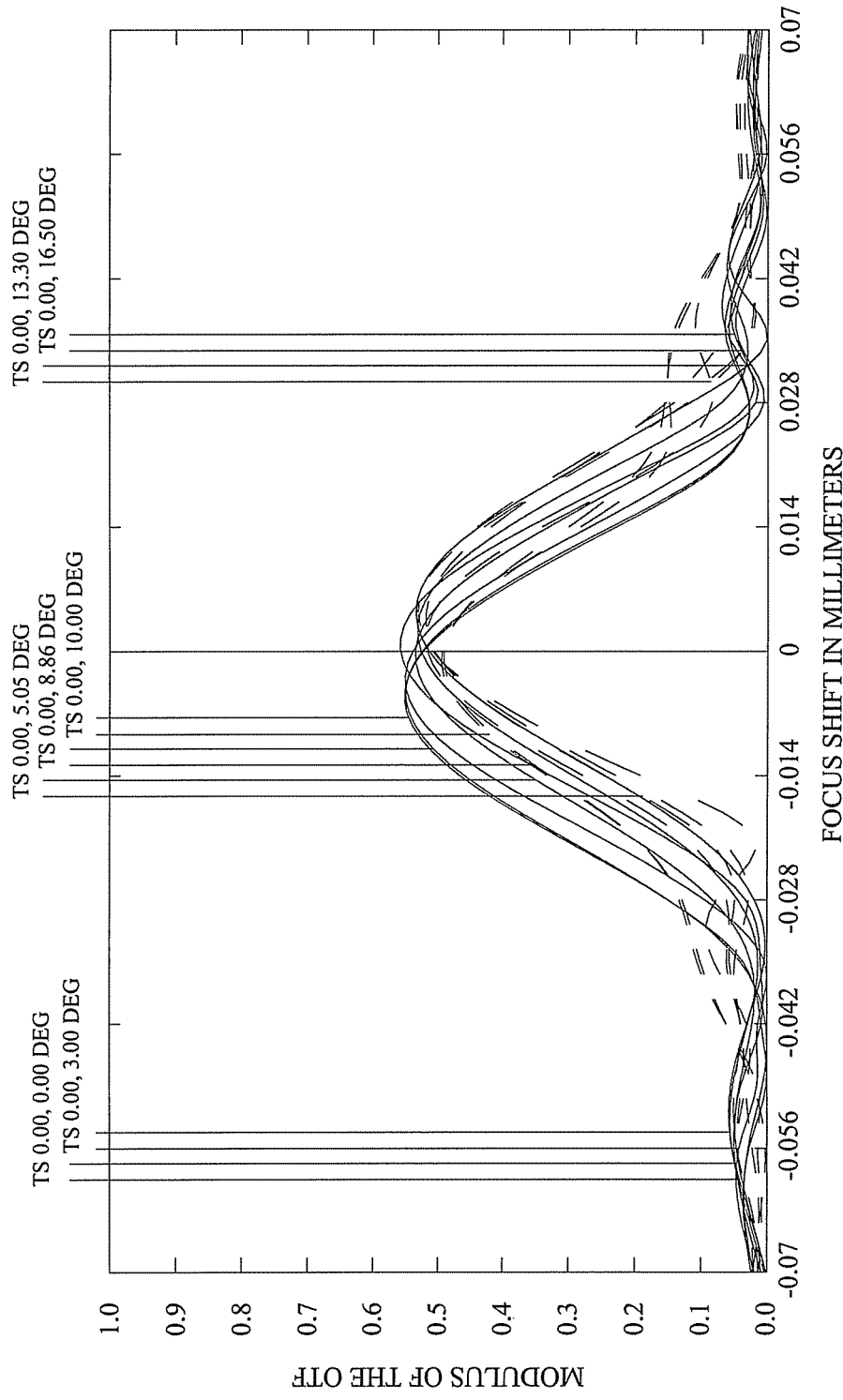

FIGS. 32 and 33 illustrate example TFMTF diagrams for optical system 700 for an object distance of 1.0 meters, 2× zoom magnification and substantially sixteen and one half degree field angle. FIG. 32 comprises an uncorrected TFMTF for optical system 700, whereas FIG. 33 comprises a corrected TFMTF that corresponds with a 0.78 micrometer correction applied to lens L6 and image sensor 704. The field curvature correction for object distance of 1.0 meters shifts the peak of the TFMTF curve to the zero focus shift position, providing an optimal MTF at zero focus shift of greater than 0.5.

Figure 34:
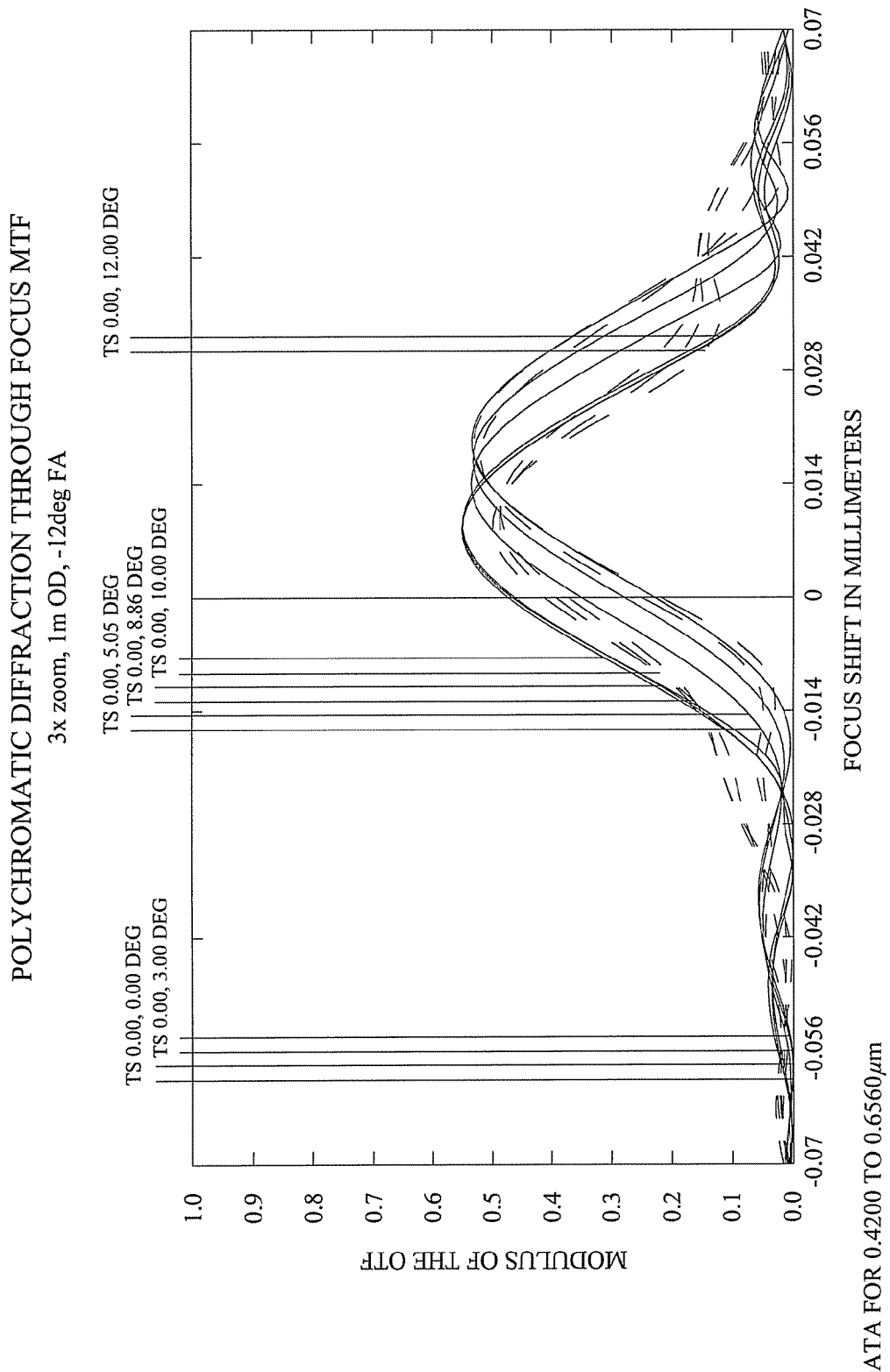
FIGS. 34 and 35 depict example diagrams of uncorrected and corrected TFMTFs, respectively, for an OD of 1.0 meters and 3× zoom.
Figure 35:
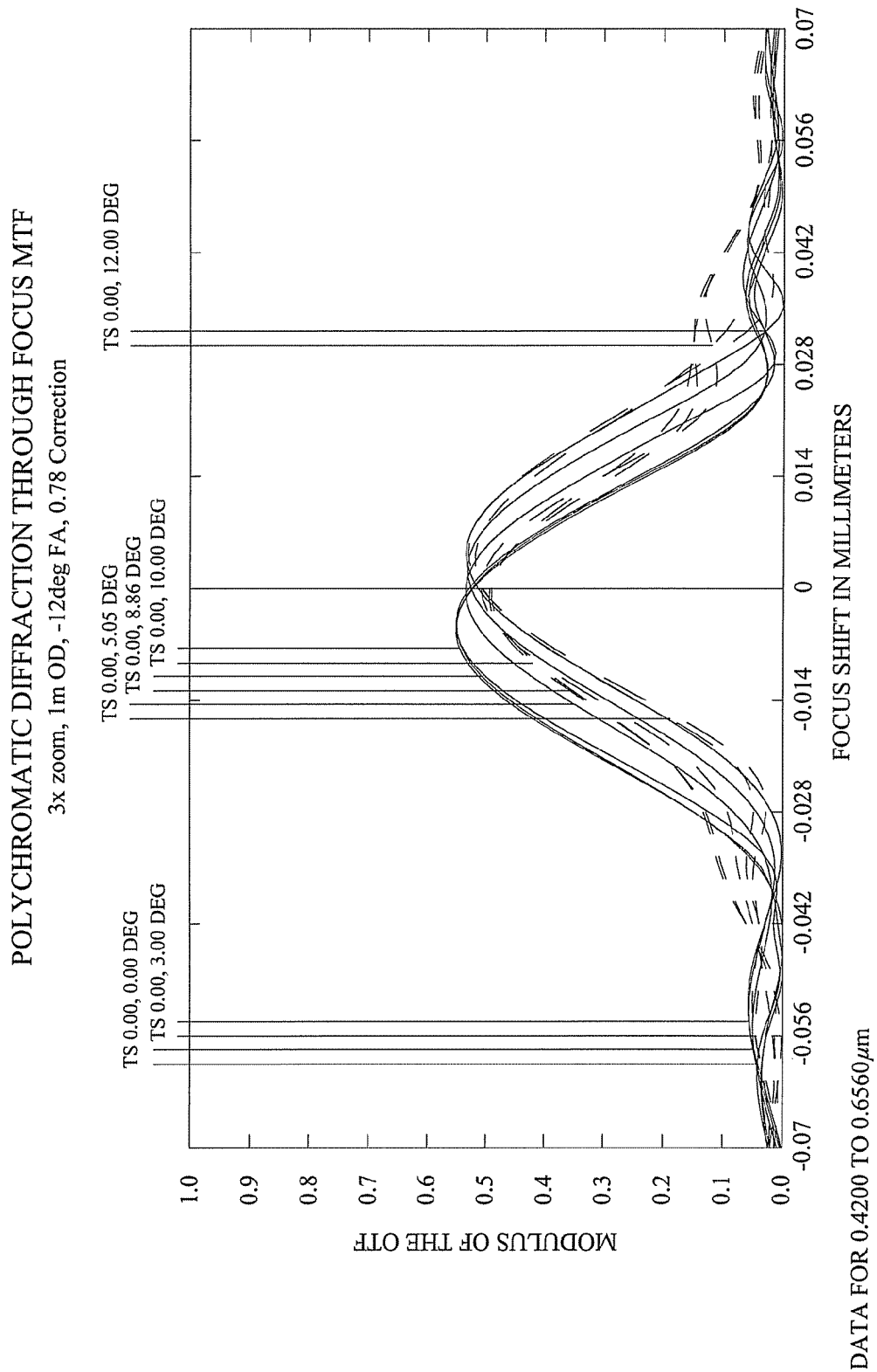

FIGS. 34 and 35 depict sample TFMTF diagrams for optical system 700 for an object distance of 1.0 meters, 3× zoom magnification and substantially twelve degree field angle. Similar to 1× and 2× zoom magnifications discussed above, the uncorrected TFMTF at 3× zoom magnification as depicted by FIG. 34 is greater than 0.3 for most field angles, but the TFMTF peak is still off-centered with respect to the zero focus shift position. This off-centered peak is corrected by applying a 0.78 micrometer correction to lens L6 and image sensor 704 of optical system 700, as depicted by FIG. 35. Once again, it is evident that a common field curvature correction is sufficient to provide significant correction of the TFMTF diagrams at 1×, 2× and 3× zoom magnifications.

FIGS. 36 and 37 illustrates sample TFMTF diagrams for optical system 700 for an object distance of 2.0 meters, 1× and 2× zoom magnifications, respectively, and thirty-three and sixteen and one half degree field angles, respectively. At 2.0 meter object distance, no significant field curvature error is exhibited by the respective TFMTF diagrams for optical system 700. Particularly, the peak MTF values are centered about the zero focus shift position, indicating a substantially optimal image at image sensor 704, requiring no field curvature correction.

Figure 38:
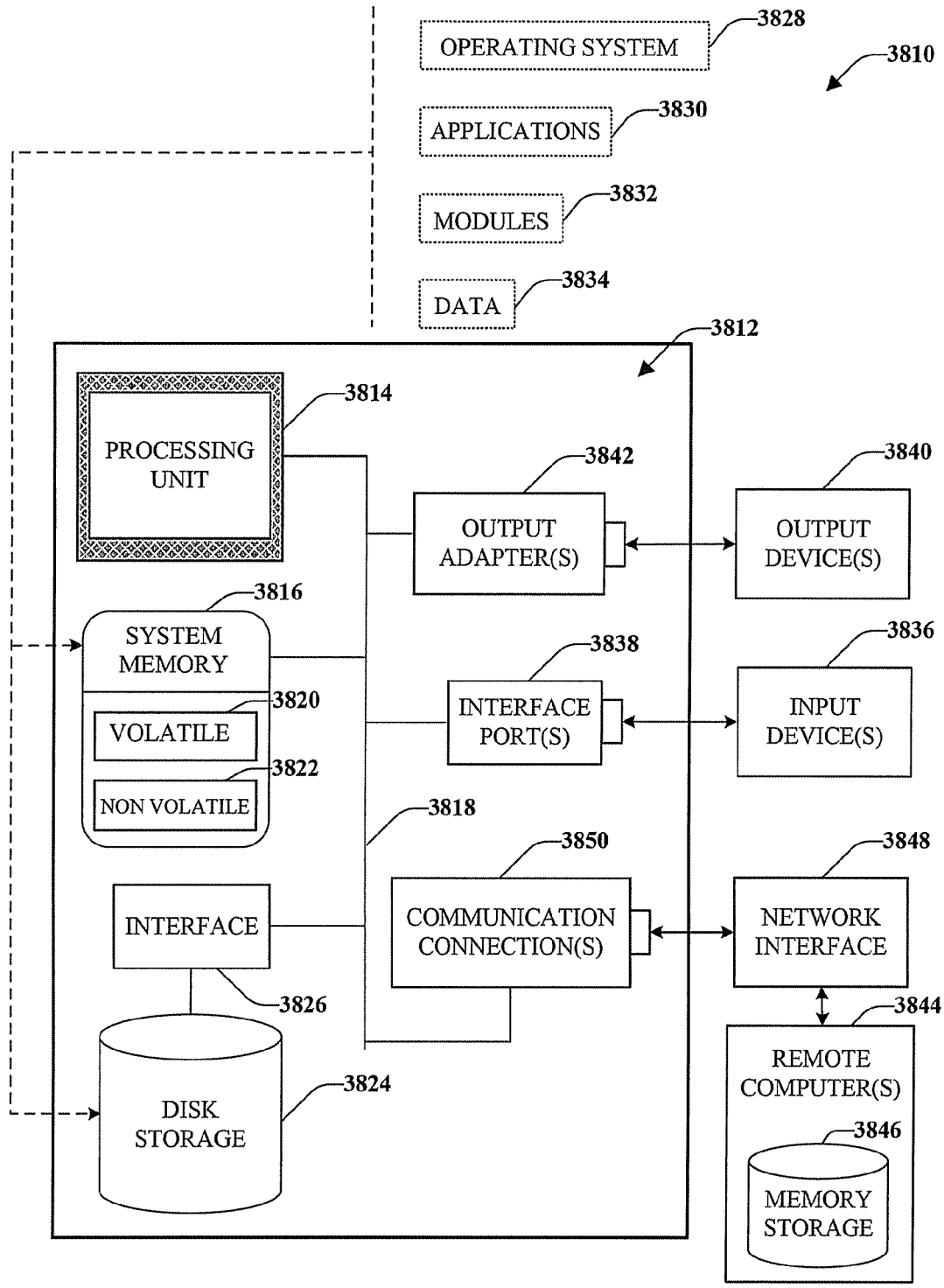
FIG. 38 illustrates an example processing device for image analysis in conjunction with a micro optics camera module according to various disclosed aspects.

In order to provide additional context for various aspects of the disclosed subject matter, FIG. 38 as well as the following discussion is intended to provide a brief, general overview of a suitable electronic computing environment in which the various aspects of the disclosed subject matter can be implemented. For instance, logic and/or operational functions related to generating intelligent and interactive data queries related to acquiring optical image data, analyzing query results, writing data for output analysis, updating iterative writing according to feedback provided by such analysis, and the like, can be implemented by one or more computer processing functions as described below. While portions of the subject matter have been described herein in the general context of block diagrams and block components, those skilled in the art will recognize that various portions of the disclosed subject matter can also be implemented in combination with computer-executable instructions of a computer program, for instance that run on a computer and/or computers, such as a personal digital assistant, cellular telephone, smart phone, or the like, or other like program modules.

Generally, program modules include routines, programs, components, data structures, etc. that can perform particular tasks and/or implement particular abstract data types. Moreover, those skilled in the art will appreciate that the inventive methods may be practiced with other processing system configurations, including single-processor or multiprocessor systems, mini-computing devices, as well as personal computers, hand-held computing devices (e.g., personal digital assistant [PDA], phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone processing devices. In a distributed computing environment, program modules can be located in both local and remote memory storage devices, described below.

With reference to FIG. 38, an example environment 3810 for implementing various electronic processing aspects disclosed herein includes a processing device 3812 (e.g., desktop, laptop, server, hand held, programmable consumer or industrial electronics . . . ). The processing device 3812 includes a processing unit 3814, a system memory 3816, and a system bus 3818. The system bus 3818 can couple system components including, but not limited to, the system memory 3816 to the processing unit 3814. The processing unit 3814 can be any of various microprocessors, such as dual microprocessors, quad microprocessors, and other multiprocessor architectures suitable for a processing environment 3810.

The system bus 3818 can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3816 includes volatile memory 3820 and nonvolatile memory 3822. The basic input/output system (BIOS), containing the basic routines to transfer information between elements within the processing device 3812, such as during start-up, is stored in nonvolatile memory 3822. By way of illustration, and not limitation, nonvolatile memory 3822 can include read only memory (ROM), programmable ROM (PROM), electrically programmable ROM (EPROM), electrically erasable ROM (EEPROM), or flash memory. Volatile memory 3820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Processing device 3812 can also include removable/non-removable, volatile/non-volatile computer storage media. FIG. 38 illustrates, for example, disk storage 3824. Disk storage 3824 can include, but is not limited to, flash memory card, a thumb drive, a USB drive, as well as other storage devices such as a magnetic disk drive, floppy disk drive, tape drive, Jaz drive, Zip drive, LS-100 drive, or a memory stick. In addition, disk storage 3824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3824 to the system bus 3818, a removable or non-removable interface is typically used such as interface 3826.

It is to be appreciated that FIG. 38 describes software that acts as an intermediary between users and the basic computer resources described in processing environment 3810. Such software can include an operating system 3828. Operating system 3828, which can be stored on disk storage 3824, acts to control and allocate resources of the processing system 3812. System applications 3830 take advantage of the management of resources by operating system 3828 through program modules 3832 and program data 3834 stored either in system memory 3816 or on disk storage 3824. It is to be appreciated that the present innovation can be implemented with various operating systems or combinations of operating systems.

A user can enter commands or information into the processing device 3812 through input device(s) 3836. Input devices 3836 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3814 through the system bus 3818 via interface port(s) 3838. Interface port(s) 3838 include, for example, a serial port, a parallel port, a game port, and a universal serial bus (USB). Output device(s) 3840 can utilize some of the same type of ports as input device(s) 3836. Thus, for example, a USB port may be used to provide input to processing device 3812 and to output information from processing device 3812 to an output device 3840. Output adapter 3842 is provided to illustrate that there are some output devices 3840 like displays (e.g., flat panel and CRT), speakers, and printers, among other output devices 3840 that require special adapters. The output adapters 3842 include, by way of illustration and not limitation, video and sound cards that provide a means of connection between the output device 3840 and the system bus 3818. It should be noted that other devices and/or systems of devices provide both input and output capabilities such as remote computer(s) 3844.

Processing device 3812 can operate in a networked environment using logical connections to one or more remote computers, such as remote computer(s) 3844. The remote computer(s) 3844 can be a personal computer, a server, a router, a network PC, a workstation, a microprocessor based appliance, a peer device or other common network node and the like, and can typically include many or all of the elements described relative to processing device 3812. For purposes of brevity, only a memory storage device 3846 is illustrated with remote computer(s) 3844. Remote computer(s) 3844 is logically connected to processing device 3812 through a network interface 3848 and then physically connected via communication connection 3850. Network interface 3848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 3850 refers to the hardware/software employed to connect the network interface 3848 to the bus 3818. While communication connection 3850 is shown for illustrative clarity inside processing device 3812, it can also be external to processing device 3812. The hardware/software necessary for connection to the network interface 3848 includes, for example, internal and external technologies such as, modems including regular telephone grade modems, cable modems, power modems and DSL modems, ISDN adapters, and Ethernet cards or components.

As utilized herein, the word "exemplary" is intended to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, various portions of electronic systems associated with disclosed optical systems described herein may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent. For instance, such components can automate optimization of image quality of an optical system, as described above (e.g., see electronic device 500 of FIG. 5, supra).

What has been described above includes examples of aspects of the claimed subject matter. It is, of course, not possible to describe every conceivable combination of components or methodologies for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. An optical system arranged along an optical axis, comprising:
    a first lens having a positive refractive power, having an object side surface of convex shape and an image side surface of concave shape;
    a second lens having an object side surface of convex shape and an image side surface of concave shape;
    a set of three lenses at least for adding chromatic correction and optical power for the optical system; and
    a sixth lens having positive refractive power;
    wherein:
    the optical system introduces an optical distortion to an image formed by the optical system that changes with field angle,
    the optical system comprises field curvature correction for a range of object distances and,
    the optical system substantially satisfies a condition: $b\_f/f < 0.3065$, wherein $b\_f$ is a back focal length of the optical system and wherein f is a combined focal length of the combination of the first lens, second lens, set of three lenses and sixth lens.

2. The optical system of claim 1, wherein the optical system substantially satisfies a condition: total track length $(TTL)/f < 2.2$, wherein f is a combined focal length of the combination of the first lens, second lens, set of three lenses and sixth lens.

3. The optical system of claim 1, wherein the optical system substantially satisfies a condition: $f\_1/f < 1.85$, wherein $f\_1$ is a focal length of the first lens.

4. The optical system of claim 1, wherein the condition establishes a strong optical power for the first lens relative to the second lens, the sixth lens or individual lenses of the set of three lenses.

5. The optical system of claim 1, wherein the optical system substantially satisfies a condition: $f\_1/f\_G1 < 1.35$, where $f\_G1$ is a combined focal length of the combination of the first lens, second lens and set of three lenses.

6. The optical system of claim 1, wherein the optical system substantially satisfies a condition: $f\_G1/f < 1.37$, wherein $f\_G1$ is a combined focal length of the combination of the first lens, second lens and set of three lenses, and wherein f is a combined focal length of the first lens, second lens, set of three lenses and sixth lens.

7. The optical system of claim 1, wherein the field curvature correction is configured for correcting some or all of the optical distortion.

8. The optical system of claim 1, wherein the first lens is an objective lens having a diameter that is the largest diameter of the lenses of the optical system.

9. The optical system of claim 1, wherein the second lens is configured for correcting at least a portion of chromatic aberration produced by the optical system.

10. The optical system of claim 1, wherein the set of three lenses comprises a third lens that has an object side surface that is convex and an image side surface that is concave.

11. The optical system of claim 10, wherein the third lens has a small refractive power relative to a combined refractive power of the optical system.

12. The optical system of claim 1, wherein the set of three lenses comprises a fourth lens that is biconvex.

13. The optical system of claim 12, wherein the fourth lens has a higher positive refractive power relative to other positive power lenses of the optical system.

14. The optical system of claim 1, wherein the set of three lenses comprises a fifth lens that is biconcave.

15. The optical system of claim 1, wherein the sixth lens has an object side surface that is convex.

16. The optical system of claim 1, wherein the sixth lens has an image side surface that is concave near the optical axis, which becomes convex at an inflection point a distance from the optical axis.

17. The optical system of claim 1, further comprising a mechanical actuator that provides the field curvature correction by adjusting a position of at least one component of the optical system along the optical axis.

18. The optical system of claim 17, further comprising an optical sensor, wherein the mechanical actuator adjusts the position at least of the sensor to provide the field curvature correction.

19. The optical system of claim 18, wherein the mechanical actuator adjusts the position at least of the sixth lens and the sensor to provide the field curvature correction.

20. The optical system of claim 19, wherein a distance between the sixth lens and the sensor remains fixed before and after the position is adjusted.

21. The optical system of claim 18, wherein the mechanical actuator adjusts the position at least of the first lens, the second lens, the third lens, the fourth lens and the fifth lens relative the sensor to provide the field curvature correction.

22. The optical system of claim 21, wherein the mechanical actuator additionally adjusts the position of the sixth lens relative the sensor to provide the field curvature correction.

23. The optical system of claim 17, wherein the mechanical actuator is coupled with one or more automation modules that employ an analytical feedback loop based on image quality to cause the mechanical actuator to iteratively adjust the position of the at least one component to achieve a suitable image for the optical system.

24. The optical system of claim 23, wherein the optical system includes a manual input component to supplement or replace automated image correction with manual image correction.

25. The optical system of claim 1, further comprising a focusing mechanical actuator that adjusts a position of the first lens or the third lens to provide optical focusing for the optical system.

26. The optical system of claim 25, wherein the secondary mechanical actuator is an automated actuator, or is controlled by manual or external input, or a combination thereof.

27. The optical system of claim 1, further comprising:
a camera module for an electronic device, wherein the first lens, the second lens, the set of three lenses and the sixth lens are integrated as part of the camera module; and
an optical correction module that provides field curvature correction for reducing or removing the non-uniformity of the magnification.

28. The optical system of claim 27, wherein the first lens has the largest diameter of the set of lenses.

29. The optical system of claim 27, wherein the sixth lens has an image side surface that has negative refractive power near an optical axis common to the set of lenses, and positive refractive power beyond a fixed distance from the optical axis.

30. The optical system of claim 27, wherein the set of three lenses comprises a third lens, a fourth lens and a fifth lens.

31. The optical system of claim 30, wherein the fourth lens has the highest positive refractive power of the set of three lenses.

32. The optical system of claim 30, wherein the optical correction module comprises a mechanical actuator that adjusts a relative position of the sixth lens and an optical sensor associated with the camera module compared with a combination of the first lens, the second lens, the third lens, the fourth lens and the fifth lens.

33. The optical system of claim 32, wherein the mechanical actuator physically moves a position of the sixth lens and the sensor, or physically moves the combination of the first lens, the second lens, the third lens, the fourth lens and the fifth lens to achieve adjustment of the relative position.

34. The optical system of claim 32, wherein the optical correction module comprises a secondary mechanical actuator that provides auto-focus correction for the camera module.

35. The optical system of claim 34, wherein the secondary mechanical actuator adjusts a position of the first lens or the third lens to achieve the auto-focus correction.

\* \* \* \* \*